May 9, 1933. B. M. SHIPLEY 1,908,068
CASH REGISTER
Filed March 29, 1923 24 Sheets-Sheet 1
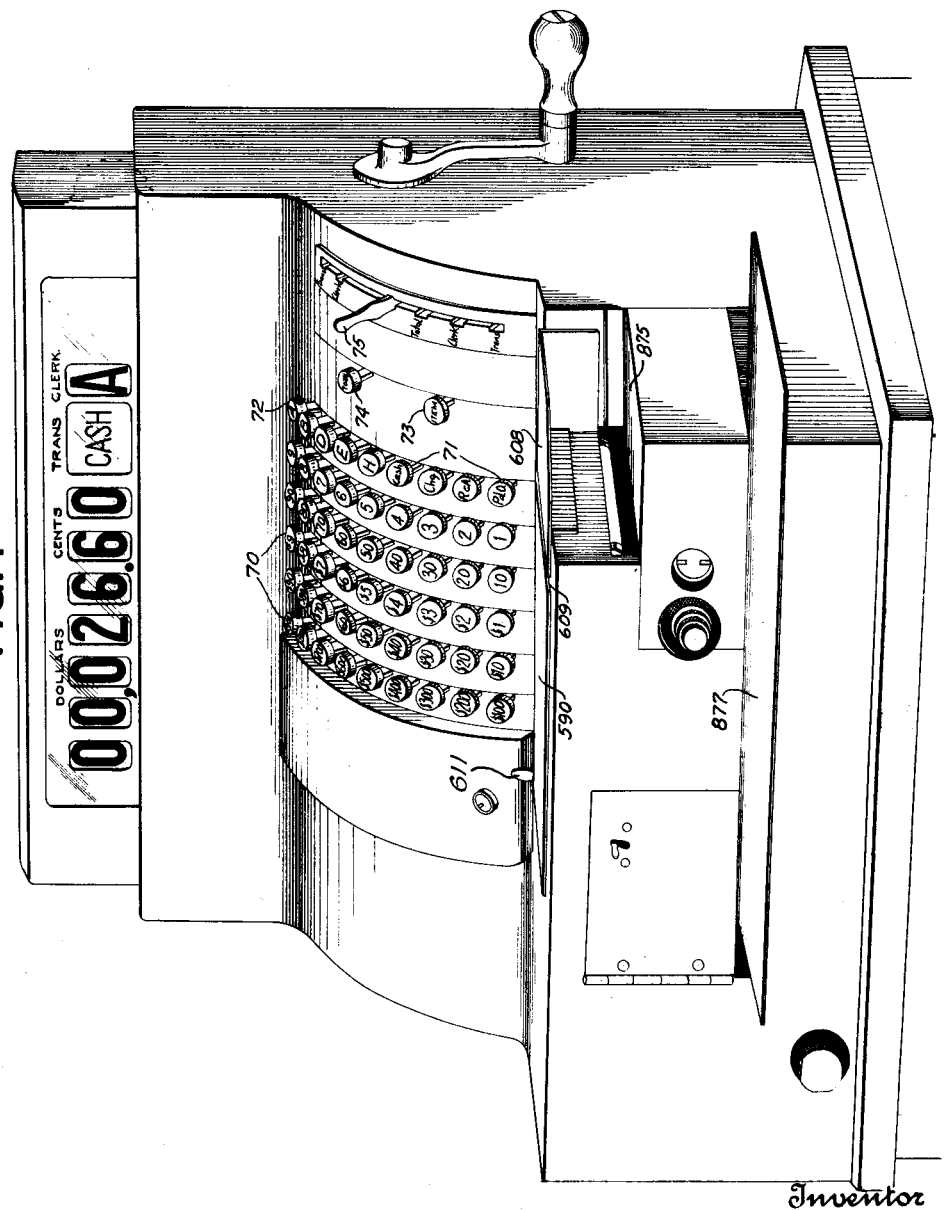
Inventor
Bernis M. Shipley
By Earl Beust
Henry E. Stauffer
His Attorneys

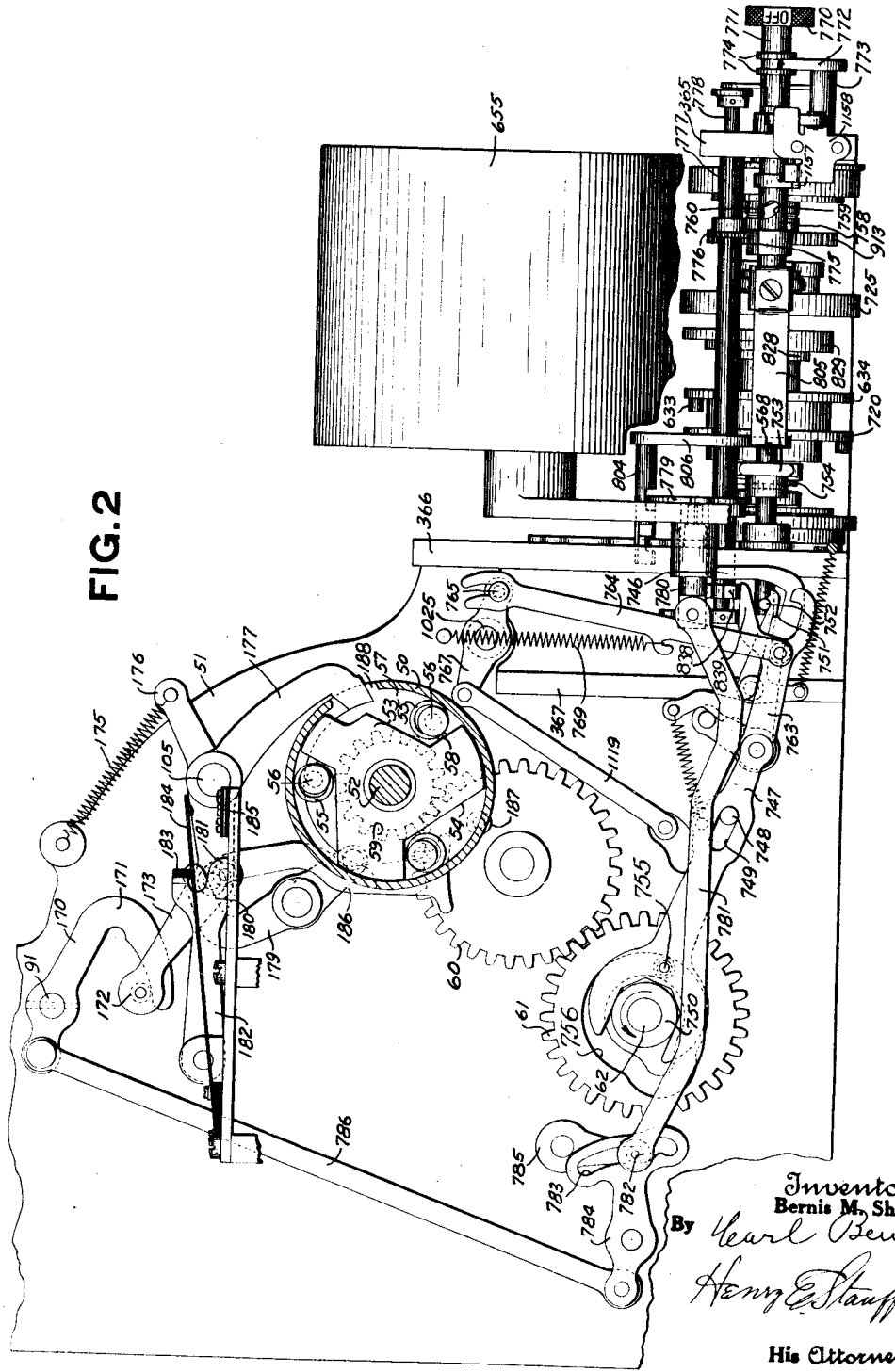

May 9, 1933.　　　B. M. SHIPLEY　　　1,908,068
CASH REGISTER
Filed March 29, 1923　　　24 Sheets-Sheet 3
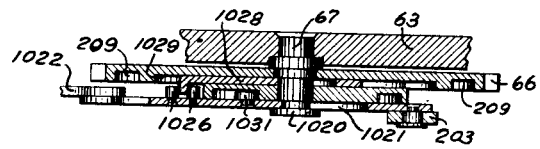
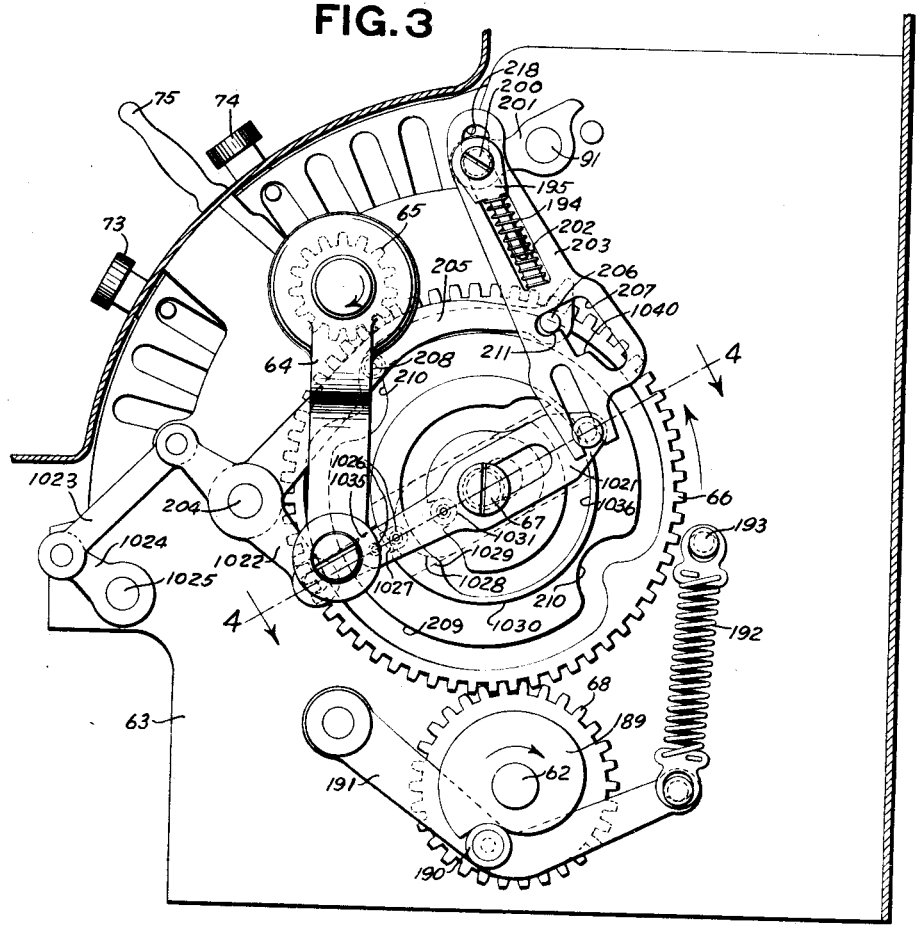
Inventor
Bernis M. Shipley
By Pearl Beust
Henry E. Stauffer
His Attorneys May 9, 1933. B. M. SHIPLEY 1,908,068
CASH REGISTER
Filed March 29, 1923 24 Sheets-Sheet 4

Inventor
Bernis M. Shipley
By Earl Beust
Henry E. Stauffer
His Attorneys

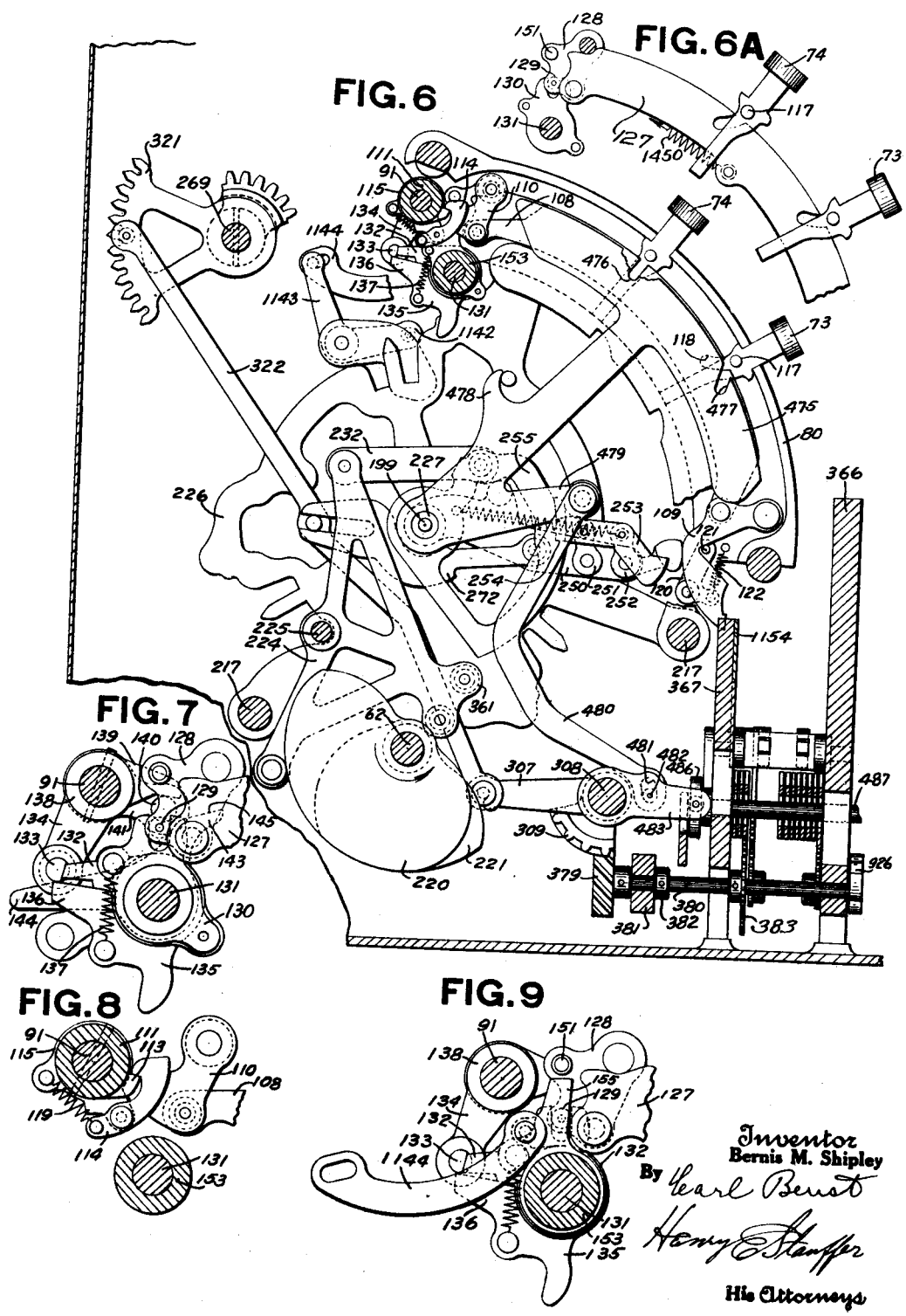

May 9, 1933.  B. M. SHIPLEY  1,908,068
CASH REGISTER
Filed March 29, 1923  24 Sheets-Sheet 6
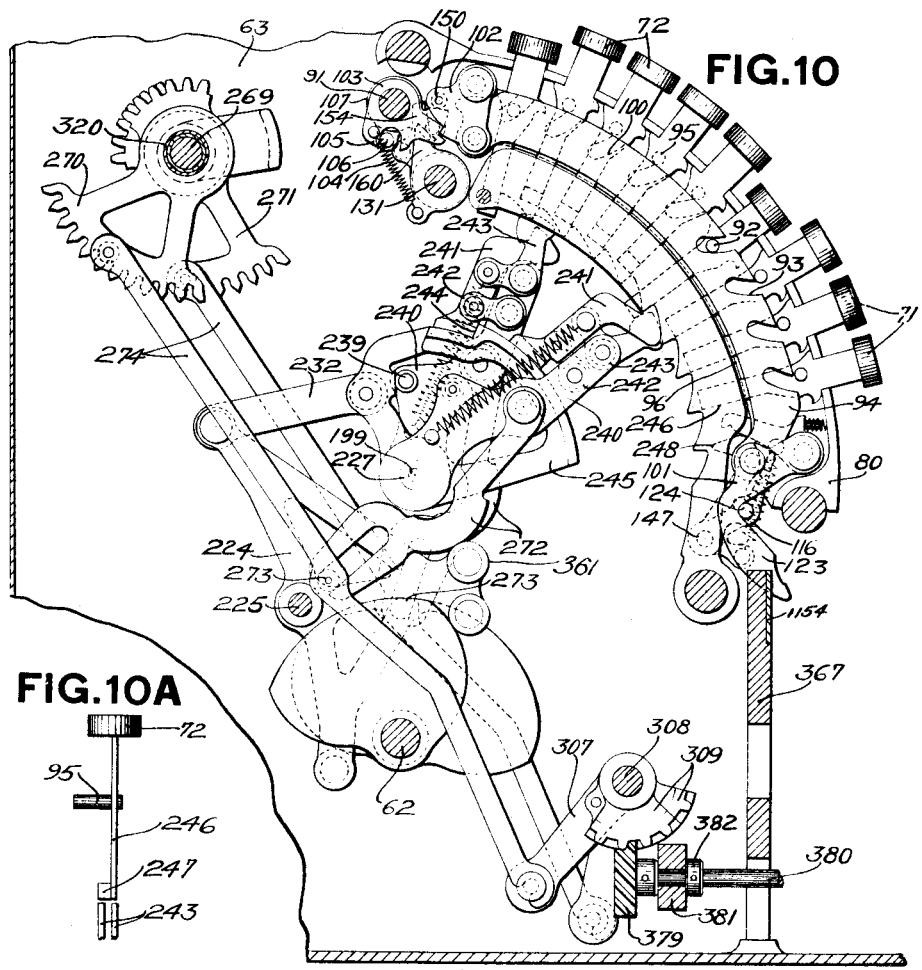
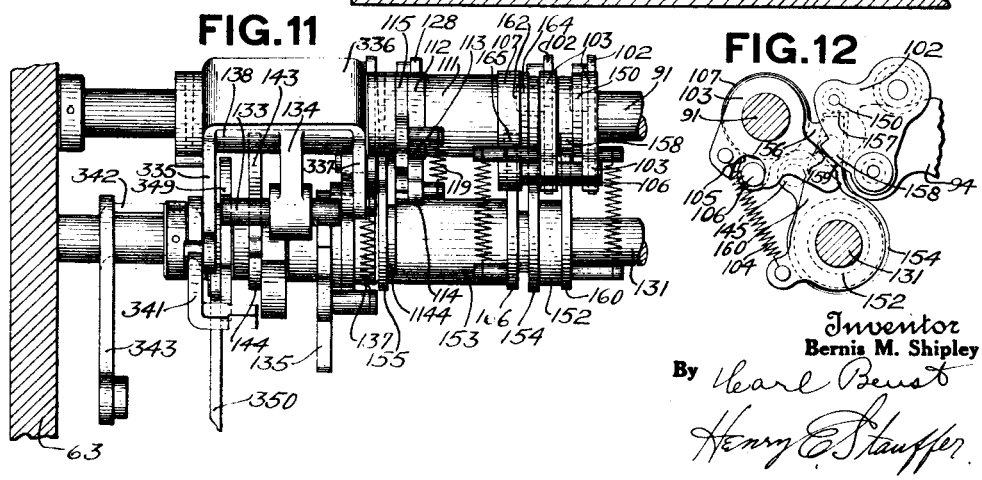

May 9, 1933.  B. M. SHIPLEY  1,908,068
CASH REGISTER
Filed March 29, 1923    24 Sheets-Sheet 7

Inventor
Bernis M. Shipley
By
His Attorneys

May 9, 1933.  B. M. SHIPLEY  1,908,068
CASH REGISTER
Filed March 29, 1923  24 Sheets-Sheet 8
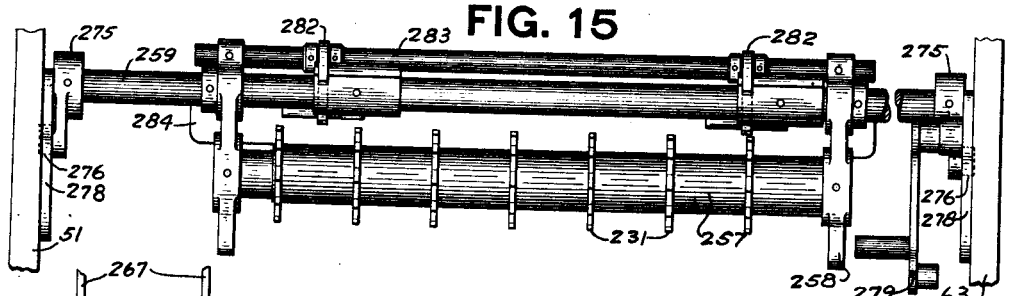
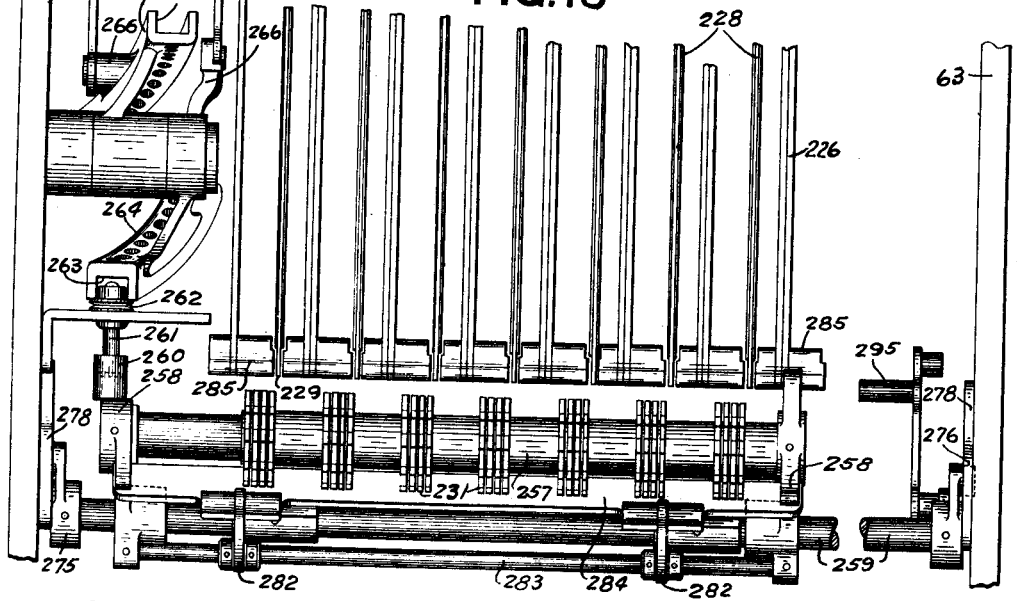
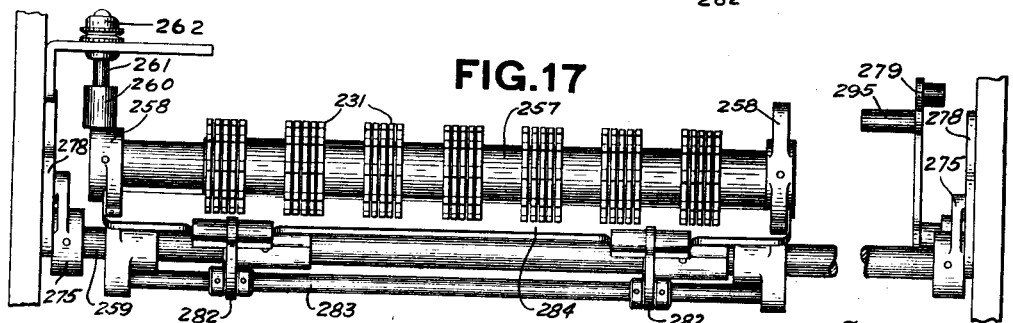
Inventor
Bernis M. Shipley
By
His Attorneys

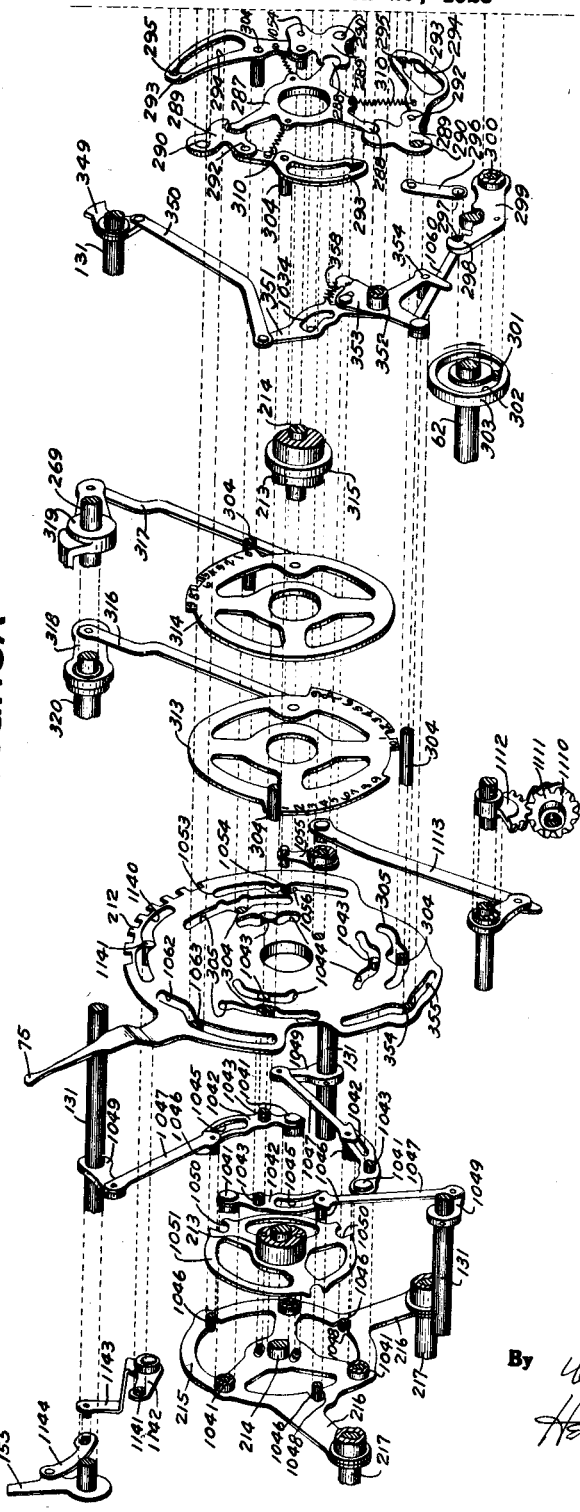

May 9, 1933.    B. M. SHIPLEY    1,908,068
CASH REGISTER
Filed March 29, 1923    24 Sheets-Sheet 10

Inventor
Bernis M. Shipley
By
His Attorneys

May 9, 1933. B. M. SHIPLEY 1,908,068
CASH REGISTER
Filed March 29, 1923 24 Sheets-Sheet 11

Inventor
Bernis M. Shipley
By Earl Beust
Henry E. Stauffer
His Attorneys

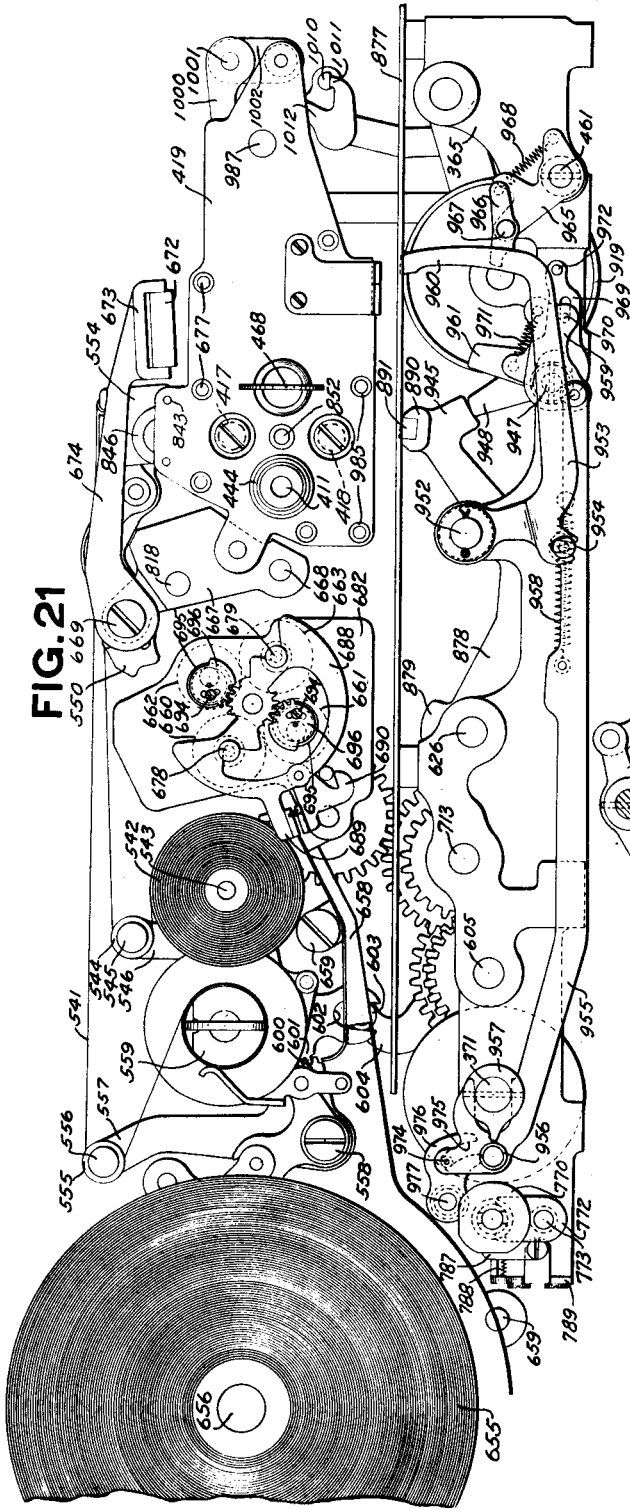

May 9, 1933.   B. M. SHIPLEY   1,908,068
CASH REGISTER
Filed March 29, 1923   24 Sheets-Sheet 13

Inventor
Bernis M. Shipley
By Carl Beust
Henry E. Stauffer
His Attorneys

May 9, 1933.  B. M. SHIPLEY  1,908,068
CASH REGISTER
Filed March 29, 1923  24 Sheets-Sheet 14
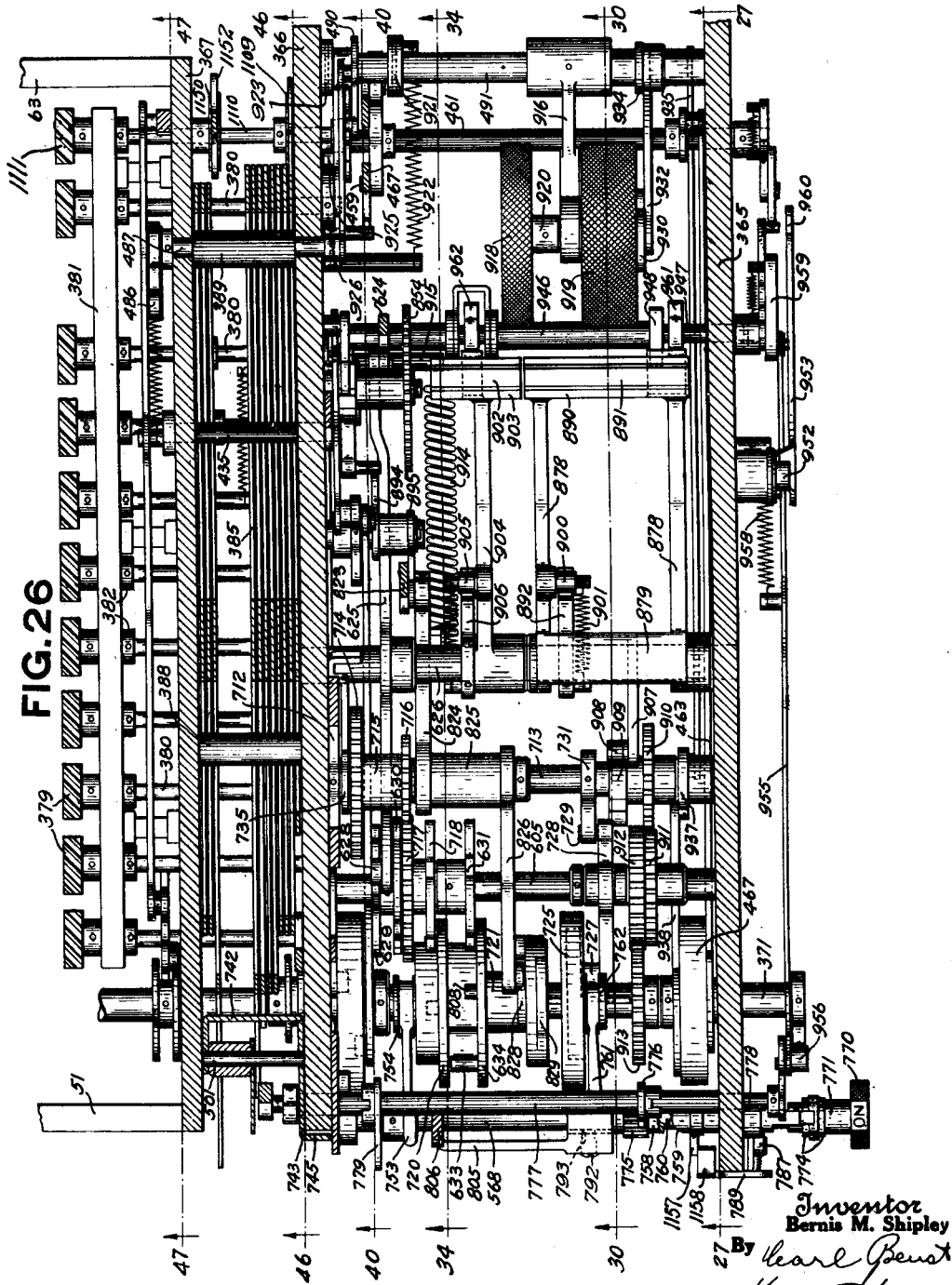

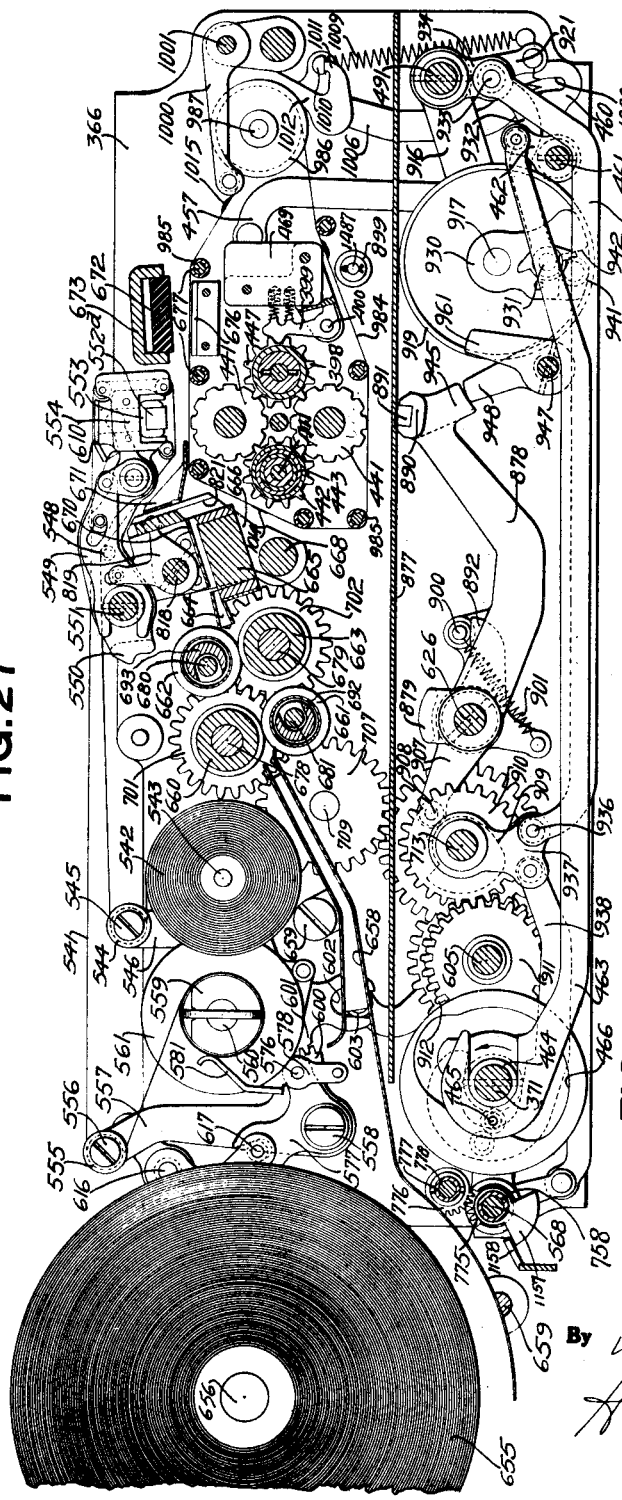

May 9, 1933.  B. M. SHIPLEY  1,908,068
CASH REGISTER
Filed March 29, 1923  24 Sheets-Sheet 16
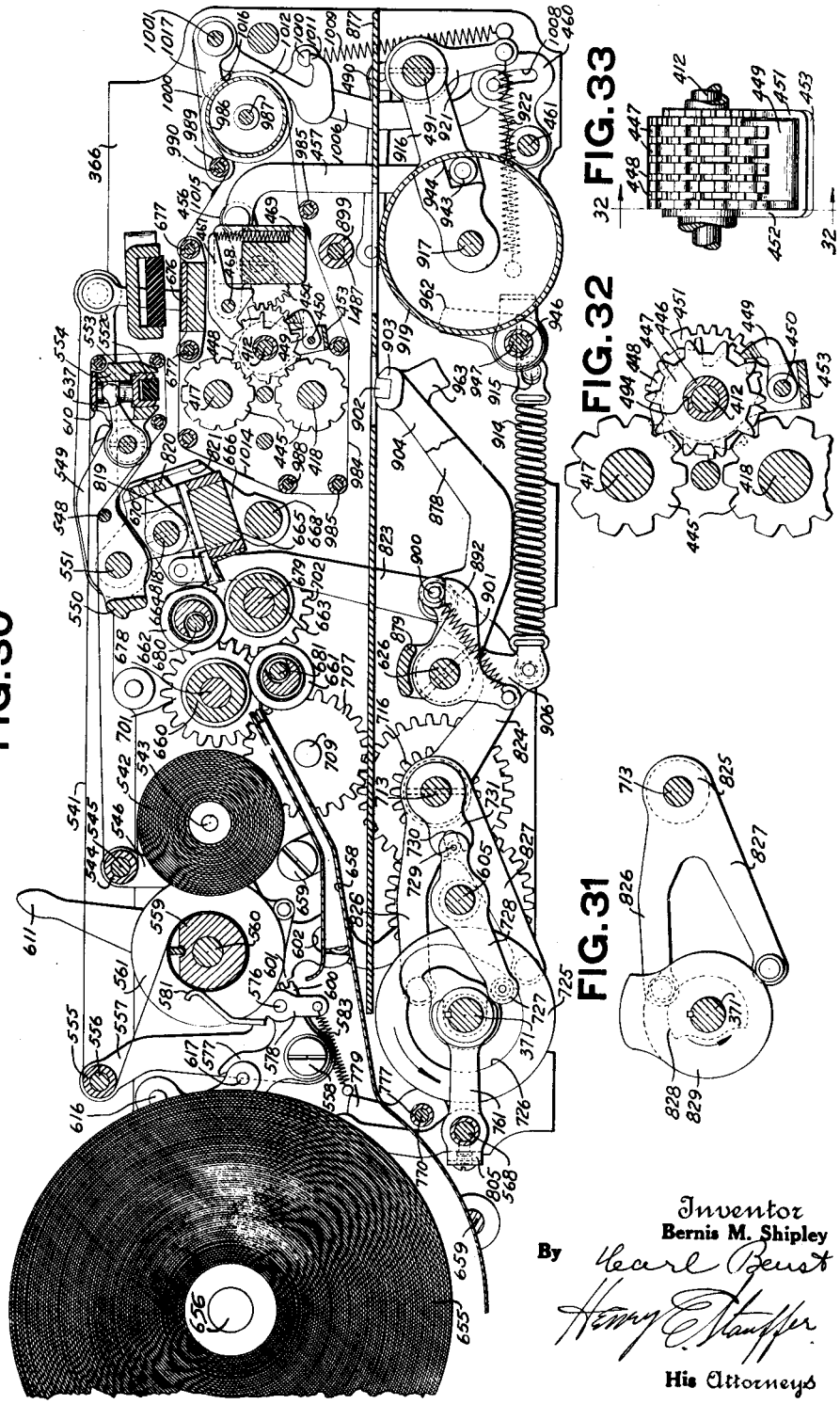

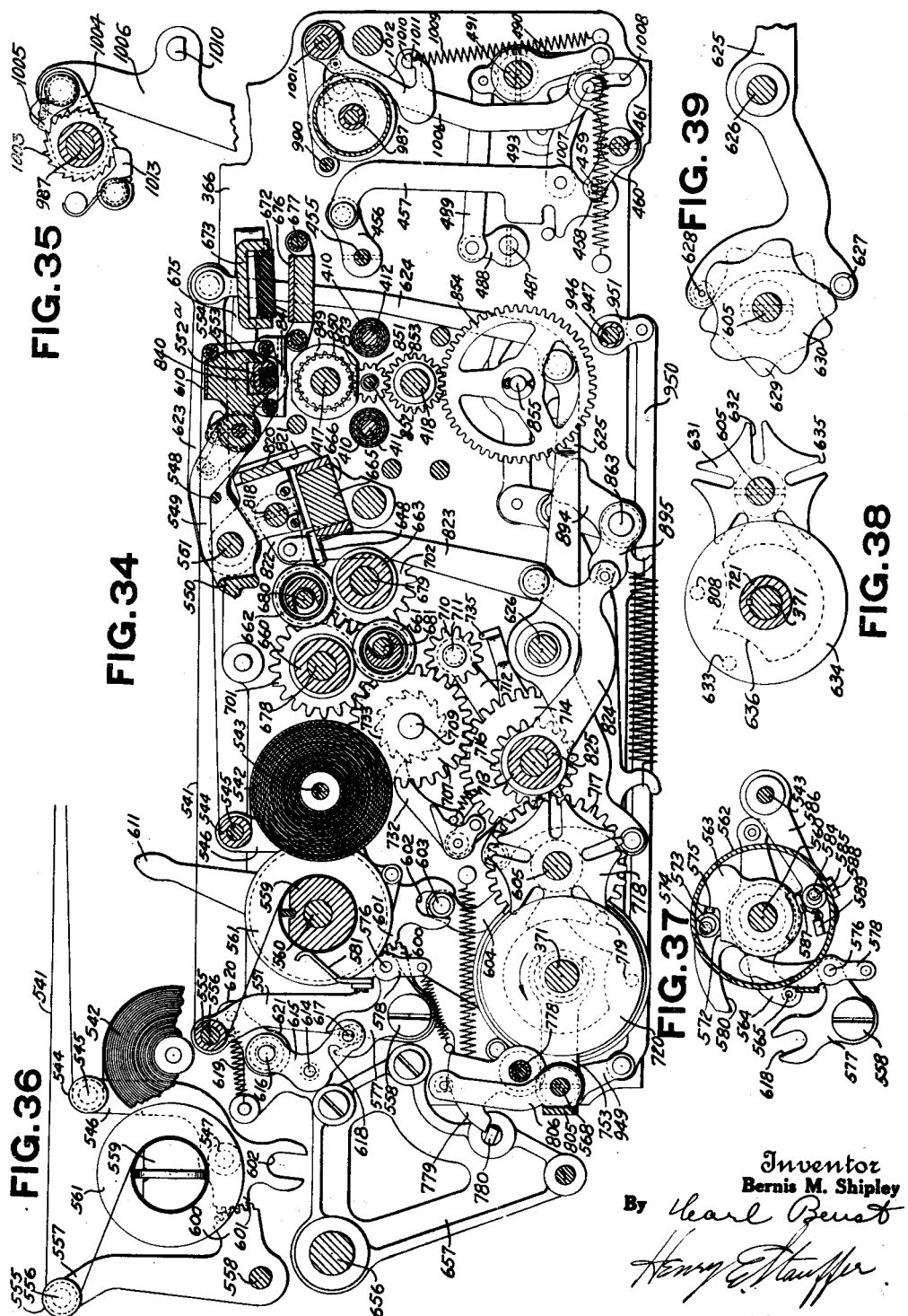

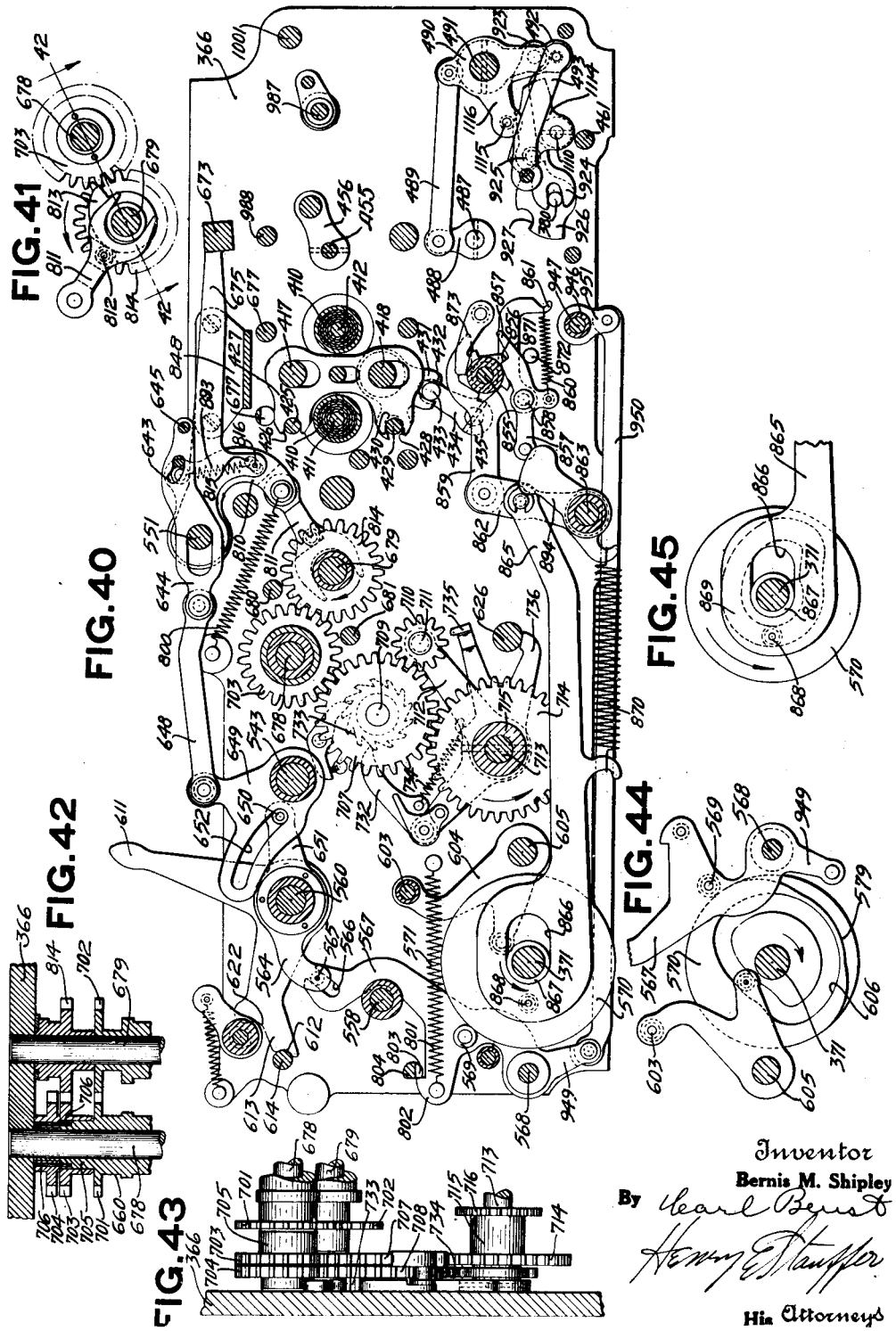

May 9, 1933.                B. M. SHIPLEY                1,908,068
                             CASH REGISTER
                    Filed March 29, 1923      24 Sheets-Sheet 19
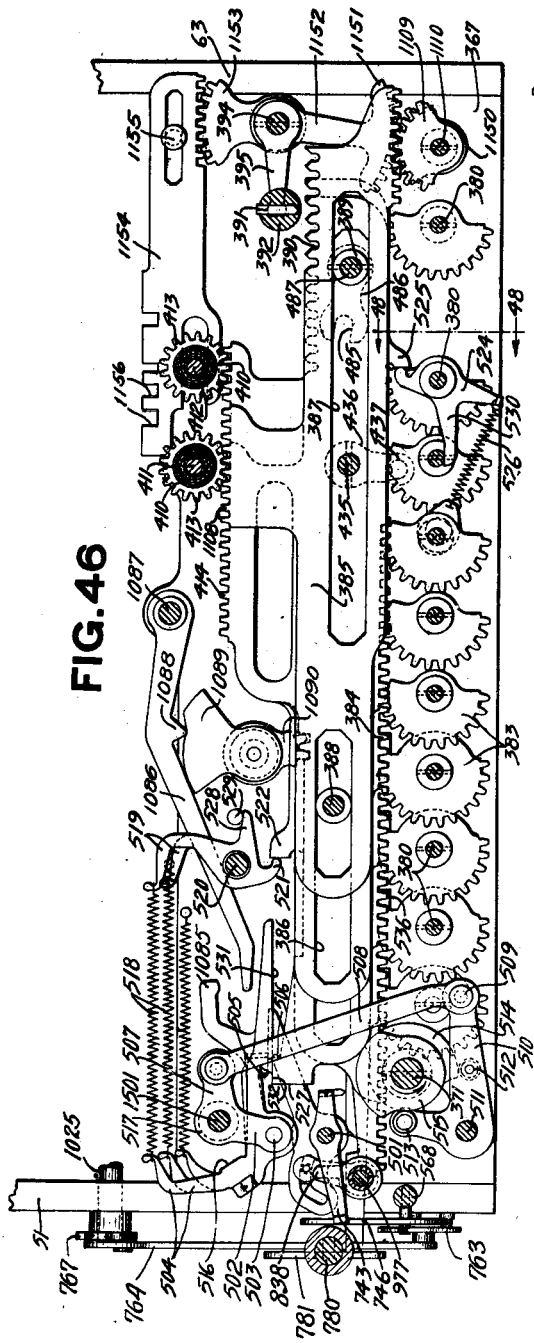
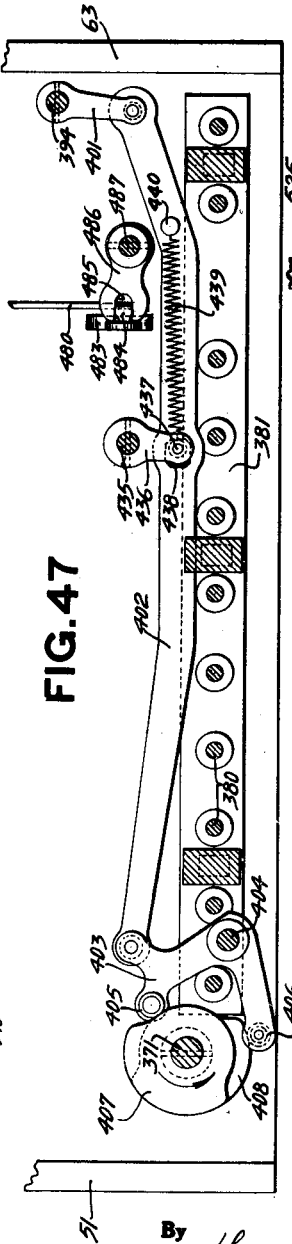
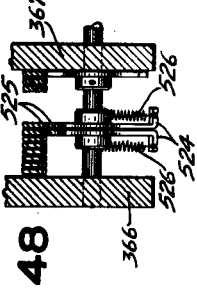
Inventor
Bernis M. Shipley
By
His Attorneys

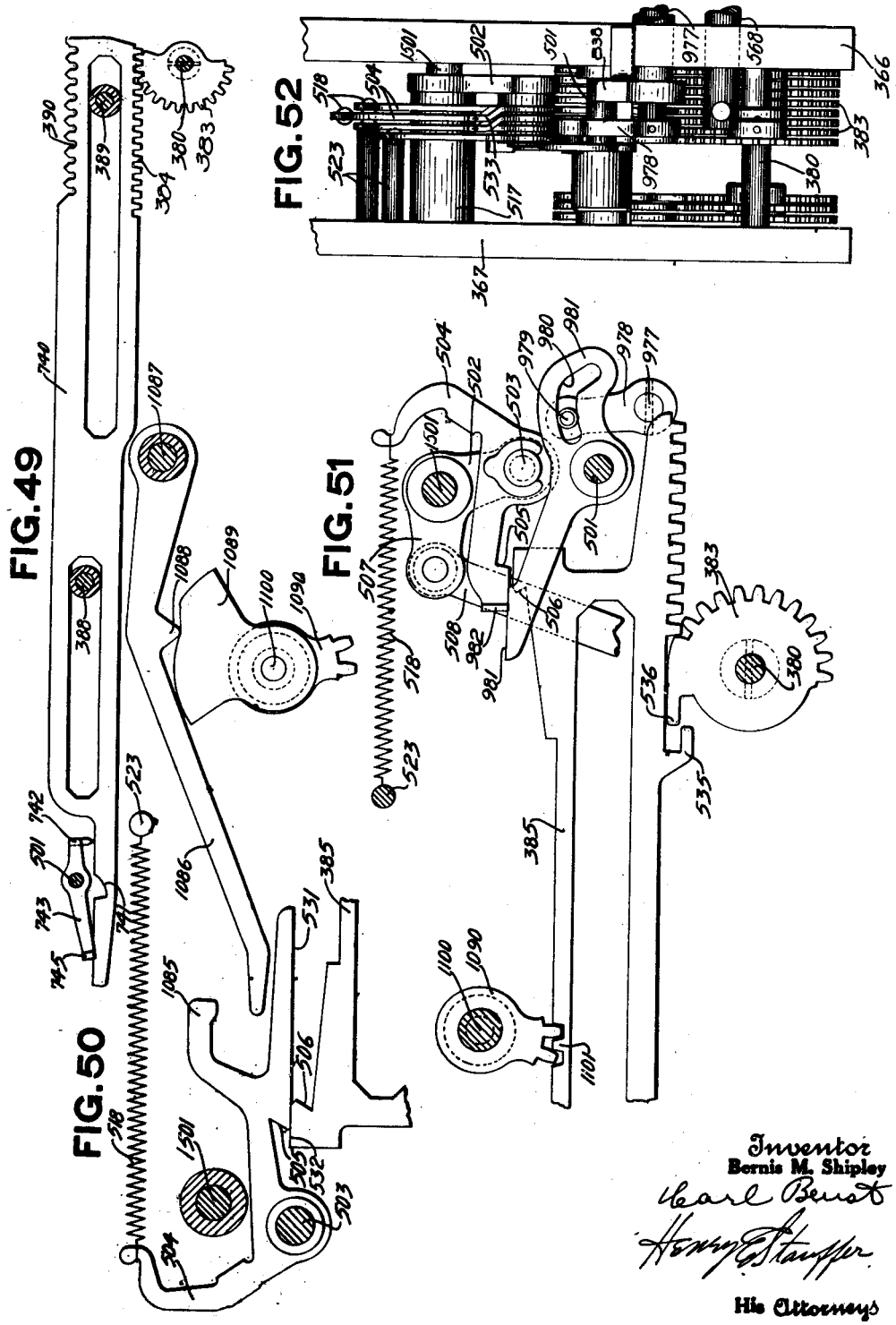

May 9, 1933.    B. M. SHIPLEY    1,908,068
CASH REGISTER
Filed March 29, 1923    24 Sheets-Sheet 21

Inventor
Bernis M. Shipley
By
His Attorneys

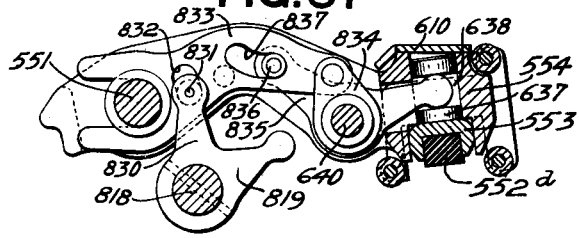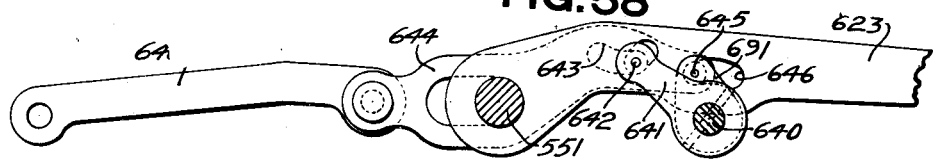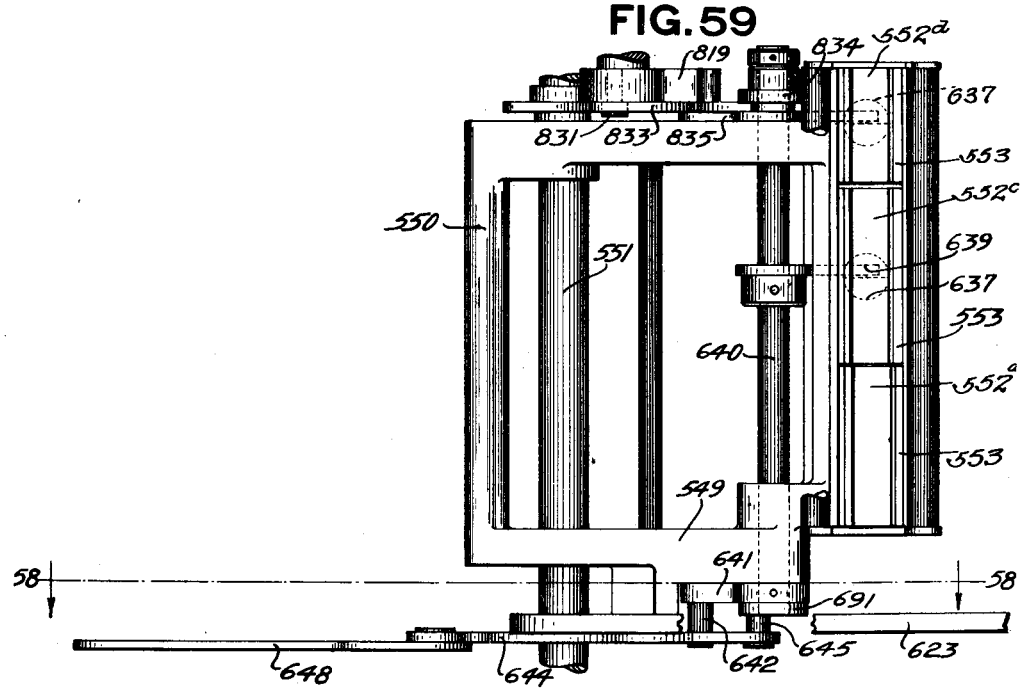

May 9, 1933.  B. M. SHIPLEY  1,908,068
CASH REGISTER
Filed March 29, 1923   24 Sheets-Sheet 23

FIG. 60

THE JOHN DOE
COMPANY

---10.00
---14.00
----1.50
----1.00
----0.10
AUG-10-21  17145  A Csh---26.60 TOTAL

FIG. 61

17145  A Csh---26.60 TOTAL
17146  A Chg---15.00 TOTAL
*Richard Roe*
17147  B Pd0---20.00 TOTAL
17148  B RcA---14.00
17149  E Csh----5.00
17150  D Csh--100.00 TOTAL
17150  H Csh----5.00
17150  H Csh----1.50
17150  H Csh----2.00
17150  H Csh----0.50
17150  H Csh----1.25
17151  H Csh---10.25 TOTAL
*John Smith*
17151  E CshS  15.00
17151  E CshS  71.00
17151  E CshS  42.50
17152  E CshS  128.50 TOTAL

FIG. 62

THE JOHN DOE COMPANY
141 BROADWAY

FURNITURE — RUGS — CHINA

| 1 | Chair #415 | $--15.00 |
| 1 | Rug 9x12 #512 | $--71.00 |
| 1 | Set Dishes | $--42.50 |
| AUG-10-21 17152 E Csh | | $-128.50 TOTAL |

FIG. 64

THE JOHN DOE
COMPANY

AUG-10-21  17149  E Csh----5.00

Inventor
Bernis M. Shipley
By Earl Beust
Henry E Stauffer
His Attorneys

May 9, 1933.   B. M. SHIPLEY   1,908,068
CASH REGISTER
Filed March 29, 1923   24 Sheets-Sheet 24
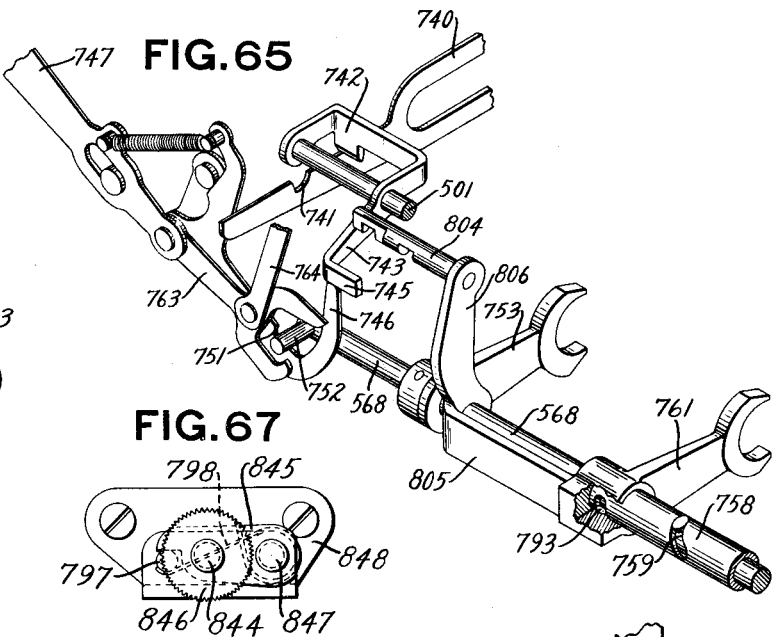
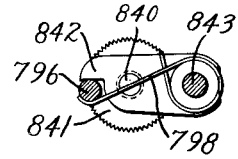
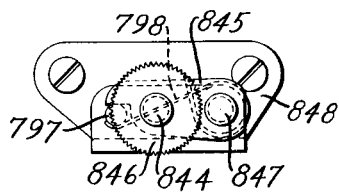
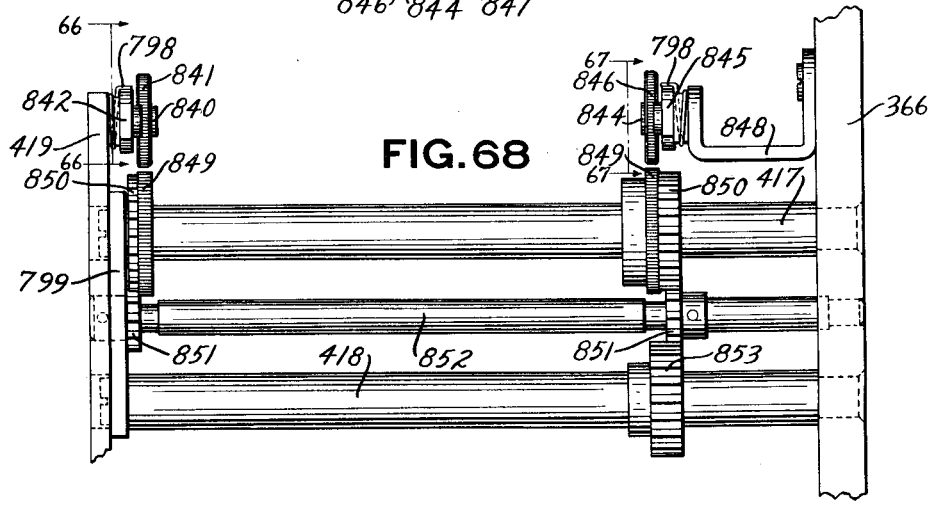
Inventor
Bernis M. Shipley
By
Carl Benst
His Attorney Patented May 9, 1933

1,908,068

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed March 29, 1923. Serial No. 628,477.

This invention relates to cash registers and particularly to the printing mechanism thereof.

One object of the present invention is to produce a machine of the type shown which will print on a detail strip or a receipt each item of a transaction and the total of all of said items.

Another object of the invention is to provide means for printing the various items of a transaction and the total thereof on an inserted slip in addition to the detail strip or check above mentioned.

Another object is to have a totalizer for each of the clerks and one for each kind of transaction, such as "cash", "paid out", etc.

Another object of the invention is to make it necessary to operate the proper amount, clerks, transaction, and control keys and to depress them in the proper sequence before the machine can be released for adding operations.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said figures:

Fig. 1 is a perspective view of the complete machine including the cabinet, and shows the key arrangement.

Fig. 2 is a left side elevation of the machine with the motor removed and shows the motor clutch and its cooperating mechanism as well as a part of the printing mechanism.

Fig. 3 is a right side elevation of the machine and shows the crank used for manual operation as well as the mechanism for controlling the duration of the operation on item entering and total taking operations.

Fig. 4 is a detail sectional view taken on the line 4—4 of Fig. 3.

Fig. 6 is a section through the machine just to the left of the control bank and also shows part of the printing mechanism.

Fig. 6A is a detail view of the two release keys and the release bar which cooperates therewith.

Fig. 7 is a detail sectional view of the releasing mechanism operated by the control bank.

Fig. 8 is a detail view of the mechanism shown in Fig. 6 for preventing release of the clerks' and transaction keys during item entering operations.

Fig. 9 is a detail view showing part of the release mechanism and the means for disabling the interlock between the clerks' keys and the control bank.

Fig. 10 is a section through the machine just to the left of the clerks' transaction bank, looking toward the right.

Fig. 10A is a detail side elevation of one of the clerks' keys.

Fig. 11 is a rear elevation of the release and interlocking mechanisms.

Fig. 12 is a detail sectional view showing the key interlocking mechanism.

Fig. 15 is an elevation of the item totalizer taken on line 15—15 of Fig. 13.

Fig. 16 is an elevation of the transaction totalizer line taken on the line 16—16 of Fig. 13.

Fig. 17 is an elevation of the clerks' totalizer line taken on the line 17—17 of Fig. 13.

Figure 18B:
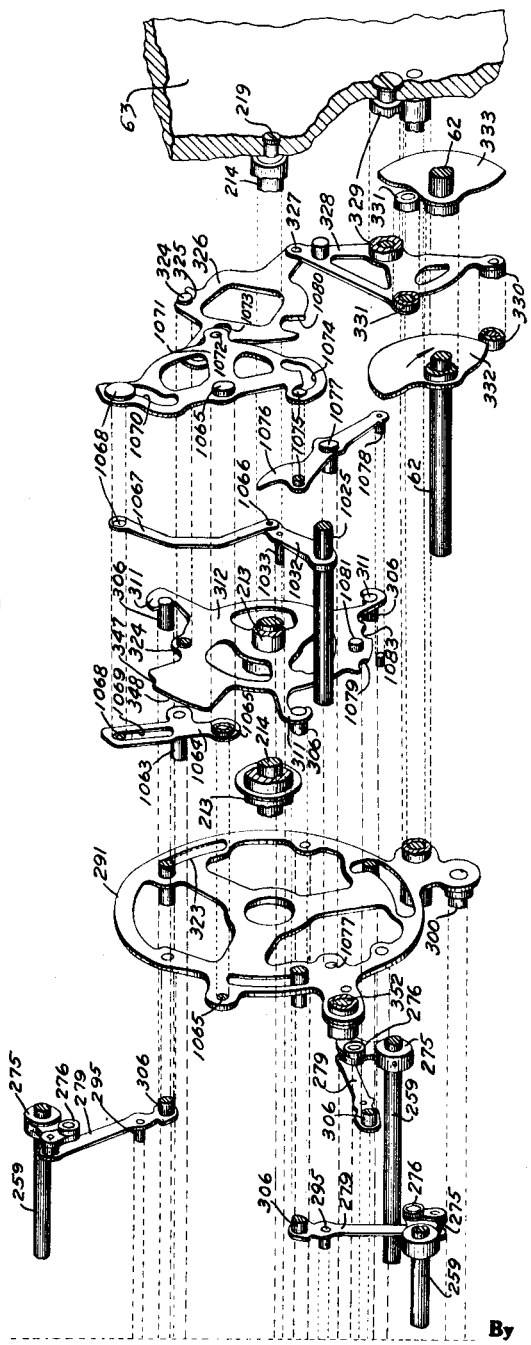

Figs. 18A and 18B taken together constitute a disunited perspective view of the mechanism for controlling the machine on total and sub-total operations.

Figure 19:
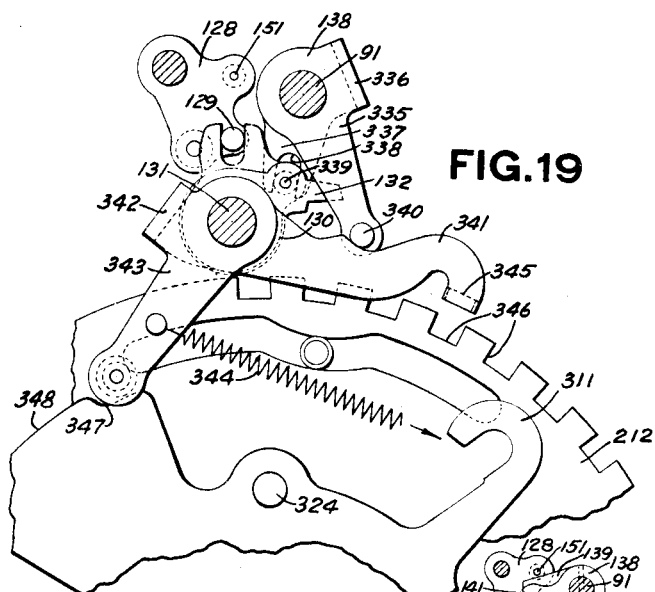

Fig. 19 is an enlarged detail view of part of the interlocking mechanism between the keys and the total lever.

Figure 20:
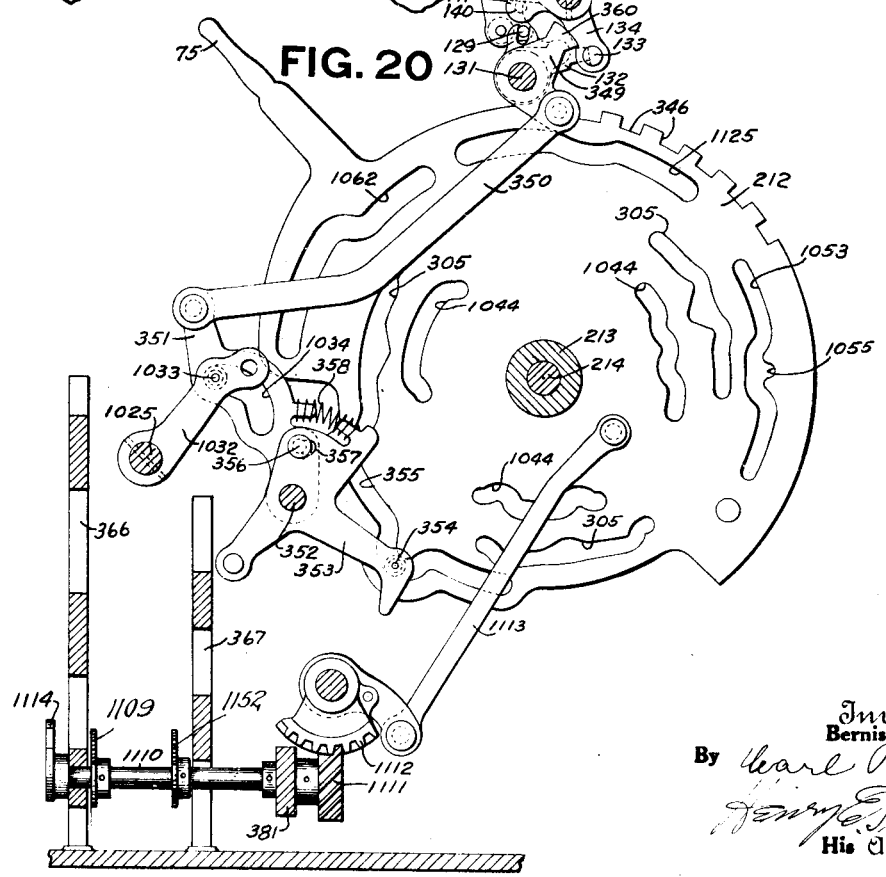

Fig. 20 shows a portion of the interlocking mechanism between the keys and the total lever and also the connections between the total lever and the printer.

Fig. 21 is a front elevation of the printing mechanism.

Fig. 22 is an enlarged detail sectional view showing the aliner for the "on and off" knob.

Fig. 23 is a detail view of the mechanism for disabling the printer driving mechanism on the first cycle of operation in total and sub-total printing operations.

Fig. 24 is a detail view of the printer driving pawls and their connections.

Figure 25:
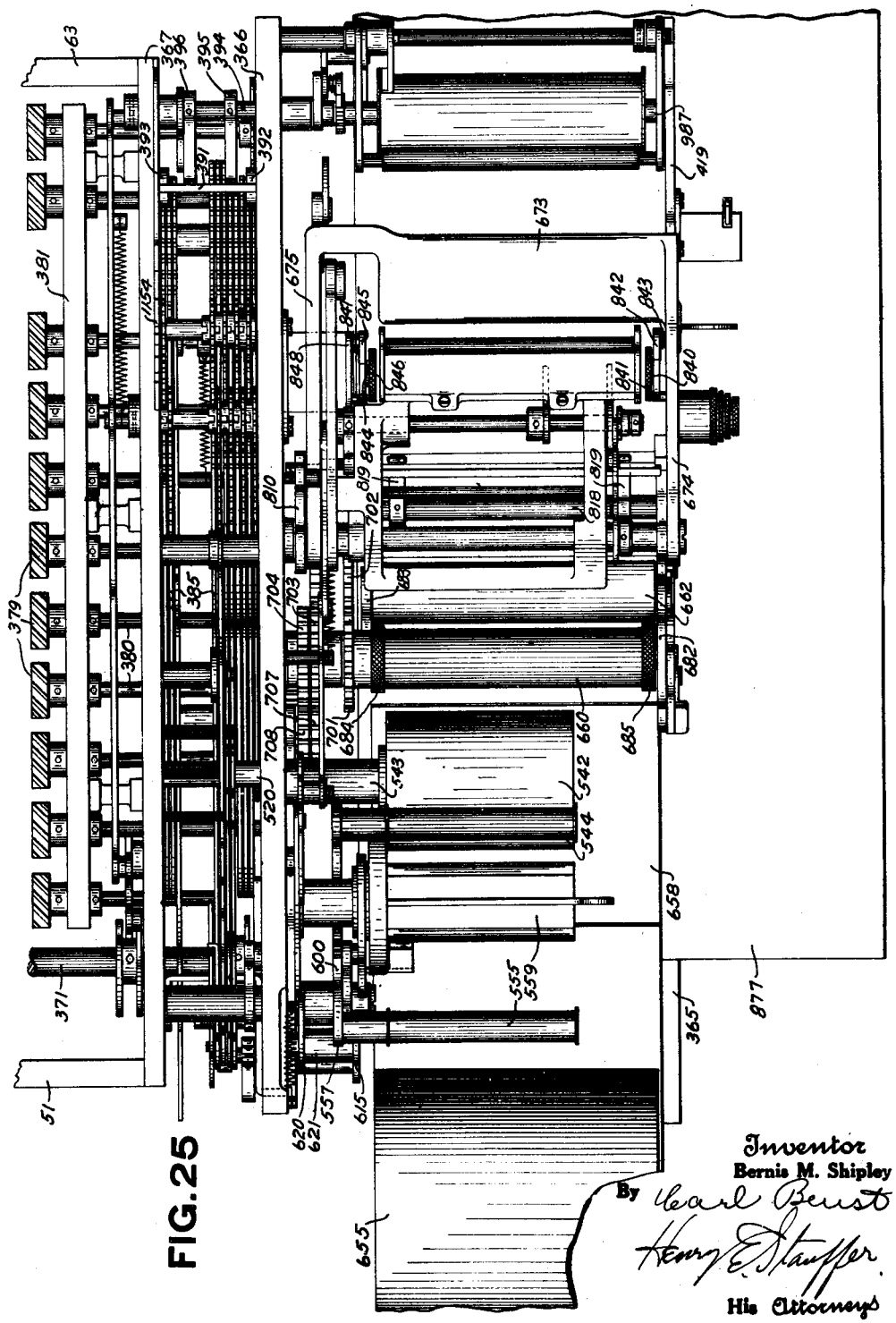

Fig. 25 is a top plan view of the entire printing mechanism with the cabinet removed.

Fig. 26 is a top plan view of the printing mechanism with some of the parts removed for the sake of clearness.

Fig. 27 is a sectional view taken on line 27—27 of Fig. 26.

Fig. 28 is a detail view of the cam and part of the pitman for operating the consecutive numbering device.

Fig. 29 is a rear elevation of the slip tension cam.

Fig. 30 is a section through the printer taken on line 30—30 of Fig. 26.

Fig. 31 is a detail side elevation of the cam for operating the knife and its cooperating mechanism.

Fig. 32 is a detail sectional view of the consecutive numbering device taken on the line 32—32 of Fig. 33.

Fig. 33 is a detail view of the consecutive numbering device showing the multi-prong pawl for actuating the same.

Fig. 34 is a section through the printing mechanism taken on line 34—34 of Fig. 26.

Fig. 35 is a detail view of the ribbon feeding mechanism.

Fig. 36 is a detail view of the mechanism for shifting the detail strip.

Fig. 37 is a detail side elevation of the mechanism for feeding the detail strip.

Fig. 38 is a detail view of the mechanism for feeding the check on total printing operations.

Fig. 39 is a detail view of the cam and lever for operating the upper impression mechanism.

Fig. 40 is a section through the printer taken on line 40—40 of Fig. 26.

Fig. 41 is a detail view of the means for operating the electro hammer.

Fig. 42 is a detail section taken on line 42—42 of Fig. 41.

Fig. 43 is a detail end view of the check feeding mechanism on item printing operations.

Fig. 44 is a detail side elevation of the cam and lever for operating the detail strip shifting mechanism and also shows the means for feeding the detail strip and crippling the same at certain times.

Fig. 45 is a detail view of the cam and pitman for operating the check ejecting mechanism.

Fig. 46 is a section through the printing mechanism taken on line 46—46 of Fig. 26.

Fig. 47 is a section through the printer taken on line 47—47 of Fig. 46.

Fig. 48 is a detail sectional view taken on line 48—48 of Fig. 46.

Fig. 49 is a detail view of the rack which controls the slip feeding mechanism.

Fig. 50 is a detail view of a portion of the zero elimination mechanism.

Fig. 51 also shows a part of the zero elimination mechanism.

Fig. 52 is an end elevation of the type wheel racks and a portion of the zero elimination mechanism.

Figure 53:
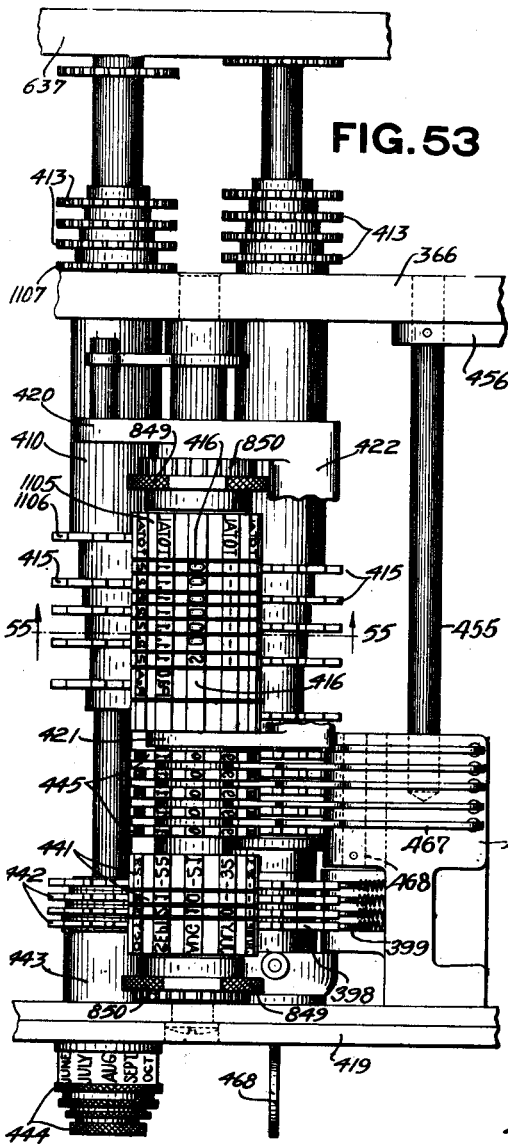

Fig. 53 is a top plan view of the type wheel line and associated tube lines for operating the same.

Figure 54:
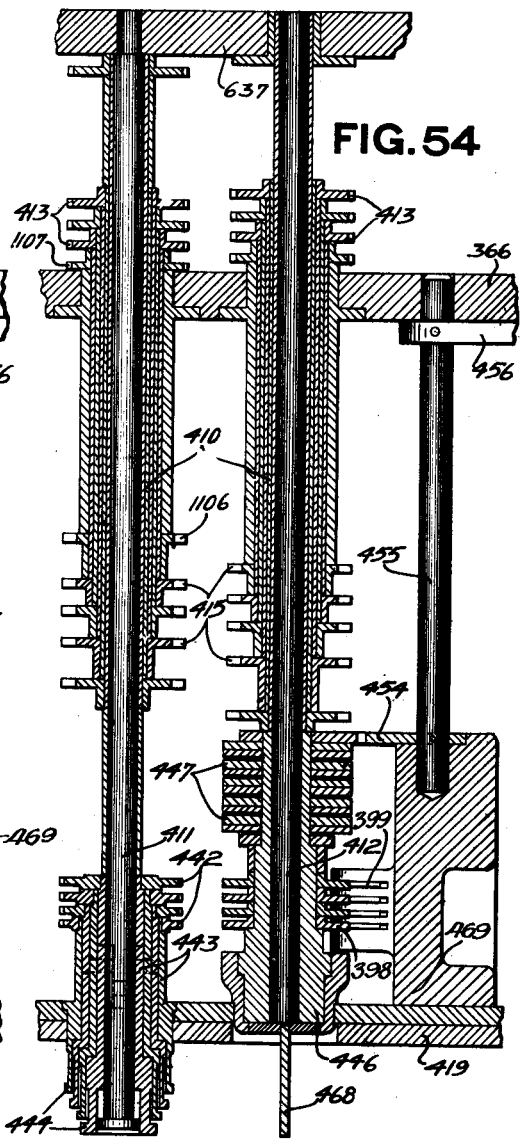

Fig. 54 is a horizontal sectional view through the axes of the tube lines.

Figure 55:
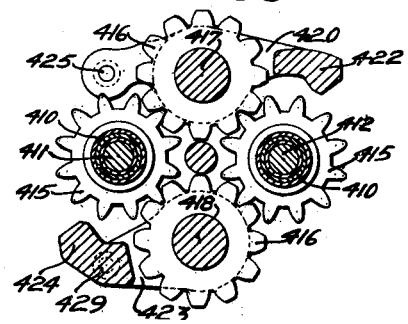

Fig. 55 is a detail sectional view illustrating the type wheel aliners.

Figure 56:
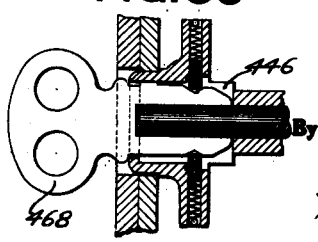

Fig. 56 is a detail view of the key and its cooperating mechanism for turning the consecutive number type wheels to zero.

Fig. 57 is an enlarged detail side elevation of the upper hammer.

Fig. 58 is a detail sectional view taken on line 58—58 of Fig. 59.

Fig. 59 is a plan view of the under side of the upper hammer and shows the mechanism for rendering it operative.

Fig. 60 is a facsimile of the receipt or check printed and issued by the machine and shows the record made when the transaction includes several items and the total thereof.

Fig. 61 is a facsimile of a portion of the detail strip printed by the machine.

Fig. 62 is a facsimile of the type of inserted slip printed by this machine and shows the various items and the total thereof.

Figure 63:
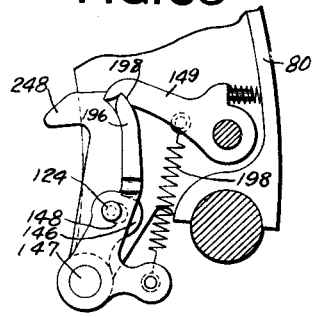

Fig. 63 is a detail side elevation of the mechanism for moving the zero stop pawls for the clerks' and transaction keys to their ineffective position.

Fig. 64 is a facsimile of the type of receipt issued when only a single item forms the transaction.

Fig. 65 is a perspective view of a section of the automatic check control mechanism.

Fig. 66 is a detail view of a part of the check ejector mechanism, taken on lines 66—66 of Fig. 68, and looking in the direction of the arrows.

Fig. 67 is a detail view of a part of the check ejector mechanism, taken on line 67—67 of Fig. 68, and looking in the direction of the arrows.

Fig. 68 is a detail end elevation of a part of the check ejector mechanism.

In general

The machine to which this invention is applied is of the general type illustrated and described in the Letters Patent of the United States, granted to William A. Chryst, No. 1,230,864, on June 26, 1917; F. L. Fuller, Nos. 1,242,170 and 1,394,256, on October 9, 1917, and October 18, 1921, respectively; and B. M. Shipley, No. 1,619,796, on March 1, 1927.

The machine shown herein is somewhat more compact than those above referred to, and performs a variety of functions which will be hereinafter described. Sales in many stores consist of a number of items which as a whole constitute the transaction. The machine is designed to print each of these items on a detail strip or on a check and an inserted slip, and then to print the total of these items, together with the date, consecutive number, clerk's initial, transaction and the word "Total" on the check and slip, and the total amount of these items, the consecutive number, clerk's initial, transaction and the word "Total" on the detail strip. If the transaction consists of a single item the amount of this item and the date, consecutive number, etc., are printed. There are three lines of totalizers in this machine as is usual with machines of this class. One of these lines (the upper one) has only one totalizer thereon. This is the totalizer used to accumulate the items of a transaction, and it is returned to zero automatically upon the completion of each transaction.

The groups of transaction and clerk's key are in the same bank, this bank being of the divided type so that each group can act separately. Each of these groups of keys controls one of the totalizer lines, the transaction keys controlling the front line and the clerks' keys controlling the rear line. These groups of keys select the totalizers for operation in a manner well known in the art and which will be described more in detail later.

Mechanism is provided for enforcing a predetermined sequence of operation of the controlling keys in the following order: first, the transaction key; second, the clerk's key; and third, the release key. This is done in order to make it certain that the clerk will not forget or neglect to make a complete record of the transaction.

The printer of this machine is of the general type shown and described in the previously cited Fuller Patent, No. 1,394,256, and Shipley Patent, No. 1,619,796. It has a great many novel features, however, which enable it to be used to print the items and totals of the various transactions, as will be described in detail herein.

Operating mechanism

The machine is adapted to be operated normally by an electric motor of any suitable design such as that shown in the United States Letters Patent, No. 1,144,418, granted to C. F. Kettering and W. A. Chryst on June 20, 1915. This motor is mounted on the left side of the machine and is connected to the driving mechanism of the machine by a clutch including a shell 50 (Fig. 2) driven by the motor. Mounted in the left hand side frame 51 of the machine is a stud 52 carrying a disk 53 having notches 54 adapted to receive rollers 55 loosely mounted on pins 56 carried by a disk 57 loose on stud 52. These rollers are forced away from the short side of the notch 54 by spring-pressed pins 58 carried by the disk 53. It is evident that when the shell 50 is rotated counter-clockwise (Fig. 2) by the motor, the rollers 55, when the disk 57 is released, will jam between the longer sides of their notches of the disk 53 and the inner periphery of a flange formed on the shell 50, and will cause the disk 57 to rotate with the shell 50 in counter-clockwise direction.

A gear 59 is connected, by means not shown herein, but fully shown and described in the above mentioned Kettering and Chryst patent, so as to rotate with the disk 57. This gear 59 meshes with a gear 60 loose on a stud mounted in the side frame 51. This gear 60 meshes with a gear 61 fast on a shaft 62 supported by the left hand side frame 51 and a right hand side frame 63 (Fig. 3). This shaft is the main drive shaft of the machine and receives one complete rotation at each adding operation.

It may sometimes be desirable to operate the machine by hand, and for this purpose there is provided a crank 64 (Fig. 3) which has integral therewith a pin (not shown) adapted to project into a tube rotatably mounted in the side frame 63. The end of this tube is connected with the crank by any suitable clutch mechanism so that the crank may be easily detached. Fast on the tube is a gear 65 meshing with a large gear 66 supported by a stud 67 in the side frame 63. The gear 66 meshes with a gear 68 fast on the main drive shaft 62. The ratio of these gears is such that two rotations of the crank will cause one rotation of the shaft 62.

Keyboard

The keyboard (Fig. 1) consists of five banks of amount keys 70, one divided bank containing both transaction keys 71 and clerks' keys 72, a bank having but two keys therein, the "Item" key 73 and "Total" key 74, and the total lever 75. The operation of this keyboard sets up the amount and controls the printing thereof upon adding operations. The total lever controls the machine on total and sub-total printing operations.

Amount keys

There are five banks of amount keys 70 in this machine. It is, of course, understood that the registering capacity can be either increased or decreased without in any way departing from the spirit of the invention.

The amount keys 70 (Fig. 5) cooperate with key detents 76 and locking plates (not shown). The detents 76 are supported at their upper and lower ends respectively, by arms 77 and 78, loosely pivoted on pins 79 on the key frames 80. When a key is depressed the inclined edge of a shoulder 81 on the key engages a corresponding pin 82 on the detent, thus moving the latter downwardly until the shoulder is past the pin when the detent rises slightly retaining the key in its depressed position. The arm 78 engages a pin 83 on an arm 84 fast on a short shaft 85 to which is also secured a zero stop pawl 86 normally in effective position, and when the detent 76 is moved downwardly the pawl is rocked clockwise to render it ineffective. A spring 87, connected at its lower end to the pawl 86 and at its upper end to the key frame, serves to retain the pawl and the detent in normal position.

The usual locking plates (not shown) are provided for locking the depressed keys in their depressed positions and the undepressed keys in their undepressed positions, thereby preventing manipulation of the keys during an operation of the machine. In order to move the locking plates into locking position the upper supporting arms for these plates are slotted at 88 to surround a rod 89 carried by a plurality of arms 90 fast on a shaft 91. As will be hereinafter described, this shaft 91 is rocked first counter-clockwise and then clockwise (Fig. 5), thereby moving the said locking plates into and then out of their locking positions.

*Transaction and clerks' keys*

The machine is provided with what is known in the art as a "divided bank" which bank contains the clerks' keys 72, and the transaction keys 71 (Fig. 10). The clerks' keys are the five uppermost keys and the transaction keys are the four lower keys of this bank. These clerks' and transaction keys control the selection of the proper clerks' and transaction totalizers as well as the setting up of the type wheels to print the appropriate symbol of the key depressed.

Each of the transaction keys 71 (Fig. 10) carries a pin 92 adapted to cooperate with a curved slot 93 cut in a detent 94, and thereby cause it to move downwardly. The clerks' keys 72 carry similar pins 95 cooperating with slots 100 in a detent 96 similar to detent 94 and cause downward movement of this detent when a clerks' key is depressed. The detents for the clerks' and transaction keys are located on opposite sides of the key frame 80 for this bank.

The detents 94 and 96 are movably supported by arms 101 and 102 pivoted to the key frame 80. The arms 102 at the upper ends of the detents 94 and 96 have shoulders thereon which, when the detents are lowered, engage with notches formed in two arms 103 loosely mounted on the release shaft 91 and held in contact with the arms 102 by springs 104 to be later described. In Fig. 12, the above mentioned parts for the transaction keys are shown in their normal positions and in Fig. 10, in their latched positions.

The means for releasing these keys and permitting their return to their normal positions will now be described. Each arm 103 has a recess 105 through which projects a long pin 106 carried by an arm 107 loose on shaft 91. When the shoulders on arms 102 move into engagement with the notches in arms 103, the pin 106 and arm 107 are not moved, due to a clearance between the pin 106 and the edges of the recesses 105 of the arms 103 and the parts assume the positions shown in Fig. 10. At the end of an adding operation, the arm 107 and pin 106 are given a clockwise movement in a manner to be later described, which will rock the arm 103 clockwise (Fig. 10) and remove the notches therein from the shoulders on arms 102 to permit the detents 94 and 96 to move upwardly to normal position.

*Release keys*

The right hand key bank (see also Fig. 6), contains but two keys, the "Item" key 73 and the "Total" key 74. These keys are supported by a key frame 80 similar to those for the amount, transaction and clerks' keys. Both of these keys carry pins projecting from each side thereof. Proceeding from left to right as viewed from the front, these pins cooperate with, first, the consecutive number throw-off bar 475, to be later described; second, the detent 108 which normally prevents the return of the clerks' and transaction keys to their undepressed positions during item entering operations; and third, the release bar 127 which releases the machine. The consecutive number throw-off plate will be disregarded for the present as it will be described later.

When a transaction is made up of several items it is desirable that the clerk's key and the transaction key remain depressed until the completion of the transaction when all keys will be released. This is accomplished by means of a detent 108 (Fig. 6) supported at its lower end by an arm 109 and at its upper end by an arm 110, both of said arms being pivoted to the key frame 80. Fast on a hub 111 which also carries the arm 107, (Fig. 11) surrounding shaft 91, is a collar 112 carrying a lug 113 (Fig. 8). A pawl 114 carried by an arm 115 fast on shaft 91 normally hooks over the lug 113. As can be seen in Fig. 8, when the parts are in normal position, the pawl 114 is held in engagement with the lug 113 due to the contact of the arm 110 with the pawl.

At the end of an ordinary adding operation when it is desired to have the keys all released, the shaft 91 (Figs. 6 and 8) is moved first counter-clockwise and then clockwise slightly past normal position, and then returned to normal by means to be later described. As the arm 115 is fast on this shaft 91, said arm 115 and pawl 114 carried thereby are moved with this shaft. On its counter-clockwise movement the pawl has no function, but when it moves clockwise past normal position it engages the lug 113 and moves said lug and through it the collar 112, hub 111, arm 107 and pin 106 clockwise sufficiently to rock the notches in arms 103 out of engagement from the shoulders on arms 102 to permit springs 116 (Fig. 10) stretched between arm 101 and the key frame 80, to return the detents 94 and 96 to their normal positions.

When, however, the transaction comprises a series of items and it is desired to have the "transaction" and "clerks'" keys remain depressed until all of the items are entered and the total printed, the "Item" key 73 is depressed. This key, as before stated, carries a pin 117 (Fig. 6) adapted to cooperate with a slot 118 cut in the detent 108. This slot is inclined so that the detent will be forced downwardly. This downward movement will cause the arm 110 to be rocked away from the pawl 114 which will immediately rock clockwise about its pivot, due to a spring 119 (Fig. 8) extending between a projection on arm 115 and the lower end of the pawl. Now when the pawl is rocked first counter-clockwise and then clockwise, as above described, the pawl will not come in contact with the lug 113 and therefore the lug, collar 112, hub 111, arm 107 and pin 106 will not be rocked to release the "transaction" and "clerks'" keys as previously described. At the end of the operation the detent 108 will move upwardly due to a spring 122 stretched between one arm of a bell crank 120 and the key frame 80. This bell crank carries a pin 121 which contacts with the arm 109 on which the detent 108 is pivoted and tends to rock this arm clockwise to raise the detent to its normal position.

If the transaction consists of only one item, then the "Total" key is depressed. The slot in detent 108 opposite the pin on this key is straight, so that the depression of this key has no effect on the detent 108, and the keys will be released at the end of the operation.

Releasing mechanism

The principal function of keys 73 and 74 is to release the machine. The manner in which this is accomplished will now be described. On the opposite side of key frame 80 from that of the detent 108 just described is a release bar 127 (Fig. 6A) pivotally mounted at its upper end on an arm 128 and at its lower end on a plain link (not shown) pivoted on the pin that carries detent 108. The bar 127 has two slots cut therein which normally lie opposite the pins 117 which extend through the keys 73 and 74. It can be seen that when either the "Item" key 73 or the "Total" key is depressed, the appropriate pin 117 will enter its slot in the bar 127 and move said detent downwardly. This movement will rock the arm 128 counter-clockwise. This arm carries a pin 129 which cooperates with a bifurcated arm 130 loose on a shaft 131, supported by the right hand side frame of the machine. Fastened to the arm 130 is an arm 132 (Figs. 6 and 7) having a squared end against which abuts a flattened stud 133 carried by an arm 134 fast on a hub 138 loose on the release shaft 91. The hub 138 has integral therewith an arm 139 which extends over a pin 140 carried by an arm 141 fast on shaft 91. This shaft is constantly under spring tension in counter-clockwise direction (Fig. 7), but is normally prevented from rotating due to the engagement of the stud 133 carried by arm 134 with the arm 132. As the arm 134 cannot move, due to the above described condition, the arm 139 prevents the shaft 91 from rotating as it stands in the path of pin 140 on arm 141 fast on said shaft.

Loose on shaft 131 is a lever 135 having a projection 136 which normally rests against the lower side of the flattened stud 133. A spring 137 extending between studs mounted in the arm 132 and lever 135 tends to hold these parts in the positions shown in Fig. 7.

It will be recalled that when either of the release keys 73 or 74 is depressed the detent 127 is moved downwardly, thereby rocking the arm 128 counter-clockwise (Fig. 7). As the arm 128 carries the pin 129 extending through the bifurcated arm 130, this arm and the arm 132 fast thereto will be rocked clockwise about shaft 131. This movement of the arm 132 will move the end of its projection upwardly and away from in front of the stud 133. As the projection 136 of arm 135 rests against the stud 133, it remains stationary and said stud carried by its arm 134 moves counter-clockwise about shaft 91 and between the projections of arm 132 and lever 135, due to the fact that the pin 140 carried by the arm 141 is constantly pressing against arm 139 integral with the hub 138 and the arm 134. This rocking movement of the shaft 91 closes the circuits for the electric motor in a manner to be hereinafter described.

At the end of the operation of the machine, the shaft 91 is rocked clockwise slightly past normal position and then counter-clockwise to normal. The arm 141 is fast on said shaft 91 and carries pin 140, and is rocked with said shaft. This causes the pin 140 to contact with an edge 145 of a lever 143 loose on shaft 131. This lever has a tail 144 extending beneath an extension of pin 133 carried by arm 134. It can be seen, therefore, that when the shaft 91 is given its clockwise movement (Figs. 6 and 7), the pin 140 will press down on the edge 145 and cam the lever 143 clockwise about shaft 91. This will bring the tail 144 into engagement with the pin 133 and will rock the arm 134 and hub 138 clockwise. When the pin 133 passes beyond the end of the arm 132, this arm will snap downwardly in front of the pin, due to the tension of a spring 1450 stretched between a lug on detent 127 and a pin on the key frame and counter-clockwise rotation of the shaft 91 is prevented by the engagement of the arm 132 with the flat side of the pin 133 until the depression of a release key 73 or 74 again moves the arm 132 out of the way.

Sequence of operation

To insure that the operator shall make a complete record of the transaction, mechanism is provided to prevent him from releasing the machine until a "transaction" key, a "clerk's" key and one of the two release keys have been depressed in the above mentioned sequence.

It will be remembered that when one of the "clerks'" keys 72 or one of the release keys 73 or 74 is depressed, its corresponding detent is moved down. To prevent the depression of these keys, there are provided two pins, a pin 162 for the clerks' keys (Fig. 11) and a pin 151 (Fig. 9) for the release keys. These pins 162 and 151 are located on the detent-supporting arms 102 and 128, respectively. Fast on hubs 152 and 153 (Fig. 11) loose on shaft 131 are two arms 154 and 155, respectively, which extend upwardly and are normally just beneath the pins 162 and 151, thereby preventing downward movement of these pins, and therefore, of the arms 102 and 128 and the detents 96 and 127. This obstruction to the movement of the detents, of course, prevents depression of any keys in their corresponding banks until these obstructions are removed.

In order to remove these obstructions when the proper keys are depressed, the following mechanism is provided. Freely mounted on shaft 91 is an arm 156 (Fig. 12) having a surface 157 just beneath a pin 150 for the transaction bank. This arm 156 also carries a pin 158 adapted to be held in engagement with an inclined edge 159 of an arm 160 fast on the hub 152, by spring 104 extending between a pin on arm 160 and a pin on arm 103. It can be seen, therefore, that when one of the "transaction" keys is depressed, the pin 150 strikes edge 157 of arm 156 and rocks it clockwise (Fig. 12). The pin 158 on arm 156 then strikes the inclined edge 159 of the arm 160 and rocks this arm, its hub 152 and the arm 154 fast thereon counter-clockwise far enough so that the arm 154 is no longer in the path of the pin 162, associated with the clerks' keys, thus permitting movement of the detent 96 for the clerks' keys which can now be depressed.

The release keys are still held against depression, and it is necessary to depress one of the clerks' keys 72 in order to permit such depression. When this is done, the pin 162 carried by the arm 102 for the clerks' keys (Fig. 11) contacts with an arm 164 identical with arm 156. The arm 164 carries a pin 165 engaging the inclined edge of an arm 166 fast on the hub 153. On the opposite end of this hub is the arm 155 which normally rests beneath the pin 151 (Fig. 9) on the arm 128 for the release bank. It is clear that when a "clerk's" key is depressed, the arm 155 will be rocked out from under the pin 151 to permit the depression of the "release" keys to release the machine, as above described.

Fast on the release shaft 91 is a lever 170 (Fig. 2), having a hook 171 cooperating with a roller 172 mounted on a locking arm 173 pivoted on the stud 105 projecting from the machine side frame 51. Rigidly secured to the arm 173 is an arm 176. A spring 175 is stretched between the end of arm 176 and a pin on frame 51.

Also rigidly secured to arm 173 is a locking lever 177 normally in engagement with a shoulder 188 formed on disk 57 and a shoulder on a disk (not shown) loose on the stud 52. As lever 177 is integral with arm 173, it will be rocked counter-clockwise out of locking position upon the movement of the release shaft 91 to enable the shaft 62 to be rotated by the motor when the contact is made.

Behind the disk 57 (Fig. 2) is another disk (not shown), loose on the stud 52, which is normally under spring tension and which, when released by the movement of the locking lever 170, rocks a lever 179 pivoted on side frame 51, by means of a cam surface in its periphery. The lever 179 has a finger 180 which cooperates with a roller 181 carried by an arm 182 pivoted to the motor frame and rocks said arm clockwise (Fig. 2). This arm has a projection which carries insulating material 183 and when said arm 182 is rocked the insulating material engages and depresses two spring contacts 184 far enough to make contact with stationary contacts 185 (Fig. 2). The circuit through the motor is thereby closed and the motor operated.

Just before the end of the operation, the beforementioned disk (not shown) which closes the motor circuit, is arrested, thereby permitting the lever 179 to be rocked counter-clockwise as the spring contacts move to break the circuit. Pivoted to arm 173 is a depending arm 186 which at its lower end cooperates with a roller 187 carried by gear 60. Near the end of the operation the roller 187 comes into contact with the lower end of arm 186 and raises it, thereby rocking arm 173 and lever 177 clockwise. This brings the end of lever 177 into the path of shoulder 188 and when they contact the clutch connection is broken and the drive shaft stopped in its normal position. The hook 171 is returned to its normal position at the end of the operation in a manner to be presently described and assumes its position beneath the roller 172 on arm 173 to retain this arm and lever 177 in their normal positions.

To insure the complete return to normal position of the drive shaft 62, there is provided a cam 189 (Fig. 3) mounted on a hub which also carries gear 68 and which is fast on shaft 62. Cooperating with this cam is a roller 190 carried by an arm 191 pivoted to the side frame 63. Fastened to the opposite end of arm 191 is a powerful spring 192 extending between said arm and a stud 193 in frame 63. It can be seen that, as the shaft 62 rotates, the cam 189 will rock arm 191 clockwise and stretch spring 192. Then just before the end of the rotation, the roller 190 passes a high point on the cam and the spring 192 rocks the arm 191 clockwise, thereby forcing said shaft to rotate to its home position.

The means for restoring the shaft 91 to normal position at the end of an operation will now be described.

When the shaft 91 is released, it is rocked counter-clockwise (Fig. 7) by a spring 194 (Fig. 3). This spring is carried by two pilot arms 195, the upper ends of which surround a stud 200 carried by an arm 201 fast on shaft 91. The spring 194 is compressed between shoulders on the arms 195 and the lower end of a slot 202 in a link 203, the upper end of which also surrounds stud 200. Pivoted on a stud 204 in the side frame 63 is an arm 205 which carries a pin 206 projecting through an opening 207 in the link 203. This arm 205 also carries a roller 208 projecting into a cam groove 209 in the gear 66. This gear receives a one-half rotation at every adding operation of the register. Just before the gear finishes its one-half rotation, a node 210 of the cam groove 209 cooperates with a roller 208 on the arm 205 to first lower and then raise said arm. When the shaft 91 is released, the stud 200 moves to the upper end 218 of the slot 202 in link 203 under the influence of the spring 194. When, therefore, the arm 205 is lowered, as above described, the link 203 is lowered to its normal position due to the engagement of the pin 206 on the arm 205 with a shoulder 211 on the link 203.

*Total lever*

The total lever 75 is integral with a nearly circular plate 212 (Fig. 18A) loose on a bearing 213 surrounding a rod 214, one end of which is carried by a plate 215, the other end of the rod being held by a screw 219 (Fig. 18B) in the frame 63. The plate 215 has two arms 216 mounted on rods 217 extending between the frames 51 and 63. This total lever, through mechanism to be hereinafter described, controls the machine for total and sub-total printing operations.

*Interlocking mechanism*

An interlocking mechanism cooperates with the total lever plate 212 for preventing movement of the release shaft 91 to prevent release of the operating mechanism when the lever 75 is out of any of its seven positions. This mechanism also locks the total lever 75 in the position to which it has been moved until the completion of the operation of the main operating mechanism. Loose on the shaft 91 is an arm 335 (Fig. 19) having integral therewith a yoke 336 also integral with an arm 337 loose on the shaft 91.

The arm 337 has a slot 338 receiving a pin 339 projecting from the arms 130 and 132. The arm 335 carries a pin 340 normally engaging the upper edge of an arm 341 loose on the shaft 131. Integral with the arm 341 is a yoke 342 having integral therewith an arm 343 loose on shaft 131. A spring 344 holds the arm 341 in engagement with the pin 340. As previously described, the arm 130 is rocked counter-clockwise (Fig. 19) upon depression of either of the release keys 73 or 74. This movement, through the pin 339, rocks the arm 337 and 335 clockwise, whereby the pin 340 rocks the arm 341 clockwise so that a right angle toe 345 thereof engages one of a plurality of notches 346 in the plate 212. There is a notch 346 for each of the seven positions of the total lever 75. If the total lever is not in the exact position, the toe 345 of the arm 341 strikes the true periphery of the plate 212 and prevents the arm 335 from being rocked, consequently preventing complete depression of one of the keys 73 or 74 which is necessary to release the operating mechanism. The arm 343 carries a roller normally located in a notch 347 (Fig. 19) in the periphery of a spider 311, which is oscillated first clockwise and then counter-clockwise for the purpose of engaging and disengaging the totalizer lines with and from the actuators, as will be later described. Clockwise movement of said spider carries the edge 348 of the spider under the roller, thereby positively holding the toe 345 of the arm 341 in engagement with the notch 346 during the time the totalizers are being rocked into engagement with and out of engagement from their actuating mechanism and after the release shaft has carried the pin 340 away from the arm 341.

When any of the amount keys 70 are depressed it is very essential that the total lever 75 be in its adding position before either of the release keys are depressed, to release the machine. One of the amount keys 70 may be depressed and the operator may accidentally move the lever 75 out of its adding position and then depress one of the keys 73 or 74 to release the machine. If it was possible to release the machine with the total lever out of its proper adding position, some of the various mechanisms in the machine would interfere with each other during their operation and cause jamming which would render the machine useless.

To prevent this there is loose on the shaft 131 a bell crank 349 (Figs. 18A and 20) to which is pivoted a link 350 also pivoted to a lever 351 mounted on a stud 352 carried by a plate 291 (Fig. 18B). Also pivoted on the stud 352 is a lever 353 which carries a pin 354 projecting into a slot 355 in the plate 212. The lever 351 carries a stud 356 projecting into a slot 357 in the lever 353. A spring 358 compressed between extensions on the levers 351 and 353 holds them in the positions shown in Fig. 20. From the above description it can be clearly seen that if any of the amount keys 70 are depressed and the total lever 75 accidentally moved either up or down before one of the release keys is depressed, such movement of the lever 75 will, through the pin 354 and slot 355, rock the lever 353 counter-clockwise. This movement of the lever 353, through the spring 358, rocks the lever 351 counter-clockwise and through the link 350, rocks the bell crank 349 clockwise to shift the edge 360 thereof in front of the pin 133. Further movement of said bell crank is prevented by means to be hereinafter described in connection with totalizing operations, thereby preventing the arm 134 and therefore the shaft 91, from being rocked to release the operating mechanism.

When the total lever 75 is in adding position and the shaft 91 rocked by depression of either of the release keys, to release the operating mechanism, the pin 133 is rocked beneath the bell crank 349, thereby preventing any movement of the total lever 75 out of its adding position.

Differential mechanism

The differential mechanisms of the machine operate the different totalizers and select them for operation, and also set type carriers in both the upper and lower printing mechanisms as controlled by the keys in these banks. The amount differential mechanism will be described first.

Amount differential units

There is one complete differential unit for each amount bank, but as they are identical in construction and operation, only one will be described.

To drive the differential mechanism of the machine, the drive shaft 62 is provided with a plurality of pairs of cams 220 and 221 (Figs. 5 and 6), each pair cooperating with rollers 222 and 223 respectively, carried by Y-shaped levers 224 of which there is one for each bank of keys in the machine. Each of these levers 224 is pivoted at 225 on a corresponding frame 226. Loosely mounted on hollow studs 227 carried by the frames 226, which support the differential units adjacent the amount banks of keys (Fig. 5), are differentially movable actuators 228 carrying segments 229 and transfer arms 230 for operating their respective totalizer pinions 231. All the differential units are tied together by a tie rod 199 extending through the hollow studs 227. The levers 224, at the ends of their upwardly extending arms, are pivotally connected by links 232 to driving segments 233 loose on the studs 227. The driving segments 233 at points adjacent the banks of amount keys, are connected to the differentially movable actuators 228 by latches 234, each of which is supported by an arm 235 and a lever 236 pivoted on the corresponding differentially movable actuator. Springs (not shown) hold the rear ends of the latches 234 in engagement with shoulders on the driving segments. When the segments 233 are driven by their cams 220 and 221, the differentially movable actuators 228 are carried with their latches up to points where the forwardly extending arms of the levers 236 engage the depressed amount keys. Such engagement results in disengagement of the latches from the driving segments and engagement of the forward ends of the latches with the particular one of a series of notches 237 formed in a plate 238, supported by the frame 226, which is opposite the latch when it is disengaged. Upon the return movement of the driving segments to normal position a pin 239, mounted on each of the differentially movable actuators 228, is engaged by the inside of the driving segment and is returned thereby with its actuator to normal position. If a key is not depressed in an amount bank, the zero stop pawl 86 for that particular bank operates to arrest the differentially movable actuator in its zero position. When a key is depressed the zero stop pawl is moved out of operative position, as above described.

Transaction and clerks' differential mechanism

As before mentioned, the transaction and clerks' keys are in the same bank, this construction being known in the art as a "divided bank". This necessitates the use of two differential mechanisms with this bank. In their construction and operation they are very similar to those used with the amount banks which have been described, the actuators 228 being omitted and arms 240 substituted therefor. These arms are mounted on the studs 227 on opposite sides of a driving segment 245 (Figs. 10 and 10A). They each carry at latch 241 supported by an arm 242 and a lever 243. These latches both cooperate with a shoulder 244 on the common driving segment 245 which lies between them, and is driven by one of the Y-shaped levers 224 and a link 232 as previously described.

The transaction keys have straight shanks 246 and the lever 243 therefor abuts against the end of the depressed key when said lever is given its upward travel, which disconnects the latch 241 from the driving segment 245, as shown in Fig. 10. The lever 243 for the clerks' keys is not in the plane of the key shanks 246, and therefore it passes by the "transaction" keys. The "clerks'" keys however have blocks 247 (Figs. 10 and 10A) fast on the sides of the key shanks 246, said blocks extending into the path of and acting as stops for the lever 243 appropriate to these keys.

As the transaction and clerks' keys are both located in this bank, there are two zero stop pawls provided, one for each group of keys. One of these pawls and the mechanism for rocking it out of effective position is shown in Fig. 10 and in detail in Fig. 63.

These two zero stop pawls 248 are provided for disconnecting the latch of whichever one of the differentially movable arms 240 it is not desired to operate, in the zero position. This will only occur, however, an operations when a clerks' or a transaction total is to be taken, as in adding operations, it is necessary to depress keys in both of these groups before the machine can be operated.

The detent 94 for the transaction keys as previously described is mounted at its lower end on the arm 101. This arm has a downwardly extending angle arm 123, which cooperates with a pin 124 carried by an arm 146 pivoted on a short shaft 147. The pin 124 extends through a slot 148 in the zero stop pawl 248. This pawl is formed with a shoulder near its upper end normally engaged by a spring pressed pawl 149.

When a transaction key is depressed the arm 101 is rocked counter-clockwise (Fig. 10) and, through the pin 124 (Fig. 63), rocks the arm 146 clockwise about its pivot. This arm has an upwardly extending finger 196 bent over into the plane of the zero stop pawl and which cooperates with a notch 197 in the lower side of pawl 149. The arm 146 is held in its normal position by a spring 198 extending between a projection on said arm and a pin on the key frame.

It can be seen from the above that when the arm 101 is rocked by the depression of a transaction key and, through pin 124, rocks arm 146, the zero stop pawl will not be moved until the pin 124 reaches the end of slot 148 therein. This gives the finger 196 of the arm 146 time enough to remove the pawl 149 from the shoulder on the zero stop pawl which can then rock to its ineffective position. A duplicate pawl and cooperating mechanism for the clerks' keys is located on the other side of the key frame 80.

Release bank differential

The differential for the release bank is identically the same as either of those in the "clerks'" and "transaction" bank. There is a differentially movable arm 250 (Fig. 6) carrying an arm 251 and a bell crank 252 which, in turn, carry a latch 253 cooperating with a shoulder 254 on a driving segment 255. This segment is driven by one of the links 232 and Y-shaped levers 224 above described. This bank has only two keys so there are only two positions in which the latch is disengaged, and as one of these keys must be depressed at every operation no zero stop pawl is provided. The release bank, through its differential mechanism, sets up various conditions in the printing mechanism which will be hereinafter described.

Totalizers

The totalizers shown are well known, and therefore, only a brief description thereof will be given herein. Reference may be made to the patents beforementioned herein if a more extensive description thereof is desired.

There are three lines of totalizers in the machine. Two of these lines consist of a plurality of totalizers, each comprising a plurality of totalizer pinions 231 (Figs. 5, 16 and 17) loosely mounted on a tube 257 supported by frames 258. These frames are slidably mounted on a shaft 259. One of these lines of totalizers is shown in each of Figs. 16 and 17. Each totalizer of the individual totalizers consists of one pinion in each group of pinions. Therefore, if the first pinion of each group of pinions is engaged with the differential actuators a certain totalizer will be operated, and if the totalizer line is shifted so that the second pinion in each group is engaged a different totalizer will be operated, etc. One of these lines, however, is the item totalizer (Fig. 15), which has only one set or group of pinions 231. As there is only one totalizer on this line, there is, of course, no means provided for shifting it.

Totalizer selecting mechanism

Figure 13:
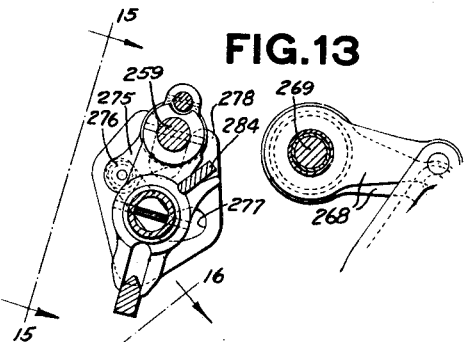
Fig. 13 is a detail side elevation of the three totalizer lines and part of the mechanism for sliding them to select the desired totalizers.

In order to shift the totalizer lines so as to bring any desired one of the totalizers to the position in which it will be engaged with the differential actuators (Fig. 16), each of the frames for the "transaction" and "clerks'" totalizers carries a boss 260 (Fig. 13) in which is secured a rod 261 provided with a roller 262 extending into a cam groove 263 in a cam 264 rotatably mounted on a stud 265 projecting from the frame 51. There is one of these cams for each totalizer line with the exception of the item totalizer. Each cam has a rearwardly extending arm 266 to which is pivoted a link 267 which, at its upper end, is pivoted to the end of an arm 268 fast on a sleeve surrounding a shaft 269 supported by the side frames 51 and 63. Also secured to the corresponding sleeves surrounding shaft 269 are two segments, 270, (Fig. 10) cooperating with the "transaction" keys, and 271, cooperating with the "clerks'" keys. Each of the differentially movable arms 240 and 250 for the "clerks'" and "transaction" keys and release keys and the differential actuators 228, has pivoted thereto a beam 272 which extends rearwardly and at its rear end is bifurcated to straddle a roller 273 carried by a link 274 which, at its upper end, is pivoted to its appropriate segment 270 or 271, and at its lower end to an arm 307 pivoted on a rod 308 supported by the machine side frames. Fast on this arm is a spiral segment 309 which will be described later. These beams 272 are operated by a roller 361 carried by the Y-shaped levers 224 in a manner well known in the art.

It can be seen, therefore, that when the machine is operated the differential mechanisms for the "clerks'" and "transaction" keys move the links 274 differentially and through segments 270 and 271, the sleeves surrounding shaft 269, arms 268 and links 267 will move cams 264 to a like extent. This movement of the cams will cause the totalizer lines to be shifted laterally of the machine to move the totalizer, corresponding to the key depressed, into position to be engaged.

Totalizer engaging mechanism

Figure 5A:
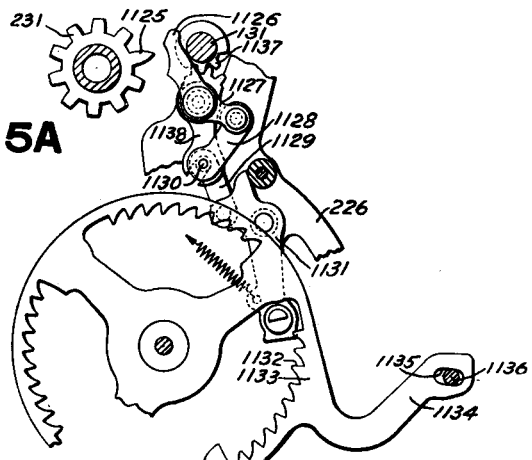
Fig. 5A is a detail view of the mechanism for breaking the differential latches under control of the totalizer elements on totalizing operations.
Figure 5:
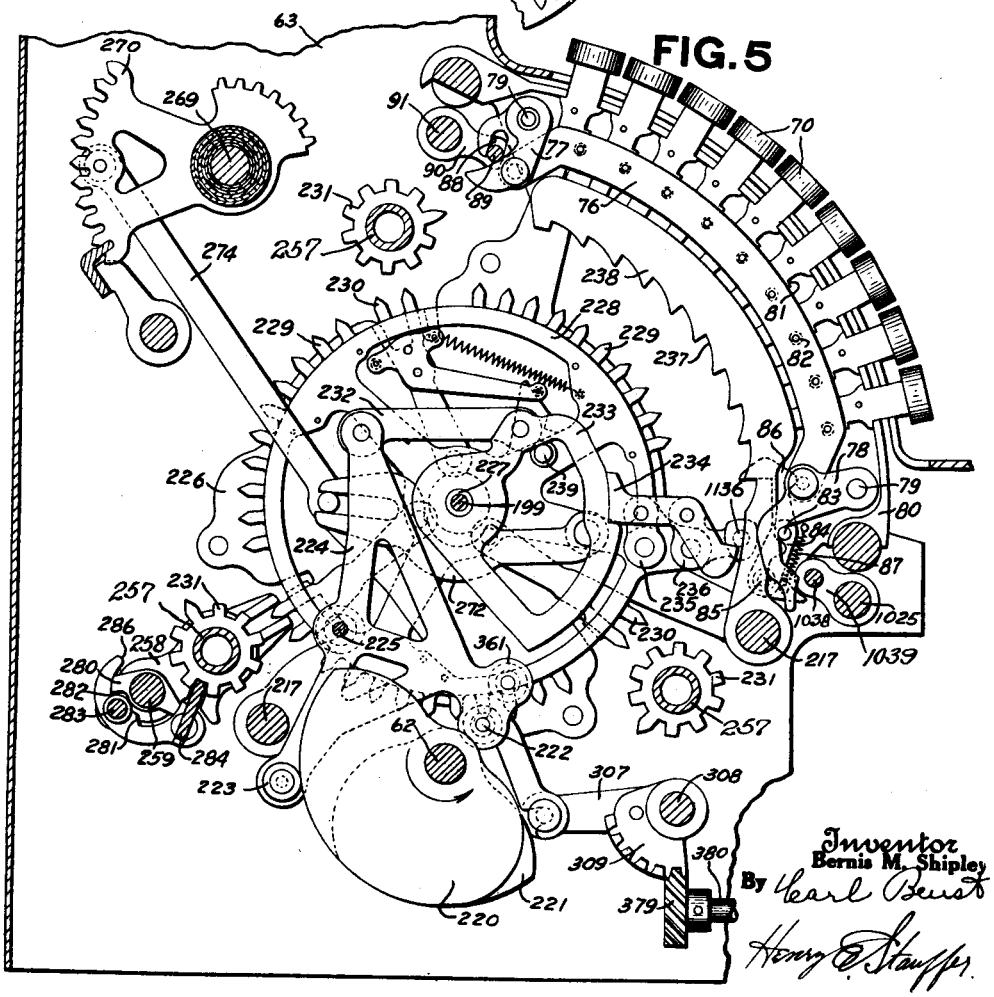
Fig. 5 is a sectional view taken to the left of one of the amount banks and looking towards the right.
Figure 14:
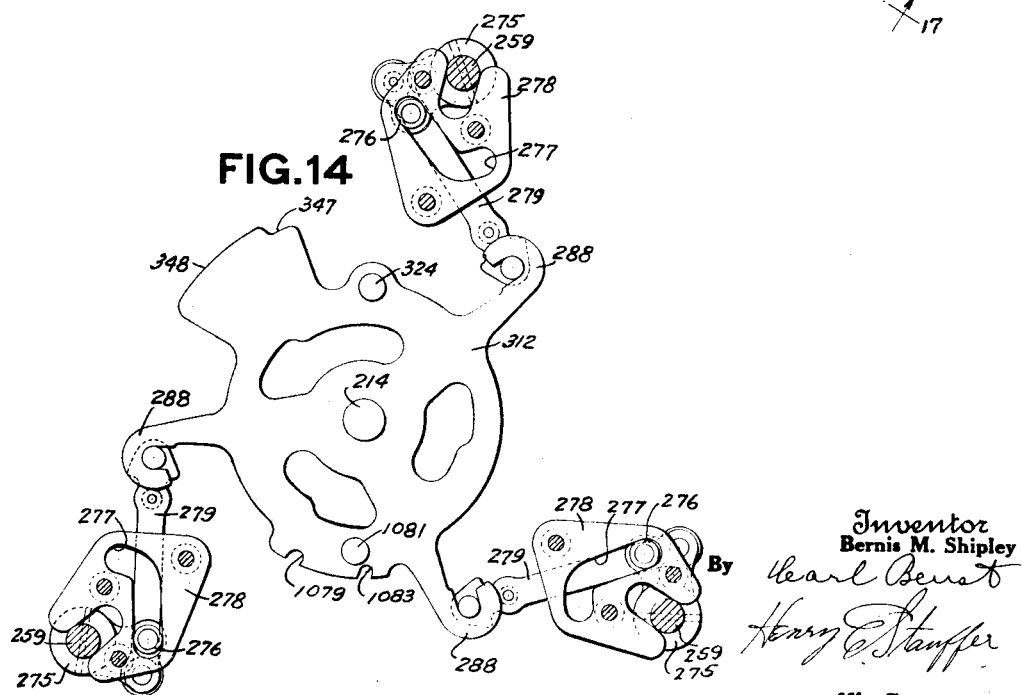
Fig. 14 is a detail view of the mechanism for rocking the three totalizer lines into engagement with their actuators.

The mechanism for moving the totalizer lines to engage the selected totalizers with the differential actuators for the purpose of operating the selected totalizers will now be described. Near each end of the shafts 259 is an arm 275 (Figs. 13, 14, 15, 16, 17 and 18B) carrying a roller 276 projecting into a cam slot 277 in the respective plates 278 fixed to the frames 51 and 63. Pivoted to each arm 275 on the right hand side of the machine is a link 279, moved by means to be hereinafter described, to rock the shafts 259 counter-clockwise (Figs. 13 and 14), and clockwise (Fig. 5). The movement of the shaft 259 through the engagement of the rollers 276 with the cam slots 277 in plates 278, causes the shaft 259 and frames 258 carrying the totalizer pinions 231 to be slid radially inwardly toward the center of the machine, whereupon said pinions engage the differential segments 229. This engagement takes place in adding operations after the differential segments have been positioned under the control of the depressed amount keys 70. When said segments are returned to their normal positions the amount which was placed thereon is accumulated upon the totalizer pinions, after which the links 279 are again moved to disengage said pinions from the differential segments.

When the shaft 259 is rocked clockwise (Fig. 5), a pair of cam levers 280, one at each end of the shaft, engage shoulders 281 of rocker arms 282 pivoted on a rod 283 and rock said arms clockwise (Fig. 5). These rocker arms carry an alining bar 284 normally in engagement with all the pinions 231 on that particular line when they are out of engagement with the differential mechanism. When the rocker arms 282 are rocked clockwise by the cam levers 280, the bar 284 is withdrawn from the pinions 231 to allow the selected ones to be rotated. When the selected pinions 231 are in engagement with the segments 229 the remaining pinions are in engagement with lugs 285 (Fig. 16) on the plates 226 which prevent those pinions 231 which are not in alinement with the segments 229 from being turned. When the totalizers are moved out of engagement the cam levers 280 strike a surface 286 of the rocker arms 282 and rock said arms counter-clockwise to normal, thereby engaging the bar 284 with the totalizer pinions 231.

Engaging controlling mechanism

From the above description it can be seen how the totalizer lines are rocked to bring the selected totalizers into engagement with the differential segments 229.

In machines of this type it is generally desired to have a varying number of totalizer lines rock into engagement with the differential actuators on adding operations. It is desirable herein to have the mechanism so arranged that all the lines will be rocked in except under two conditions. When the transaction consists of only one item, and therefore, when the "total" key 74 is depressed, it is not desired to have the item totalizer rock in, as this would entail an extra operation for the purpose of clearing this totalizer before a transaction consisting of several items could be entered. The other condition where it is not desirable to have all of the totalizer lines rock in, is in a "paid out" transaction. The machine is so constructed that the amount will be added on the "paid out" totalizer only and not only the clerk's or the item totalizers. The manner in which this control of the engaging mechanism is effected will now be described.

After the totalizer lines have been shifted to position them to be operated by the differential segments 229, the selected totalizer pinions 231 are rocked into mesh with said segments. Loose on the hub 213 previously mentioned is a three-armed lever 287 (Fig. 18A). Associated with each of the arms 288 of the lever 287 is a lever 289 pivoted on a stud 290 (Fig. 18A) on a plate 291 (Fig. 18B) supported by hub 213. Pivoted on a stud 292 on the lever 289 is a lever 293 having a slot 294 into which projects a pin 295 carried by the previously described link 279. Pivoted on the stud 292 of the lever 289 associated with the "back" totalizers is a link 296 carrying a pin 297 engaged by a hook 298 of a lever 299 pivoted on a stud 300 on the plate 291. The lever 299 has a roller 301 projecting into a cam race 302 of a disk 303 fast on the shaft 62. The configuration of the cam race is such that during the clockwise rotation of the disk 303 the lever 299 is rocked counter-clockwise, thereby lowering the link 296 and rocking the lever 289 clockwise. Through the engagement of said lever with arm 288 the lever 287 is rocked counter-clockwise, thereby rocking the other two levers 289 clockwise. This rocks the levers 293 counter-clockwise with the pin 295 as the fulcrum until pins 304 on said levers 293 strike the outer edges of slots 305 in the plate 212, whereupon the levers rock counter-clockwise with the pins 304 as the fulcrum. This last movement of the levers 293 rocks the links 279 clockwise and disengages pins 306 thereon from hooks 311 carried by a spider 312 rotatably mounted on hub 213, if said pins were engaged by the hooks at the last operation.

Each lever 293 has a pin 304 projecting into the planes of disks 313 and 314, loose on hub 213 and spaced from the lever 287 by a collar 315 also loose on the hub. Springs 310 tend to hold the pins 304 against the disks 313 and 314. The disks have pivoted thereto links 316 and 317 also pivoted to arms 318 and 319 secured to a sleeve 320 and shaft 269, respectively. On the other end of the sleeve 320 is secured a segment 270 (Fig. 10) to which is pivoted the link 274 appropriate to the transaction bank. Pinned to the shaft 269 is a segment 321 similar to segments 270 and 271 for the "transaction" and "clerks'" bank and to this segment is pivoted a link 322 (Fig. 6) identical with segments 270 and 271 previously described. These links 322 and 274 are moved by beams 272 operated by the transaction and release differentials. Thus it can be seen that the disks 313 and 314 are differentially movable into a plurality of positions under the control of the keys 71, 73 and 74. As shown in Fig. 18A, the disks are in normal position.

When the lever 299 is rocked clockwise to normal position the lever 289 associated with the back totalizer is rocked counter-clockwise to normal position. This movement of the levers 289 starts to rock the levers 293 clockwise with the pin 295 as the pivot point, as above described. However, with the disks in the positions shown, the pins 304 strike the outer peripheries of said disks, thereby causing the levers 293 to be rocked clockwise with the pins 304 as the fulcrums.

This clockwise movement of the levers 293 rocks the links 279 counter-clockwise and engages the pins 306 which project through slots 323 in the plate 291, with the hooks 311 on the spider 312, as shown in Fig. 18B. Said spider 312 carries a stud 324 engaged by a notch 325 of a link 326 pivoted at 327 to a lever 328 mounted on a stud 329 on the frame 63. The lever 328 carries two anti-friction rollers 330 and 331 which cooperate with cams 332 and 333, respectively, fast on the shaft 62.

Clockwise movement of the cams 332 and 333 through the rollers 330 and 331, rocks the lever 328 first clockwise and then counter-clockwise to normal position. The clockwise movement of lever 328 moves the link 326 to the right (Fig. 18B), thereby rocking the spider 312 clockwise. As the pins 306 are engaged by the hooks 311, it can be clearly seen that the pins will be moved in the long portions of the slots 323 whereby, through the links 279 the arms 275 are rocked counter-clockwise (Figs. 14 and 18B) to shift the rollers 276 on the arms 275 along the slots 277 of the plates 278 and, as previously described, move the totalizer pinions 231 into engagement with the differential segments 229. When the lever 328 is rocked counter-clockwise to normal position the link 326 is moved to the left, thereby reversing the movement of the spider 312 and moving the studs 306 and consequently the links 279 to the positions shown.

It can be seen from the above description that in order to operate the machine it is necessary to depress a "transaction" key, a "clerk's" key, and then either the "item" or the "total" key. It will also be remembered that the differential mechanism for the "transaction" keys sets the disk 313 and the differential mechanism for the "release" keys sets the disk 314. On all adding operations except two it is desired to have all these lines of totalizers rock, to move the selected totalizer thereon, into engagement with the differential segments. When the "total" key 74 is depressed it is not desired to have the "item" totalizer rock in as this would necessitate an additional operation to clear this totalizer. As can be seen from Fig. 18A, there is a notch in the periphery of the disk 314 opposite the sixth position on said disk. If the "total" key is depressed the disk will be differentially moved to bring this notch into a position opposite the pin 304 for the upper totalizer line. The pins 304 for the front and back totalizer lines will be resting against the unmutilated periphery of disk 313. During this operation of the machine, the clockwise movement of the levers 289 disengages the pins 306 from the hooks 311. When the levers 289 rock counter-clockwise to normal the lever 293 associated with the "upper" totalizer line is rocked clockwise about the pin 295 and as there is a notch opposite the pin 304, this pin will enter said notch and the pin 306 will not engage its hook 311. The appropriate spring 310 will hold the lever in this position. The pins 304 for the "front" and "back" totalizer lines engage the unmutilated periphery of disk 313 when their levers 289 are rocked counter-clockwise, thus causing a clockwise movement of the levers 293 about the pins 304 which movement engages the pins 306 with the hooks 311 of the spider 312.

Therefore, when the spider 312 is rocked clockwise (Figs. 14 and 18B) only the "front" and "back" totalizer lines are moved to engage the selected totalizer with the differential segments.

It will be noticed that there is also a notch in the disk 313 opposite the "1" position of the "back" or "clerks'" totalizer line. This is the position associated with the "paid out" key. When this key is operated it is not desired to have any "clerk's" totalizer rocked in as only credit items should be entered on these totalizers. As above explained with regard to the "total" key, no "clerk's" totalizer can be rocked in when the notch in plate 313 is opposite the pin 304. This will not be described again, as the operations are identical in this respect.

Printer

The printing mechanism is located in front of the machine proper. The framework for this mechanism includes a front frame 365, an intermediate frame 366 and a rear frame 367 (Figs. 6, 10, 21, 25, 26, 27, 30, 34 and 40), all mounted upon the base of the machine.

The entire printing mechanism is driven by the main drive shaft 62 of the cash register. The main drive shaft 62 has secured near its left hand end a spiral gear 368 (Fig. 23) meshing with a spiral pinion 369 fast on a sleeve 370 loose on a shaft 371. The front end of the shaft 371 is mounted in the frame 365 and the rear end in a bracket 372 secured to the base of the machine. Fast on the sleeve 370 is a disk 373 upon which is pivotally mounted a driving pawl 374 and a retaining pawl 375 held in their normal positions by a spring 376. Secured to the shaft 371 is a disk 377 provided with a boss 378 normally engaged by the driving pawl 374. The retaining pawl 375 normally rests against the unmutilated periphery of the disk 377 in such a position that there is a slight clearance between said pawl and the boss 378.

From the above description it will be seen that with the parts in the positions illustrated in Figs. 23 and 24, a clockwise rotation of the shaft 62 rotates the disk 373 counter-clockwise and through the engagement of the pawl 374 with the boss 378 fast on the shaft 371, rotates said shaft counter-clockwise. The pawl 375 serves to prevent the shaft 371 from any excessive overthrow movement.

Meshing with each of the spiral segments 309 (Figs. 5, 6 and 10) actuated by the movement of the differential mechanisms as previously described, is a spiral gear 379 secured to a shaft 380 mounted in the intermediate frame 366 and a bracket 381 carried by the rear frame 367. The shafts 380 are held against lateral movement by the hubs of the gears 379 on one side of the bracket 381 and by collars 382 fast on said shafts on the opposite side of the bracket.

There is one spiral gear 379 associated with each of the amount banks, the clerks' keys, the transaction keys, and the release bank.

Secured to each shaft 380 is a segment 383 (Fig. 46). Meshing with the segments 383 are teeth 384 of racks 385. These racks each have slots 386 and 387 through which rods 388 and 389 extend, respectively. The racks are spaced by collars (not shown) surrounding rods 388 and 389.

From the above description it is clear that the differential movements of the differentially movable actuators 229, arms 240 and 250, through the spiral segments 309, spiral gears 379, shafts 380, and segments 383, are transmitted to the racks 385.

Rack aliners

The racks 385 have alining notches 390 (Figs. 46 and 49). Cooperating with these notches is an aliner 391 supported by bosses 392 and 393 integral with frames 366 and 367, respectively (Figs. 25 and 46). Fast on a shaft 394 are two arms 395 and 396 which project into slots in the aliner 391. Also fast on shaft 394 is an arm 401 (Fig. 47) to which is pivoted a link 402 also pivoted to a lever 403 loose on a stud 404 on the frame 366. The lever 403 carries anti-friction rollers 405 and 406 cooperating with cams 407 and 408 fast on the printer shaft 371.

The aliner 391 is normally disengaged from the notches 390. After the racks 385 have been differentially positioned under the control of the keys, the cams 407 and 408 rock the lever 403 clockwise, whereby the link 402 turns the arm 401, shaft 394 and arms 395 and 396 counter-clockwise (Fig. 47) to rock the aliner 391 into engagement with the notches 390 on the racks 385, thereby maintaining said racks in proper alinement during the printing operations to be hereinafter described. After the printing has taken place the cams 407 and 408 rock the lever 403 counter-clockwise to normal position thereby disengaging the aliner 391 from the notches 390.

Tube lines

Associated with the racks 385 are two tube lines which are for setting the various type wheels as will be hereinafter described. These tube lines comprise nested tubes 410 (Figs. 34, 40, 46, 53 and 54) supported by shafts 411 and 412.

The tubes have secured at their upper ends (Figs. 53 and 54), gears 413 which mesh with teeth 414 (Fig. 46) on the upper edges of the racks 385. The racks 385 alternate in meshing with these gears 413. Secured to the lower ends (as viewed in Figs. 53 and 54), of the tubes 410 are gears 415. These gears 415 (Fig. 55), mesh with two sets of type wheels 416, one set loose on a long stud 417 (Fig. 55) and the other set loose on a long stud 418 mounted in the frame 366. At their outer ends these studs 417 and 418 support a plate 799 (Fig. 68). The type wheels print the amount, clerk's initial, and kind of transaction in a manner to be later described.

From the description just given, it is clear that the differential movement of the racks 385 under control of the keys 70, 71 and 72 is imparted to the type wheels 416 through the medium of the gears 415, tubes 410 and gears 413, thereby differentially setting said type wheels.

*Printer—Type wheel aliners*

As has been previously described, there is an alining mechanism for the racks 385. This alining mechanism in a way serves to aline the type wheels, but as there is a chance for the type wheels to get out of alinement due to lost motion through gears etc., another alining device is provided which cooperates with the gears 415 that mesh directly with the type wheels 416.

Loose on the stud 417 (Fig. 53) are parallel arms 420 and 421 connected by an alining bar 422 adapted to cooperate with the gears 415 on shaft 412. Loose on the stud 418 are parallel arms 423 (only one of which is shown in Fig. 55) connected by an alining bar 424 adapted to cooperate with the gears 415 on the shaft 411. The arm 420 has a stud 425 extending into a notch 426 (Fig. 40) of a slide 427 supported on the studs 417 and 418. The slide 427 also has another notch 428 receiving a stud 429 on one of the arms 423. A notch 430 of a bell crank lever 431 also receives the stud 429. The bell crank 431 is loose on the stud 418 and has another notch 432 receiving a pin 433 on an arm 434 fast on a shaft 435 mounted in the frames 366 and 367. Also fast on the shaft 435 is an arm 436 (Figs. 46 and 47) carrying a stud 437 projecting through a slot 438 in the link 402. A spring 439 stretched between the stud 437 and a stud 440 on the said link renders the connection between the link and arm 436 somewhat flexible. It will be remembered in connection with the rack alining mechanism that the link 402 is moved first to the right and then to the left to normal position. When this occurs the spring 439 rocks the arm 436, shaft 435 and arm 434 counter-clockwise. This movement, through the pin 433 and bell crank lever 431, rocks the arms 422 clockwise, thereby raising the alining bar 424 into engagement with the gears 415 on shaft 411. Clockwise movement of the arms 423 by means of the stud 429 raises the slide 427, and, through its engagement with the stud 425, rocks the arms 420 and 421 clockwise, thereby lowering the alining bar 422 into engagement with the gears 415 on the shaft 412.

It is to be understood that the alining of the gears 415 takes place at the same time that the racks 385 are alined by the aliner 391 as previously described. When the link 402 is moved to the left to normal position to disengage the aliner from the racks 385, it rocks the arm 436 clockwise to normal position and through the bell crank 431 and slide 427, rocks the arms 420 and 421 and arms 423 counter-clockwise to their normal positions, thereby raising the alining bar 422 and lowering the alining bar 424 to their normal positions.

*Printer—Date type wheels*

Loose on the studs 417 and 418 are four date type wheels 441 (Figs. 27 and 53). Meshing with these type wheels are gears 442 secured to the ends of nested sleeves 443 mounted on shaft 411. The sleeves 443 are connected by mortise and tenon, except the outside sleeve which is integral with its type wheel (Fig. 54), to sleeves which project outside of the cabinet of the machine, and are provided at their outer ends with knurled flanges 444 for the purpose of manually setting the date type wheels 441. The construction of the above parts is very much like that shown and described in the previously mentioned Patent, No. 1,619,796, granted to the present applicant on March 1, 1927, and reference may be had thereto for any further description of this mechanism.

A gear 398 (Fig. 27), and an aligner pawl 399 are provided for each date type wheel 441, to maintain them in proper alignment. The gears 398 are in mesh with the date type wheels 441 and are engaged by the spring-pressed aligning pawls 399 mounted on a stud 400 carried in the block 459. As the date wheels 441 are set, the gears 398 rotate, and the pawls 399 rock in and out of mesh with said gears. When the operator has rotated the knob 444 to the desired position, the type wheels 441 are in approximate alignment and the pawls 399 force them into absolute alignment, when the operator releases his grip on the knob 444. The pawls 399 compensate for all the lost motion between the knobs and the type wheels 441 to insure a true printing line from the date type wheels.

*Consecutive number type wheels*

Loose on the studs 417 and 418, between the date type wheels and the amount type wheels are five consecutive number type wheels 445 (Figs. 30, 32 and 53). Loose on a hub 446 surrounding stud 412 are gears 447 meshing with both sets of type wheels 445. Secured to the side of each gear 447 is a ratchet 448. Cooperating with the ratchets 448 is a differentially tined pawl 449 mounted on a rod 450 carried by parallel arms 451 and 452 (Fig. 33) loose on the hub 446. The arms 451 and 452 are made integral by a yoke 453. The arm 451 has teeth meshing with a segment 454 (Fig. 30), fast on a shaft 455 rotatably mounted in the frame 366 and block 469. Also fast on the shaft 455 is an arm 456 pivoted to a link 457 (Figs. 27, 30 and 34). The link 457 has a slot 458 receiving a pin 459 on a lever 460 fast on a shaft 461 mounted in the frames 365 and 366. Also fast on this shaft is an arm 462 (Fig. 27) to which is pivoted the right end of the pitman 463. The left end of the pitman is U-shaped and straddles a collar 464 on the shaft 371. The pitman 463 carries an antifriction roller 465 extending into a cam race 466 of a disk 467 fast on shaft 371.

This shaft, as previously described, makes one counter-clockwise rotation during each operation of the machine. The configuration of the cam race 466 is such that the pitman 463 is moved first to the left (Fig. 27) and rocks the arm 462, shaft 461 and the lever 460 counter-clockwise. This lowers the link 457 (Fig. 34) and rocks arm 456 and its supporting shaft clockwise, as seen in Figs. 34 and 40. Clockwise movement of this shaft rocks the segment 454 also clockwise and through its engagement with the teeth on arm 451 rocks this arm and arm 452 counter-clockwise (Figs. 30 and 32) to shift the pawl 449 upwardly which turns the units ratchet 448 one step in a counter-clockwise direction. The gear 447 being fast to said ratchet, receives the same movement and advances the consecutive number type wheels 445 one step. At this point in the cam race 466 there is a slight drop 495 (Fig 28) which moves the pitman 463 slightly to the right and, through the mechanism just mentioned, moves the tines of the pawl 449 downwardly away from the feeding edge of the ratchet 448. This is done because in feeding movements of this kind the pawls are always given a slight overthrow movement to insure that all clearances between the driver and the driven member will be taken up. Near the end of the rotation of shaft 371 the race 466 (Fig. 28) moves the pitman still farther to the right to its normal position, thereby lowering the pawl 449 to the position shown in Fig. 32.

To prevent retrograde movement of the ratchets 448 and gears 447 when the pawl 449 is being restored to its normal position, there is in engagement with the ratchets a set of spring pressed pawls 467 pivoted on a rod 468 supported by a block 469. These pawls also serve to aline the consecutive number type wheels 445 so that they will print in a straight line.

The transferring from the units to the tens and from tens to hundreds, etc. is accomplished by the provision of deep notches at the transfer points, which is old and very well known in the art and is shown in U. S. Letters Patent No. 589,114 of August 31, 1897, to F. H. Bickford.

To turn the consecutive number wheels to zero, a key 468 (Fig. 56) is inserted in the hub 446 and given a complete turn. The key is retained in the hub by spring-pressed pins which engage depressions in the key. This manner of turning the consecutive number wheels to zero is well known and only a brief description thereof will be given herein. The hub 446 has a groove 494 (Fig. 32) for engaging pawls (not shown) carried by each of the gears 447 adjacent the periphery of said hub so that as said hub is turned by the key the groove therein picks up the pawls during its rotation and rotates the gears 447 and consequently the type wheels 445 to their zero positions.

When items are being entered it is not desired to have the consecutive number driving device operate as each complete transaction only is numbered. The means for accomplishing this result will now be described.

It will be remembered that the link 457 (Fig. 34) is raised by a lever 460, the pin 459 of which engages a slot in said link. It is apparent that if this slot is removed from the pin 459 the link 457 will not be moved, and therefore, the consecutive number type wheels will not be moved.

Adjacent the key bank (Fig. 6), containing the "item" and the "total" keys is an arcuate bar 475 (Fig. 6) carried by an arm adapted to rock on the hub 227. In this bar are two slots 476 and 477 adapted to cooperate with the pins 117 of the keys 73 and 74. Slot 476 is radial, and therefore, the depression of the "total" key 74 will have no effect on said bar. The slot 477, however, is cut at an angle so that when the item key 73 is depressed the pin 117 will enter this slot and rock the bar 475 upwardly. A hook 478 on the arm which supports the bar 475 cooperates with a stud on the frame 226 to hold the bar 475 in normal position at the right-hand end of its path. Pivoted to a branch 479 of the arm 475 is a downwardly extending link 480 which at its lower end has a slot 481 cooperating with a pin 482 on an arm 483 loosely mounted on the rod 308. The arm 483 also carries a stud 484 (Figs. 46 and 47) which cooperates with a notch 485 in an arm 486 fast on a shaft 487 supported by the frames 366 and 367. Fast on the shaft 487 is an arm 488 (Figs. 34 and 40) pivotally connected by a link 489 to a lever 490 pinned to a shaft 491 rotatably mounted in the frames 365 and 366 (Fig. 26). The lever 490 has a downwardly extending arm 492 (Fig. 40) to the lower end of which is pivoted a link 493 which is, in turn, pivoted to the link 457 (Fig. 34) which drives the consecutive number operating mechanism.

It can be seen, therefore, that when the "item" key 73 is depressed its pin 117 will enter the slot 477 in the bar 475 and rock this plate upwardly which through link 480, rocks arm 483 counter-clockwise (Fig. 6) and through the stud 484, rocks the arm 486 and shaft 487 clockwise (Fig. 47). This movement is transmitted to the lever 490 by arm 488 and link 489 and rocks said lever 490 also clockwise (Fig. 40). As the downwardly extending arm 492 of lever 490 is connected by the link 493 to link 457 the latter link will be rocked counter-clockwise (Fig. 34) to disengage its slot 458 from the pin 459 and operation of the consecutive numbering device will, therefore, be prevented.

Fig. 61 shows a fragmentary section of the detail strip, illustrating the consecutive numbering. By inspecting this figure it will be seen that the uppermost entry is numbered "17,145". Each of the successive single item transactions are numbered consecutively to and including the first item numbered "17,150". But when the items of a multiple item transaction are entered, the numbering is not changed. When the item key 73 is depressed preparatory to the entry of the items of a multiple item transaction, the consecutive number operating mechanism is rendered ineffective, and, therefore, when printing these items on the detail strip, the previous consecutive number which, in the illustration, is number "17,150", is printed. However, this number has no significance, and, if desired, the printing platens may be controlled so that this number is not printed opposite the items of a multiple item transaction. However, no mechanism has been shown in the present application to control the hammer in this manner when printing on the detail strip, it being preferred to permit the previous consecutive number to print, which will be disregarded when reading the data on the strip. This is not objectionable, since the proprietor is the only person to read this data; it never comes into the hands of the public. When listing items on the receipt handed to the customer, the hammer is controlled, as hereinafter described, to prevent printing the consecutive number, as shown in Fig. 60. When the total of a multiple item transaction is printed on the detail strip, the consecutive number is advanced "one" to properly designate the transaction.

*Printer—Zero elimination*

After the racks 385 have been positioned by the actuation of the differential actuators as determined by the keys depressed in the various banks and before an impression is taken from the various type wheels associated with these racks, a mechanism is operated for the purpose of preventing the printing of ciphers to the left of the highest denomination represented by a digit other than a cipher in any printed number or to the left of the units of dollars rack, and for the printing of ciphers to the right. This mechanism, known in the art as "zero elimination" mechanism, will now be described.

Loose on a rod 1501 (Figs. 46 and 52) carried by the frames 366 and 367 is an arm 502 carrying a pin 503 on which are loosely mounted a plurality of levers 504, each having a shoulder 505 adapted to engage a notch 506 in the corresponding four highest amount racks 385.

Pivoted to an arm 507 integral with the arm 502 is a link 508 pivoted at 509 to a bell crank lever 510 pivoted on a rod 511 carried by the frames 366 and 367. This bell crank carries anti-friction rollers 512 and 513 co-operating with cams 514 and 515 fast on the drive shaft 371.

The three racks next to the highest amount rack are shown in the zero position. Upon rotation of the shaft 371 the bell crank 510 is rocked counter-clockwise and raises the link 508 which rocks the arms 507 and 502 counter-clockwise. This movement carries the levers 504 towards the right (Fig. 46) until a boss 516 on each of said levers strikes a collar 517 on the rod 501. When this occurs, the levers 504 rock counter-clockwise and disengage the shoulders 505 thereof from the notches 506 in the racks 385. The movement of the levers 504 counter-clockwise stretches springs 518 connecting the upper ends of the levers 504 and levers 519 loose on a rod 520 supported by the frames 366 and 367, whereby said levers are rocked counter-clockwise. each lever 519 has a toe 521 engaging a shoulder 522 on its respective rack 385. Counter-clockwise movement of the levers 519 by the springs 518 moves the $10, $100 and $1000 racks through engagement of the toes 521 with shoulders 522, toward the right to their zero positions (Fig. 46). The right hand ends of the springs 518 for the two highest amount racks are secured to studs 523 (Figs. 50, 51 and 52) on the frame 367. Loose on the shaft 380 for the units of cents rack 385 are two levers 524 held in engagement with toes 525 on the two highest amount racks by springs 526 (Figs. 46 and 48). When the levers 504 for these two racks are released from the notches 506, these springs 526 rock the levers 524 clockwise and move the two highest amount racks at the right to their zero positions. However, the springs 526 and 518 are not depended upon because as the arm 502 is rocked counter-clockwise the levers 504 themselves engage an edge 527 on the respective racks 385 and positively shifts them to the right to their zero positions.

After the racks have been moved to their zero positions the springs 518 and 526 hold them until they are moved farther under the control of the differential mechanism. As the racks are moved farther to the right, counter-clockwise movement of the levers 519 is limited by the contact of a finger 528 on each of said levers with a stud 529 on the frame 367. Clockwise movement of the levers 524 is limited by the contact of a finger 530 on each of these layers with the shaft 380 associated with the tens of cents rack.

After the levers 504 have been released from the racks 385 and said racks have been restored to zero position, said racks are differentially positioned under the control of the depressed keys by the segments 383 as previously described. When said racks are so moved to the right fingers 531 of the levers 504 ride on surfaces 532 of the racks 385, thereby holding the levers in raised position.

The two right hand levers 504 each have a lip 533 bent over so that it lies in the plane of its adjacent left hand lever. There is no lip in the plane of the lever 504 associated with the highest amount rack because, as has been previously mentioned, this rack is not used in adding operations and its operation does not have to be eliminated except under certain conditions which will be hereinafter described in connection with the slip printing mechanism. The next to highest amount rack is not used in adding operations, it being effective only on total taking operations.

From this construction it can be seen that when the amount to be printed is large enough to cause the sixth amount rack 385 to be positioned, the lever 504 cooperating with said rack is raised and held in its raised position by the engagement of the edge 532 of the rack with the finger 531 of said lever. As the lip 533 of the lever 504 associated with the fifth amount rack is in the plane of the lever 504 associated with the sixth amount rack, said lever 504 for the fifth amount rack is likewise held in the raised position so that its shoulder 505 cannot engage the notch 506 of the sixth rack. The lever 504 of the fifth amount rack through its engagement with the lip 533 of the lever 504 connected to the fourth amount rack holds said lever in the raised position. From this it can be seen that should the amount be $3000.00 for instance all of the zeros would be printed because the lip 533 of the lever 504 cooperating with the sixth amount rack, or in other words the rack which sets up the numeral "3" engages the lever to its right (Fig. 52) and it, in turn, engages the lever to its right, thereby holding those levers 504 up so that the shoulders 505 thereof cannot engage the notches 506 in their appropriate racks 385. However, the seventh or highest amount rack 385, not being involved in the amount, will remain in the zero position. Subsequently during the rotation of the shaft 371 the cams 514 and 515 rock the bell crank 510 clockwise and lower the link 508 which rocks the arms 507 and 502 clockwise. This movement of the arm 502 allows the lever 504 associated with the seventh amount rack to be rocked clockwise to enable its shoulder 505 to contact the notch 506 in this rack and shift said rack to the left one space, whereby the type wheel associated with this rack is moved from zero position to a non-print position so that the character in the zero position of this type wheel will not be printed as it is not involved in the amount.

When the racks are moved to the zero eliminating position by the levers 504 as just described, hooks 535 on these racks engage fingers 536 on the segments 383 and positively lock the segments and consequently the differential mechanisms associated therewith in this position.

*Printer—Detail strip mechanism*

A detail strip 541 (Figs. 21, 27, 30, 34 and 36) is fed from a supply roll 542 mounted on a stud 543 on the frame 366, around a roller 544 on a stud 545 on a lever 546 pivoted on a stud 547 on the frame 366 (Fig. 36). From the roller 544 the strip is passed to the right over a rod 548 carried by parallel arms 549 made integral by a yoke 550, loose on a stud 551 mounted in the frame 366. From the rod 548 the strip is fed to the right under platens 552$^a$, 552$^c$, and 552$^d$ carried by U-bars 553 mounted in a block 554 integral with the arms 549, up and over the top of said block, and to the left over a roller 555 on a stud 556 on a lever 557 pivoted on a stud 558 on the frame 366. From the roller 555 the strip is wound on a receiving roll 559 (Figs. 21, 27, 30, 34 and 36) loose on a stud 560 mounted in the frame 366.

Secured to the receiving roll 559 is a disk 561 having an integral flange 562 (Fig. 37). Loose on the stud 560 is a lever 563 having an integral arm 564 carrying a pin 565 projecting into a slot 566 (Fig. 40) of a lever 567 loose on a shaft 568 mounted in the frames 365 and 366. The lever 567 carries an anti-friction roller 569 held in engagement with the periphery of a disk 570 fast on the shaft 371, by a spring 571 stretched between the lever 567 and a stud on the frame 366. The lever 563 has a recess 572 in which normally seats a roller 573 loosely mounted on a pin 574 carried by the lever 563. A spring-pressed plunger 575 holds the roller in engagement with the edge of the recess 572 and the inner periphery of the flange 562. Pivoted on a stud 576 carried by a lever 577 loose on the stud 558 is a lever 578.

As the end of the counter-clockwise movement of the disk 570 (Fig. 40) the roller 569 on the lever 567 is caused to follow a recess 579 (Fig. 44) on the periphery of the disk 570 by the spring 571. This rocks the lever 567 clockwise (Fig. 40), and counter-clockwise (Fig. 44), and through its engagement with the stud 565 rocks the arm 564 and the lever 563 (Fig. 37), which is secured to the arm 564 by means of a sleeve, counter-clockwise until an arm 580 integral with the lever 563 strikes the upper end of the lever 578. During this counter-clockwise movement of the lever 563, the roller 573 is rolled along the inner periphery of the flange 562 and slightly compresses the spring plunger 575. During the latter part of the counter-clockwise movement of the disk 570 the roller 569 is moved out toward the unmutilated periphery of said disk, thereby rocking the lever 567 counter-clockwise to normal position. This rocks the arm 564 and the lever 563 clockwise to normal, whereby the roller 573 becomes wedged between the edge of the recess 572 of said lever and the inner periphery of the flange 562, thereby rotating said flange and its integral disk 561 clockwise. The receiving roll 559, being fast on the receiving disk 561, receives the same clockwise movement, thereby winding the detail strip 541 upon said receiving roll.

Engaging the detail strip after it is wound on roll 559 (Fig. 34) is an arm 581 integral with the lever 578. A spring 583 holds the arm 581 in constant engagement with the detail strip as it is wound on the receiving roll. As the reeciving roll becomes larger the arm 581 is moved to the left (Figs. 27 and 30) thereby, rocking the lever 578 counter-clockwise about the stud 576. The positioning of the lever 578, as above described, reduces the movement of lever 563 due to the reduction of the amount of angular rotation of the feeding roller.

There is a retaining roll 584 (Fig. 37) mounted on a stud 585 carried by an arm 586 loose on stud 543 which prevents the flange 562 from being rocked counter-clockwise when the lever 563 is rocked counter-clockwise. A lip 587 on the arm 586 is held in the position shown by another lip 588 on the arm 586, engaging the outer periphery of the flange 562. A spring plunger 589 engages the roll 584 and holds it in engagement with the lip 587 and the inner periphery of the flange 562. When the lever 563 is rocked counter-clockwise it cannot move the flange 562 counter-clockwise because, immediately upon such attempted movement, the roller 584 becomes wedged between the lip 587 and the inner periphery of the flange 562 which positively prevents any counter-clockwise movement of said flange. On the other hand, when the flange 562 is rotated clockwise to wind the paper on the receiving roll, the roller 584 immediately becomes loosened and slightly compresses the spring plunger 589, thereby allowing a free clockwise movement of the flange 562.

The printed impressions on the detail strip are visible through a glass 590 (Fig. 1) which forms part of the printer cabinet.

To permit the last impression to be seen through said glass the detail strip is shifted after the printing takes place. In Figs. 27, 30, 34 and 36, the mechanism for shifting the detail strip is shown in its normal position wherein the last printed item is visible through the glass 590.

Integral with the lever 557 is a segment 600 (Fig. 36), meshing with a segment 601 integral with the lever 546. The lever 546 has a slot 602 receiving a stud 603 (Fig. 34) on a bell crank 604 loose on a shaft 605 (Figs. 40 and 44) mounted in the frames 365 and 366. The bell crank 604 carries an anti-friction roller projecting into a cam race 606 in the disk 570.

At the beginning of the operation of the machine the counter-clockwise movement of the disk 570 rocks the bell crank 604 counter-clockwise (Fig. 44) and clockwise (Figs. 34 and 36), and through its engagement with the lever 546, rocks said lever counter-clockwise. This movement of the lever 546, through the engagement of its segment 601 with the segment 600, rocks the lever 557 clockwise. The rocking movements of these two levers 557 and 546, due to their gear connections, is simultaneous. As the lever 557 rocks clockwise (Fig. 34) a slack occurs in the detail strip 541 which is immediately taken up by the counter-clockwise movement of lever 546, and in this manner the upper horizontal portion of the detail strip 541 is moved to the right around the platen to position the last printed entry just in front of the platens 552$^a$, 552$^c$, and 552$^d$. After the detail strip has been shifted as just described, an impression is made thereon from the type wheels in a manner to be hereinafter described. After the impression has been made, and near the end of the operation of the machine, the cam race 606 rocks the bell crank 604 counter-clockwise to normal position, thereby reversing the movement of the levers 557 and 546 and causing the rollers 555 and 544 to spread apart to shift the upper horizontal portion of the detail strip toward the left to its normal position. This return takes place at the same time that the paper is fed by the feeding mechanism described above.

At certain times it may be desirable to make autographic notations on the detail strip under the last printed impression. For this purpose the cabinet is provided with a hand rest 608 (Fig. 1) so positioned that there is an opening 609 between said rest and the glass 590. Secured to the block 554 (Fig. 27) and directly beneath the opening 609 is a plate 610 which serves as a writing table for the detail strip. When this autographic feature is used it is necessary to feed the detail strip a greater distance so that the printing will not fall upon the autographic notations.

A lever 611 (Figs. 1, 30, 34 and 40) projecting through the cabinet and loosely mounted on stud 560 is provided for changing the extent of the feeding movement of the detail strip. When the autographic feature is not used the lever 611 is in the position shown in Fig. 40 in which a notch 612 of an arm 613 integral with said lever 611 is in engagement with a stud 614 on a lever 615 (Fig. 34). The lever 615 is mounted on a stud 616 on the frame 366. The lever 615 has a stud 617 engaging a slot 618 in the previously described bell crank 577 which carries the lever 578. The stud 614 is held in the notch 612 by a spring 619 stretched between an arm 620 connected with the lever 615 by a hub 621 (Fig. 25), and a stud on the frame 366.

When the autographic feature is used the operator moves the lever 611 to the left (Fig. 40), thereby disengaging the notch 612 from the stud 614 and permitting the stud to be moved into notch 622 of the arm 613. The notch 622 is nearer the stud 560 than is the notch 612. Therefore, when the lever 611 is moved as just described, the spring 619 rocks the arm 620 and the lever 615 counter-clockwise to move the stud 614 into engagement with the notch 622. Counter-clockwise movement of the lever 615, through its engagement with the bell crank 577, rocks said bell crank clockwise, thereby moving the lever 578 downwardly. With the parts in this position, as just described, it is very clear that when the lever 563 is rocked counter-clockwise it is rocked a greater distance before the arm 580 thereof strikes the top of the lever 578. Therefore, when said lever 563 is rotated clockwise to normal position it rotates the flange 562 and the receiving roll 559 a greater distance than when the lever 611 is in the position shown. This greater rotation of the receiving roll 559 causes the detail strip to be fed a greater distance than when the autographic feature is not used and thereby permits the impression to be made below the autographic notation instead of conflicting therewith.

It is, of course, possible to make the notation applying to any of the transactions after the same has been printed and in this case the lever 611 should be operated, or else the next time the machine is operated the print will be made on top of the written notation and render it illegible.

The means for making impressions from the upper set of type wheels on the detail strip will now be described.

Loose on the stud 551 and secured to the arm 549 (Fig. 34) is an arm 623 connected by a link 624 to a lever 625 loose on a rod 626 mounted in the frames 365 and 366. The lever 625 carries anti-friction rollers 627 and 628 (Fig. 39) cooperating with cams 629 and 630, respectively, fast on the shaft 605. Also fast on the shaft 605 is a Geneva wheel 631 (Fig. 38). Cooperating with notches 632 in said wheel is a long pin 633 and a short pin 808 on a disk 634. The disk 634 is slidably mounted on shaft 371. The disks 634, 720 and 829 (Fig. 26), are fast together and are slid as a unit by a shaft 568 and a yoke arm 753 (see also Fig. 68), under control of the item key 73, the total key 74 and "on and off" knob 770, in a manner hereinafter set forth. The disk 634 is also adapted to be given a counter-clockwise rotation with said shaft. When this occurs the pins 633 and 808 successively engage the notches 632 in the Geneva wheel and rotate said wheel and the shaft 605 clockwise until the pins 633 and 808 disengage from said wheel. As the two cams 629 and 630 are fast on the shaft 605 they are rotated clockwise one-fifth of a rotation, by each pin 633 and 808, there being five equidistant slots 632 in the Geneva wheel 631. Each one-fifth of a rotation of the cams 629 and 630 rocks the lever 625 first clockwise and then counter-clockwise to normal position. Clockwise movement of the lever 625 lowers the link 624 and rocks the arms 623 and 549 clockwise, which moves the platen 552 downwardly to take impressions from the type wheels on the check paper and detail strip. Counter-clockwise movement of the lever 623 to normal position raises the platen. The concave peripheral portions of the Geneva wheel 631 are normally in engagement with the periphery of the Geneva stop wheel which comprises the hub of the disk 634. When the wheel 631 is rotated as just described, the points 635 project into a recess 636 in said hub.

The check paper, hereinafter described, may or may not be fed to receive an impression according to how the machine is operated. During the entering of a mutiple item transaction, when each of the individual items is printed on the check paper, the impression platen is operated once and that for printing upon the check only. In such an event the pin 633 causes the impression to be made on the check. When no check is issued, that is, when the check feeding mechanism is thrown off, as will be hereinafter described, the pin 633 causes the impression to be made on the detail strip. When a transaction containing only one item is entered both pins 633 and 808 operate the platen, the first impression being made on the check. The check is subsequently ejected and the second impression is taken on the detail strip which is wound up in the machine. During such an operation the pin 633 causes the impression to be made on the check and the pin 808 causes the impression to be made on the detail strip. Mechanism for controlling the platen will be hereinafter described.

On certain operations of the machine it is not desired to have the date, consecutive number, clerk's initial and kind of transaction printed. The platen is, therefore, divided into three sections, the section 552$^d$ printing the date, the section 552$^c$ the consecutive number, clerk's initial, etc., and the inside section 552$^a$ the amount. The amount is always printed. The other two sections of the platen 552$^c$ and 552$^d$ are normally disabled and are only made operative when an impression is wanted. The date is never printed on the detail strip as the paper is not wide enough to extend over the date wheels. The consecutive number, or other designation, is always printed on the detail strip no matter whether items or item totals are being entered. The means for rendering the center section 552$^c$ of the platen operative will now be described. It is accomplished by the mechanism for feeding the detail strip. The U-bar 553 (Fig. 57), for this section of the platen is supported by a plunger 637 slidably mounted in the block 554. The plunger 637 has a slot 638 into which projects one end of an arm 639 (Fig. 59) fast on a shaft 640 mounted in the arms 549. Fast on the inner end of the shaft 640 is an arm 641 (Fig. 58) which carries a pin 642 projecting through a slot in arm 623 and a slot 643 in a link 644 slidably supported by the shaft 551. The right hand end of the link 644 (Figs. 58 and 59) is connected by a pin 645, which projects through a slot 646 concentric with the shaft 640, to a short arm 691 loose on shaft 640. Said arm 691 together with the shaft 551 constitute a support and guiding means for the link 644. At its left hand end (Fig. 40) the link 644 is pivoted to a link 648 which, at its opposite end, is pivoted to a lever 649 loosely mounted on the long stud 543. This lever has a curved slot 652 which cooperates with a roller 650 carried by an arm 651 integral with the arm 564 before described.

It will be remembered that arm 564 is given a counter-clockwise movement to feed the detail strip. The arm 651 will be given a like movement, and due to the cooperation of roller 650 on arm 651 with slot 652 in lever 649 this lever will be rocked clockwise. This moves the links 648 and 644 towards the right (Figs. 40 and 58), and through the slot 643 and pin 642 the arm 641 is rocked clockwise, thereby rocking shaft 640 and arm 639 also clockwise and lowering the plunger 637 together with its U-bar and platen into printing position. It can be easily seen that when the detail strip feeding means is returned to normal the platen will be lifted to its ineffective position.

Fig. 61 illustrates a fragmentary portion of the detail strip printed by this machine. In the column of figures to the left are the consecutive numbers, next to this column towards the right are the clerks' initials, then the letters for indicating what kind of transaction has taken place. To the right of these letters are the amounts and to their right will be seen the word "total" opposite certain entries. This indicates that the amount printed is the total of a plurality of items. If a single item is printed, whether it be a single transaction in itself or one of a plurality of items comprising a transaction, no word "total" is used.

When an itemized check is issued, the items are not printed on the detail record, but only the total of the items of such transactions is printed on the detail record. Thus, referring to the itemized receipt illustrated in Fig. 60, the items making up the total are not printed on a detail record. However, the total, namely, $26.60, is printed on both the check and the detail strip. Other examples of such entries are illustrated in Fig. 61, namely, $15.00, $20.00, and $100.00. Since each of these total amounts were printed on the detail strip without the individual items, the operator can determine by inspecting the detail strip that an itemized receipt was issued when the multiple-item transaction was entered into the machine.

On the other hand, when a receipt is not issued when the multiple-item transaction is entered, the items and totals thereof are printed on the detail record. Two of such transactions are illustrated in Fig. 61; one including five items, totaling $10.25, and the other including three items, totaling $128.50.

When the transaction entered consists of only one itme, a receipt such as is shown in Fig. 64 is issued, and a like amount is printed on the detail strip, but the word "total" is omitted from the detail strip. Thus, when an amount standing alone and which does not have the word "total" printed thereafter is found on the detail strip, it indicates that the sale consisted of one item only. Two such entries are illustrated in Fig. 61, namely, $14.00 and $5.00.

*Printer—Check mechanism*

The paper from which the checks are printed, cut and ejected from the machine is in a supply roll 655 (Figs. 2, 21, 25, 27 and 30) loose on a stud 656 mounted in a bracket 657 (Fig. 34), secured to the frame 366. The paper is fed from the bottom of the roll through a chute 658 supported on studs 659 on the frame 366, between two feeding rolls 660 and 661, between two other feeding rolls 662 and 663. From the rolls 662 and 663 the paper is fed through a guide 664 mounted on a knife block 665 secured to plates 666 and 667. The block 665 and plates 666 and 667 form a rigid unit. The plate 666 is mounted on a stud 668 on the frame 366 and the plate 667 is mounted near the end of the stud 551 and stud 668. A screw 669 holds the knife block unit in position. From the guide 664 the paper is passed between the block 665 and a guide strip 670 supported by the plates 666 and 667, and from there through a guide 671 secured to the knife block unit, and from said guide the paper is passed underneath the detail strip 541 between the platens 552ᵃ, 552ᶜ and 552ᵈ and the upper set of type wheels. The paper then passes between a large platen 672, carried by a U-bar 673 supported by two arms 674 and 675 pivoted on the stud 551, and an electro plate 676 supported by two studs 677 mounted in the frame 366.

*Check feeding*

As before stated, the paper is fed by two pairs of feeding rolls 660—661 and 662—663. The rolls 660 and 663 are rotatably mounted on studs 678 and 679 projecting from frame 366. The rolls 661 and 662 are supported by studs 680 and 681 projecting forwardly from frame 366. The rolls 660 and 663 have knurled flanges 684 and 685 (Fig. 25) which cooperate with the rolls 661 and 662 to feed the check. These feeding rolls are so constructed that the rolls 661 and 662 may be moved away from the rolls 660 and 663 to allow the paper to be properly inserted before the machine is operated. To accomplish this the rollers 661 and 662 are loosely mounted upon eccentrically bored rods 692 and 693 which are recessed (Fig. 27) to receive the studs 680 and 681 which support them. The studs extend through the eccentrically formed bores of the rods 692 and 693. At their forward ends the rods are attached by screws 694 (Fig. 21) to disks 695 journaled in a plate 682, which disks form bearings for the forward ends of the rollers 661 and 662. Carried by small studs projecting from each of the disks 695 are partial gears 696 which are rigidly connected to said disks 695 and rods 692 and 693 by the screws 694 which pass through concentric slots in said gears. The teeth of the partial gears 696 mesh with teeth formed on a lever 688 rotatably mounted on the plate 682. Integral with this lever is a pinch lever 689 which has a hook 690 engaging a stud on plate 682. When the lever 689 is pinched and rotated in a clockwise direction the two partial gears are rotated counter-clockwise and due to their connection with the rods 692, these rods are also rotated counter-clockwise. Due to the eccentric mounting on each end of these rods they will be moved away from the rollers 660 and 663 and will carry the rollers 661 and 662 with them far enough to permit the insertion of the paper therebetween.

The functions of this machine make it necessary to provide mechanism for giving the check paper long and short feeds. When entering a single-item transaction the check paper receives a long feed only. During the entry of the first item of a multiple-item transaction the check paper receives a long feed. Upon the entry of the succeeding items of said multiple-item transaction a short feed is given the check paper, but when the total is printed the check paper receives no feed. The mechanism for accomplishing such feeds will be later described.

The mechanism for giving the paper the long feed will be described first. The feeding rolls 660 and 663 carry, near their inner ends, gears 701 and 702 (Figs. 25, 42 and 43). The roll 660 has a hub 705 which extends inwardly and has mounted thereon a pair of gears 703 and 704. The gear 703 is free on said hub 705, but the gear 704 is made rigid therewith by long pins 706. Meshing with the gears 703 and 704 are companion gears 707 and 708, respectively, rotatably mounted on a stud 709 (Fig. 40). During operations in which the long feed is wanted, the gears 707 and 708 are caused to operate together due to a broad pinion 710 carried on a stud 711 mounted in one arm of a bell crank lever 712 fast on a shaft 713 supported by the frames 365 and 366. The gear 707 meshes with a gear 714 fast on a hub 715 surrounding the shaft 713. Also fast on hub 715 is a small gear 716 which meshes with a gear 717 fast on a hub surrounding shaft 605 (Figs. 26 and 34). Also fast on this hub is a Geneva wheel 718 which cooperates with two pins 719 (Fig. 34) projecting laterally from a disk 720 on a hub 721 slidably mounted on shaft 371. This shaft carries a key which projects into a keyway formed in the inner periphery of the hub 721 thereby enabling the shaft 371 to drive the disk 720 and at the same time permit endwise movement of said disk on the shaft.

In Fig. 26 the parts are shown in position to impart the long feed to the check paper, that is, the disk 720 is in position to engage its pins with the slots of the Geneva wheel 718. When this condition exists it can be seen that the Geneva wheel 718 will be rotated clockwise (Fig. 34) and will therefore rotate the gear 717 a like extent. As this gear meshes with gear 716 said gear 716 will be rotated counter-clockwise and drive the outer gear 707 (Fig. 43) clockwise. The movement of gear 707 is transmitted to gear 708 by the broad pinion 710. As gear 707 meshes with gear 703 and gear 708 with gear 704 these gears will be rotated counter-clockwise, gear 703 to operate the electro impression hammer, as will be later described in detail, and gear 704 to rotate the gears 701 and 702 through the pins 706 to rotate the rolls 660 and 663 and feed the check paper.

When the check paper is given the short feed, it is necessary to move the disk 720 toward the front of the machine to remove the pins 719 from the plane of the Geneva wheel 718. This will disable the mechanism for giving the paper the long feed. At the same time a cam disk 725 (Figs. 26 and 30) is also moved towards the front of the machine by means to be later described, which movement brings its groove 726 into cooperative relation with a roller 727 carried by a lever 728 pivoted on the shaft 605. At its right hand end (Figs. 26 and 30) this lever has a pin 729 which engages a slot 730 in an arm 731 fast on shaft 713. Also fast on this shaft is the bell crank lever 712. The left hand arm of this lever 712 carries a feed pawl 732 (Figs. 34 and 40) which engages the teeth of a ratchet 733 fast on the back of gear 708. The pawl is held in engagement with the ratchet by a spring 734 stretched between a pin on the pawl and a hook on an aliner 735 which will be described later.

When the cam disk 725 is given its counter-clockwise rotation on the operation of the machine its cam groove will rock the lever 728 counter-clockwise (Fig. 30). Through the slot 730 and pin 729 this movement is transmitted to arm 731 thereby rocking shaft 713 clockwise and then counter-clockwise. As the bell crank lever 712 is fast on this shaft it receives a similar movement which causes the broad pinion 710 to disengage from the gears 707 and 708 and simultaneously causes the pawl 732 to engage and feed the ratchet 733 one step. A clearance is provided between the normal position of the pawl and the ratchet to permit the broad pinion 710 to rock out of engagement before the feeding movement commences.

As the ratchet 733 is fast to the gear 708 this gear will also receive the one step of movement mentioned above. This one step or movement will be transmitted to gear 704 which meshes with gear 708 and through the pins 706 to the gears 701 and 702 which are fast on the feed rollers. The feed rollers will, therefore, receive one step of movement and will feed the check paper one step of movement only.

When the broad pinion 710 is disengaged from the gears 707 and 708 as above described, it engages an aliner 735 loosely mounted on the shaft 713. It is to this aliner that the spring 734 is fastened and this spring constantly tends to rock the aliner counter-clockwise. This movement is limited, however, by an arm 736 of said aliner which comes in contact with the shaft 626.

It is necessary to have mechanism for shifting the feeding mechanism from the position for the long feed to that for the short feed and vice-versa. The mechanism is normally in position to give the check paper the long feed. It is always desired to have the mechanism shifted to the short feed position when the "item" key 73 (Fig. 1) is depressed. The "item" key 73 and the "total" key 74 control the movement of a rack 740 (Figs. 49 and 65) similar to the amount racks. The rack 740 is provided with teeth 384, which mesh with teeth of a segment 383 secured to a shaft 380 (Fig. 6), which is adjusted differentially under control of the keys 73 and 74, through the link 322 and a beam 272 in exactly the same manner as the shafts 380 for the amount banks are adjusted.

This rack 740 has a notch 741 (Fig. 65), cut in its upper edge with which a bar 742 rigid with an arm and a lever 743 is adapted to co-operate. Said arm and lever 743 are loose on a stud 501 and the lever 743 at its left hand end (Fig. 49) has a lip 745.

In Figs. 49 and 65 the rack is shown in the position it assumes when the "total" key has been depressed. When the "item" key is depressed the rack moves to a position in which the notch 741 is opposite the bar 742 of lever 743.

Lying just beneath the lip 745 is an L-shaped arm 746 (Figs. 2, 46 and 65) pivoted to the end of a pitman 747 supported by a stud 748 projecting through a slot 749 in said pitman and bifurcated at its left hand end to straddle a hub 750 of the gear 61. The L-shaped arm 746 has a shoulder 751 adapted to cooperate with a pin 752 mounted near the end of shaft 568. Fast on this shaft is an arm 753 (Figs. 26, 34 and 65), which straddles a flanged hub 754 fast on the disk 720 which actuates the feeding mechanism for giving the check paper the long feed.

It can be seen, therefore, that when an "item" key is depressed the rack 740 will be positioned so that the notch 741 will be opposite the bar 742 of lever 743 and said lever can be rocked clockwise (Fig. 49) to permit the L-shaped arm 746 which lies beneath the lip 745 of lever 743 to rock counter-clockwise and bring the shoulder 751 into engagement with the pin 752. Then when the pitman 747 is moved toward the right by a roller 755 carried thereby engaging a cam groove 756 cut in the side of the gear 61, the shaft 568 will be moved toward the front of the machine and will slide the disk 720 along shaft 371 by an arm 753, far enough to prevent its cooperation with the Geneva wheel 718. This disables the means for imparting the long feed to the check paper.

It is necessary to connect the mechanism for giving the check paper the short feed with its operating mechanism, as well as disabling the long feed mechanism and this is done in the following manner. Surrounding the shaft 568 is a sleeve 758 (Figs. 2 and 26) in which is cut a cam slot 759 through which projects a pin 760 fast in the shaft 568. It can be seen from the above that when the shaft 568 is shifted towards the right in Fig. 2, the sleeve 758 will also be shifted to a like extent due to the slot and pin connection. An arm 761 (Figs. 26 and 65) is connected to the sleeve 758 to slide therewith, but the connection permits rotation of the sleeve independently of the arm. This connection consists of a screw 792, which enters the hub of the arm 761, the inner end of the screw being reduced in diameter to ride in the slot 793 (see also Fig. 65), in the sleeve 758. A similar connection is disclosed in Fig. 2 of the Shipley Patent, No. 1,619,796, referred to above. At its opposite end, the arm 761 is bifurcated to straddle a flanged hub 762 fast on the cam disk 725 for giving the mechanism the short feed. This disk is slidably mounted on the shaft 371 and when it is moved toward the front of the machine, as above described, the cam groove therein comes into cooperative relation with the roller 727 on the lever 728 (Fig. 30). Then when the shaft 371 is rotated the mechanism for imparting the short feed to the check paper will be actuated, as above described, through the key in shaft 371 above mentioned.

After a series of items have been printed and it is desired to print the total thereof the total lever 75 (Fig. 1) is adjusted to the first position below the "add" position and the "total" key 74 is depressed. The shaft 568 will have been moved to its right hand position as seen in Fig. 2 and it will then be necessary to move this shaft to the left to disable the short feed. Also pivoted to the end of pitman 747 is a hook 763. Near its right hand end this hook has pivoted thereto a link 764 which at its upper end is bifurcated and engages a pin 765 carried by a lever 767 fast on a shaft 1025 supported in the side frames of the machine. A spring 769 extending between a hook on link 764 and a pin on the frame 51 tends to raise said link and rock the hook 763 counter-clockwise. It will be remembered that the pitman 747 is moved toward the right and then back to normal position on each operation of the machine. When the pitman 747, and therefore the hook 763, have been moved to the right, the shaft 1025 is rocked counter-clockwise by mechanism under control of the total lever 75 to be later described. This permits the spring 769 to raise the link 764 and hook 763 far enough so that the hook is behind the pin 752. Then when the pitman 747 is moved again toward the left (Fig. 2) the shaft 568 is carried with it. This movement of shaft 568, through arm 753, moves the disk 720 back to its normal position in which it cooperates with the Geneva wheel 718. This movement of shaft 568 through pin 760 sleeve 758 and arm 761 also disengages the cam disk 725 from the roller 727 and thereby disables the short feed mechanism.

The check feed mechanism is so timed that upon the entry of the first item of any transaction a long feed will take place to feed the leading end of the check strip from the position adjacent the knife to a position beyond the electro hammer 673 so that the heading shown in Figs. 60 and 64, is printed above the first item. Such a long feed will take place when the item entered is the first item of a multiple-item transaction, and when it is the only item of a single item transaction. This long feed is due to the fact that the shaft 568 remains in its left-hand position, as viewed in Figs. 2 and 65, at the end of every transaction entry When the last transaction is a single-item transaction the arm 746 remains depressed, and therefore, the shaft 568 is not shifted to the right to disable the long feed. When the last transaction is a multiple-item transaction, then during the printing of the total of such multiple-item transaction, the hook 763 is raised to return the shaft 568 to the left-hand position, as above described. It will be noted by referring to Fig. 34, that the pins 719 are in positions to enter the notches of the Geneva wheel 718 at the very beginning of the operation of the machine, providing the disk 720 has been shifted on the shaft 371 to bring the pins in proper relation with the Geneva wheel. Therefore, when the pins 719 are in such positions they cause the strip to be fed out at the very beginning of the operation of the machine.

Immediately after the first impression of the multiple-item entry the pitman 747 shifts the shaft 568 to the right (Fig. 2) to withdraw the pins 719 from cooperative relation with the Geneva wheel 718, and also shifts the cam 725 into operative relation with the short-feed arm 728.

At about one-half rotation of the cam shaft 371, and after the shaft 568 has been shifted to the right, (Fig. 2) the pins 633 (Fig. 38) enter the notch in the Geneva wheel 631 to actuate the impression hammer to print the first item on the check.

Immediately after such printing operation takes place, the short-feed arm 728 is operated to space the printed item and prepare the check strip to receive the next item of the multiple-item transaction during the subsequent operation of the machine.

The shaft 568 is not shifted back to the left-hand position (Fig. 2) during such item entry operations, and therefore, the pins 719 remain ineffective during the entry of each item of a multiple-item operation after the first item thereof has been printed, the strip is given a short feed only.

When the total lever 75 is shifted to a total taking position, and the total key 74 is depressed, to control the machine to print the total of the items of the multiple-item transaction, and the machine operated, the hook 763 is raised to return the shaft 568 to its left-hand position. But, this shifting of the shaft 568 during the total-taking operation is too late to cause a long feed to take place since the pins 719 move approximately 180 degrees when the return shifting of the shaft 568 takes place, and therefore the pins will not enter the slots in the Geneva wheels 718. Furthermore, the arms 728 will not be operated by the cam 725, since the cam is shifted out of cooperative relation with the arm 728 before the cam can operate the arm to effect a short feed. Therefore, during a multiple-item total-printing operation the check receives no feed whatever.

The distance between the printing platens 552ᵃ, 552ᵇ and 552ᵈ, and the knife 820 (Fig. 30) is such that after the check is severed a margin, illustrated in Fig. 60 is provided between the printed total and the bottom of the receipt.

During the entry of a single-item transaction a long feed takes place at the beginning of the operation and the short feed remains ineffective. The receipt is severed from the check strip after the long feed and impression take place, and the margin below the last impression (Fig. 64) is governed by the distance between the printing line and the knife blades, as is the case of the lower margin on the itemized receipt (Fig. 6), explained above.

*Manual check control*

It is sometimes desirable not to have a check printed. When this condition arises the check issuing mechanism is adjusted by what is known in the art as the "On and Off Knob". This consists of a knurled knob 770 (Figs. 2, 21 and 26) fast on a sleeve 771 connected to the end of the sleeve 758 by a mortise and tenon. It is held in engagement by an arm 772 fast on a stud 773 mounted in the frame 365. At its upper end this arm 772 is semi-circular in form and extends between two flanges 774 on the sleeve 771 (Fig. 22).

In all of the figures the knob 770 is shown in the "on" position, that is, in the check issuing position. If no check is desired, the knob is given a one-quarter turn in a clockwise direction (Fig. 26). This movement turns sleeve 758 to a like extent and due to the shape of the cam slot 759 in said sleeve through which pin 760 projects, this pin and shaft 568 are moved toward the front of the machine. It will be remembered that the arm 753 is fast on shaft 568 and it is, therefore, carried forwardly with said shaft and due to its engagement with the driving disk 720 for the check feeding mechanism, this disk is slid forwardly far enough to remove its pins from the plane of the Geneva wheel 718. This will disable the mechanism for giving the check paper the long feed and as the short feed mechanism is normally disabled it is evident that no check can be issued.

Mechanism is provided for preventing the release of the driving mechanism unless the "on and off knob" is in either one of its two positions. Fast to the sleeve 758 is a disk having teeth 775 formed thereon (Fig. 27) which mesh with the teeth of a partial gear 776 fast on a sleeve 777 surrounding a shaft 778. Fast to this sleeve 777 near its inner end is a segmental arm 779 (Fig. 34). This arm cooperates with a plunger 780 slidably supported by the frame 366. Pivoted to said plunger at its left hand end (Fig. 2) is a link 781 which, at its opposite end, carries a pin 782 projecting through a slot 783 in a lever 784 pivoted to the side frame 51. The pin 782 is loosely mounted in the lower end of an arm 785 pivoted to the frame 51. At its left hand end the lever 784 is pivoted to a link 786 which, at its opposite end, is pivoted to the lever 170 which is rocked upon the release of the machine. When the machine is released the lever 170 is rocked counterclockwise (Fig. 2). This movement lowers the link 786 and rocks the lever 784 counterclockwise, which causes the link 781 to move towards the right due to the shape of the slot 783. As the link 781 is pivoted to the plunger 780 this plunger will also be moved towards the right, providing its passage is not blocked by the segmental arm 779. This arm will not obstruct the passage of the plunger 780 unless the "on and off knob" has been left out of one of its two normal positions. In case it has been so left it will be impossible to release the machine until the knob is returned to one of its two positions.

The "on and off knob" is flexibly held in one of its two positions by a pawl 787 (Fig. 22) constantly forced in a clockwise direction by a spring 788 compressed between the pawl and a bracket 789 fastened to the end of the frame 365. The nose of the pawl 787 engages notches 790 in a disk 791 fast on the sleeve 758.

Means are provided for preventing the adjustment of the "on and off" knob to the "off" position after a multiple item entry operation has been begun with the knob in the "on" position, until the total of the entry is printed, to compel the printing of the complete transaction on the check. This mechanism consists of a segmental arm 1157 (Figs. 2 and 27), fast on the sleeve 758, clutched to the sleeve 771, to which the knob 770 is also fast. When an item printing operation is begun the shaft 568 and sleeve 758, and therefore the arm 1157, are moved to the right (Fig. 2). This movement will position the arm beneath a bracket 1158 fast on the frame 365. The arm will remain in this position until a total is taken, when it will be returned to the position shown in Figure 2. It is evident from the above that the knob 770 cannot be turned to the "off" position while the arm 1157 is beneath the bracket 1158.

*Check impression*

As previously described, the Geneva wheel 631 (Fig. 38) is rotated clockwise by the pins 633 or 808 to bring the platens 552ª, 552ᶜ and 552ᵈ into contact with the type wheels to print on the check paper and detail strip. The pins 633 and 808 are secured to the disk 634. The disk 634 is fast on the hub 721 which is arranged to slide on shaft 371 and be driven by the key therein. It can be seen that when the cam disks 634 and 720 are shifted towards the front of the machine to disconnect the long feed mechanism the pin 808 on disk 634 will be moved out of the plane of the Geneva wheel 631. The pin 633 is longer than the pin 808 and is not moved far enough to be out of the plane of the wheel 631 so that the impression will be made on the detail strip by means of the long pin 633 when the check is thrown off. Thus when a check is printed upon, the pin 633 causes an impression to be made on the check and the pin 808 causes the impression to be made on the detail strip. But when no check is issued, the pin 633 causes the impression to be made on the detail strip, as before described.

Electro impression

The platen 672 for taking the impression from the electro plate 676 (Fig. 21) is driven by the check feeding mechanism. The platen is carried by a U-bar 673 supported by arms 674 and 675 (Fig. 25) pivoted on the shaft 551. Also pivoted on the shaft 551 is an arm 810, which at its opposite end is pivoted to a short pitman 811 (Figs. 40 and 41). This pitman is bifurcated and straddles shaft 679. It carries an anti-friction roller 812 which cooperates with a cam 813 fast on a gear 814 loose on shaft 679. This gear meshes with and is driven by the gear 703 during the time when the long feed is given to the check paper. When the short feed mechanism is operative the gear 703 is disconnected from the driving mechanism, thereby preventing the electro impression. The cam 813 is given a counter-clockwise rotation (Fig. 41) and moves the pitman 811 upwardly until the roller 812 passes the high point of said cam when a spring 800, extending between the end of the pitman and a stud on the frame, will bring the platen into contact with the check paper. The pitman 811 as above stated, is pivoted to the arm 810 having a slot formed therein through which a pin 816 carried by an extension of arm 675 projects. A spring 893 is stretched between the pin 816 and a stud on arm 810, and normally holds the electro platen up off the paper. When the pitman is moved to rock the arm 810 counter-clockwise (Fig. 40) the spring 893 raises the arms 675, and therefore the platen. When the pitman passes the high point of its cam the arm 810 is rocked rapidly clockwise, and the end of slot 815 comes into contact with the pin 816 and carries arms 675 and the platen with said arm. When the platen strikes the check the spring 893 causes a slight rebound of said platen to its normal position above the paper thereby making a clear impression on said check paper.

Severing mechanism

The plates 666 and 667 support a shaft 818 (Fig. 30). Secured to the said shaft are two levers 819. These levers support a knife 820 slidably mounted in grooves 821 in the plates 666 and 667. Secured to the end of shaft 818 is an arm 822 (Fig. 34) pivoted to a link 823 also pivoted to an arm 824 fast on a hub 825. Also fast on the hub 825 is a lever (Figs. 30 and 31) having two arms 826 and 827. The arm 826 carries a roller engaging the periphery of a cam 828 and the arm 827 has a roller cooperating with a cam 829 (Fig. 31). Both of the cams 828 and 829 are slidably mounted on the shaft 371 and are driven by the key therein.

Upon counter-clockwise rotation of shaft 371 (Fig. 31) a projection on cam 829 engages the roller on arm 827 and rocks arms 826, and 827, hub 825 and arm 824 counter-clockwise (Fig. 30). This movement raises the link 823 and rocks arm 822, shaft 818 and arms 819 clockwise thereby lowering the knife 820 and severing the check from the check strip. Upon continued rotation of the cams 828 and 829, the cam 828 contacts the roller on the arm 826 and restores the knife 820 to its normal position.

Crippling mechanism

When items are to be printed on the check it is desired to prevent the printing of anything except the amount. It will be remembered that the center section 552ᶜ of the platen is the one which takes the impression from the type wheels which print the consecutive number, clerk's initial, and kind of transaction. It will also be remembered that this platen is normally held up out of printing position and that it is caused to be lowered by the action of a part of the strip feeding mechanism. This is the ever 567 (Fig. 40) which is operated by the cam 570. This lever has an arm 801 which carries a hook 802. This hook is normally back of a recess 803 of a stud 804. It can be seen from Fig. 40 that if the stud 804 is moved so that the recess thereof is out of cooperative relation with the hook 802 the lever 567 cannot move the center section of the platen into printing position and therefore no impression will be made by the center section.

The means for moving the rod 804 as above described are as follows. It will be remembered that the cam 725 is moved towards the right (Fig. 2) by means of the arm 761 when the "item" key is depressed so as to actuate the short feed mechanism. Fast on arm 761 is a rearwardly extending bar 805 (Figs. 12, 26 and 34) to the rear end of which is an upwardly extending arm 806 which carries the stud 804. As can be seen in Fig. 2 it has a recess to permit the movement of the segmental arm 779. From the above it can be seen that when the "item" key is depressed the stud 804 will be shifted to move the recess 803 out of cooperative relation with the hook 802, thereby preventing the center section of the platen from descending to printing position.

When an item of a multiple item transaction is printed on the check, the check is not ejected from the machine, but rather it remains between the type wheels and the detail strip. For this reason the items cannot be printed on the detail strip, and therefore the feeding mechanism for the detail strip is also crippled. It will be remembered that lever 567 rocks the arm 564 for feeding the detail strip. Thus it can be seen that when an item is entered and the stud 804 is moved into the path of the hook 802, the detail feeding mechanism will be crippled.

When an item of a multiple item transaction is entered with the knob 770 (Fig. 26) moved to its "off" position and thereby moving the shaft 568 toward the front of the machine as above described, the disk 634 is moved by means of the arm 753, to shift the pin 808 out of the path of the Geneva wheel 631 thus causing the platen 552 to operate only once. Movement of the knob 770 to its "off" position rotates the sleeve 758, thereby rotating the disk having gears 775, and the partial gears 776, fast on the sleeve 777 surrounding the shaft 778. Fast to the sleeve 777 at its innermost end is an arm 838 (Figs. 2, 26 and 52) which lies above an extension 839 (Fig. 2) of the hook 763. When the sleeve 777 is rotated by the knob 770, the arm 838 is moved into engagement with the extension 839, thereby preventing the hook 763 from raising to engage a pin 752. Thus it is seen that if the hook 763 cannot raise during an item entering operation the shaft 568 will remain in the position to which it was adjusted by the knob 770 and therefore the sleeve 771 together with the stud 804 will remain in their normal positions.

It will be recalled that with the stud 804 in the normal position, the lever 567 (Fig. 40) functions to feed the detail strip in a manner above described. Thus when the knob 770 is moved to its off position, the pin 633 will cause the platen 552 to be operated once, and since no check paper is fed below the platen, the impression will be taken on the detail strip. At the end of the operation of the machine, the detail feed mechanism functions to space the printing. In this manner, when no check is printed, the items are printed on the detail strip, and when an itemized receipt is printed, the items are printed on the check and not on the detail strip.

When a single item transaction is entered, the item is printed on both the check and the detail trip. This can be accomplished because after the check is printed, it is ejected from the machine in a manner to be presently described, and thus the second impression is taken on the detail strip.

When a single item transaction is entered, the "total" key 74 is depressed to release the machine. As beforementioned, when the total key 74 is depressed, the rack 740 is shifted to the position shown in the drawings, and therefore printing hammer, carrying the platens 552$^a$, 552$^c$, and 552$^d$ is operated twice in succession. With the rack 740 in the position shown, the stud 804 will be in position to permit the detail strip feeding mechanism to operate. Thus two impressions are taken and the detail strip will be spaced during single item transaction entries.

The outside section 552$^d$ of the platen is the one which prints the date. Like the center section, above described, it is normally inoperative and is made operative when an impression is desired. This section is made operative by the action of the check severing mechanism. One of the arms 819 (Fig. 25), which carries the knife has an upwardly extending arm 830 (Fig. 57) integral therewith. This arm carries a pin 831 extending through a slot 832 in a link 833 slotted to straddle the shaft 551 and pivoted at its opposite end to a short arm 834 loose on shaft 640. Also loose on shaft 640 is a two-armed lever 835 which carries a pin 836 projecting through a curved slot 837 in the link 833. The other arm of the two-armed lever 835 projects into a recess in the plunger 637 which carries this section of the platen. When the arm 819 is rocked clockwise (Fig. 57) to lower the knife, the link 833 will be moved towards the right and will, through slot 837 and pin 836, rock the lever 835 clockwise and thereby lower the platen to printing position.

It is evident that if the severing mechanism is not operated the date platen will remain in its raised position and the date will not be printed. This condition arises when items are being printed on the check. The means for disabling the severing mechanism is as follows: It will be remembered that the disks 720 and 634 are moved towards the front of the machine when the "item" key has been depressed. The cams 828 and 829 are integral with these disks and receive a like movement. This movement is sufficient to remove the cams 828 and 829 from the plane of the rollers on arms 826 and 827 and thereby prevent any movement of the severing mechanism.

When the total of a multiple-item transaction is to be printed, the total lever 75 is shifted to the first "total-taking" position, below the "add", thus rocking the shaft 1025 (Fig. 2) and permitting the spring 769 through the link 764 to elevate the hook 763. Upon the subsequent operation of the machine the hook 763 shifts the shaft 568 back to its normal position to move the disks 720 and 634 back to the rear of the machine, in which position the severing cams 828 and 829 are again in effective positions. Operation of the severing mechanism through the arm 819 (Fig. 57), lowers the platen 552$^d$ so as to cause the date to be printed beside the total on the itemized receipt.

When the total key 74 is depressed to enter a single-item transaction, the disks 720 and 634 remain in the positions shown to control the severing mechanism to sever the single-item receipt from the issuing strip, and therefore the date platen 552$^d$ is lowered to print when a single-item transaction is entered.

Thus, it is seen that the date is printed on the multiple-item receipt only when the total is printed thereon, as shown in Fig. 60, and the date is printed on the single-item receipt when the item is entered, as shown in Fig. 74.

*Check ejector*

Immediately after the check has been severed from the check paper a mechanism is operated whereby the severed portion or check is ejected from the machine. Loose on a stud 840 (Fig. 66), carried by an arm 842 is a knurled roller 841 (see also Figs. 25 and 34). The arm 842 is pivoted on a stud 843 mounted on the plate 799 (Fig. 68) secured to the frame 366 by the studs 417 and 418. Mounted on a stud 844 (Figs. 67 and 68) carried by an arm 845 is a knurled roller 846. The arm 845 is pivoted on a stud 847 mounted in a bracket 848 carried by the frame 366. The arms 842 and 845 are spring-pressed in a counter-clockwise direction (Figs. 66 and 67) by springs 798 to hold the free ends thereof in contact with the studs 796 and 797, the former being carried by the frame 419 and the later by the bracket 848. The knurled rollers 841 and 846 are in this manner held in position to cooperate with knurled rollers 849 sleeved together, the sleeve and rollers 849 are loose on the stud 417. Secured to the side of each roll 849 is a gear 850 meshing with a pinion 851 fast on a shaft 852 mounted in the frame 366, and the plate 799. The pinion 851 nearest the frame 366 meshes with a gear 853 lose on the stud 418. The gear 853 meshes with a gear 854 (Figs. 26 and 34) loose on a stud 855 on the frame 365. Secured to the gear 854 is a ratchet 856 (Figs. 40). Cooperating with the ratchet 856 is a pawl 857 pivoted on a stud 858 on a pitman 859 bifurcated to straddle the stud 855. A spring 860 stretched between the pawl 857 and a hook 861 integral with the pitman holds the pawl in engagement with the ratchet. The pitman 859 is pivoted to an arm 862 mounted on a stud 863 on the frame 365. Pivoted to the arm 862 at 864 is a pitman 865 which has a slot 866 in which a roller 867 surrounding the shaft 371 operates. The pitman 865 carries an anti-friction roller 868 projecting into a cam groove 869 (Fig. 45) in the disk 570. A spring 870 is stretched between the pitman 865 and a hook on the arm 862 to assist the cam 570 in its movement of the pitman 865.

During the counter-clockwise rotation of the shaft 371 the pitman 865 is moved to the left and rocks the arm 862 counter-clockwise and moves the pitman 859 to the left (Fig. 40). The cam race 869 has a quick drop so located that near the end of the operation of the shaft 371 and after the check has been severed from the check roll, it causes the pitman 865 to be moved to the right whereby the pitman 859 is moved again to the right to the position shown in Fig. 40. The spring 870 is so connected to the arm 862 that the slight rocking of the arm does not change the center of pull of said spring. In other words, the spring 870 does not rock the arm 862 except through its pull on the pitman 865 which takes place immediately after the roller 868 passes the high point of the cam race 869. The movement of the pitman 859 to the right causes the pawl 857 to rotate the ratchet 856 very rapidly. The pawl 857 has a surface 871 which engages a stud 872 on the frame 365 to keep the ratchet from spinning or being "over-thrown". To prevent retrograde movement of the ratchet 856 there is provided a pawl 873 pivoted to the frame 366 and held in contact with the ratchet by gravity and suitable springs.

The pawl 857 will not cooperate with the ratchet 856 unless the severing mechanism is operated. An arm 894 (Figs. 26, 34 and 40) normally lies in the path of a pin carried by the pawl 857, so that when the pitman 859 is moved towards the left (Fig. 40) the pin will ride up on the end of arm 894 and disengage the pawl from the ratchet 856. However, when the severing mechanism is operated, the arm 894 is rocked clockwise, due to the engagement of an arm 895 (Fig. 34) with a pin carried by arm 824, and this movement will remove the arm 894 from the path of the pin on pawl 857. Therefore, upon the operation of this pawl it will engage the ratchet and operate the ejecting mechanism, as will be presently described.

Counter-clockwise movement of the ratchet 856 rotates the gear 854 counter-clockwise and through the gears 853 and 850 and pinions 852 the knurled disks 849 are rotated very rapidly in a clockwise direction through an angle of 180°. As shown in Fig. 34 the disks 849 each have two flat sides 873. One of these flat sides is normally beneath the knurled disks 841 and 846. The check paper lies between these two pairs of knurled disks. From the above description it can be seen that as the disks 849 are rapidly rotated clockwise their unmutilated peripheries engage the under side of the check and through the pressure exerted by the spring-pressed rollers 841 and 846 the severed check is quickly ejected from the machine onto a ledge 875 of the printer cabinet.

Slip printing mechanism

The machine is designed to print upon an inserted slip or other paper substantially like the sample slip illustrated in Fig. 62. The slip is placed on a table 877 (Figs. 1, 21, 25, 27 and 30) and the impressions are made on the slip from the lower set of type wheels 416, 441 and 445 (Figs. 27, 30, 53 and 55).

Loose on the shaft 626 (Figs. 21, 26, 27 and 30) is a pair of arms 878 made integral by a yoke 879. The arms 878 have integral therewith a U-bar 890 carrying a platen 891 of rubber or some other resilient material thus forming a hammer. Fast on the shaft 626 is a lever 892 normally held in engagement with a pin 900 on the rear arm 878 by a spring 901 stretched between said lever and said pin. There is another platen 902 (Figs. 26 and 30) adapted to print on the inserted slip. This platen is supported in a U-bar 903 carried by a single arm 904 identical with the arm 878 carrying the pin 900. This arm carries a pin 905 (Fig. 26), normally held in engagement with a lever 906 like the lever 892 and also fast on shaft 626.

Also fast on this shaft 626 is an arm 907 (Figs. 26 and 27) carrying a roller 908 cooperating with a cam 909 attached to a gear 910 by a hub, said gear being loose on shaft 713. The gear 910 meshes with a gear 911 secured to the side of a gear 912 loose on shaft 605. The gear 912 meshes with a gear 913 fast on shaft 371. Counter-clockwise movement of the shaft 371 through the gearing just described rotates the cam 909 counter-clockwise (Fig. 27). This cam has a high point followed by a sharp drop so that during the counter-clockwise movement of the cam the arm 909, shaft 626 and levers 892 and 906 are rocked clockwise. This movement of the levers 892 and 906 permits the arms 878 and 904 to rock clockwise by gravity assisted by their springs, thereby lowering the platens 891 and 902.

There is a powerful spring 914 (Figs. 26 and 30) extending between a pin on the lever 906 and a stud 915 on the frame 366. When the roller 908 on arm 907 passes the high point on the cam 909 the spring 914 gives the levers 892 and 906 a rapid counter-clockwise movement. The engagement of lever 892 with the pin 900 on arm 878 and the engagement of the lever 906 with the pin 905 on arm 904 causes these arms and the platens carried thereby to be also rocked rapidly counter-clockwise to bring them into contact with the lower set of type wheels to make an impression on the inserted slip. If the transaction consists of several items the slip is fed towards the right after each impression and only the platen 902 is forced against the type, as will be hereinafter described. An opening is made in the table to permit the platens to project therethrough.

The means for putting a tension on the slip so that it cannot move while the impressions are being made thereon and the means for feeding the slip between impressions in item printing transactions will now be described.

Fast on the shaft 491 (Figs. 27 and 30) mounted in the frames 365 and 366 is a lever 916 carrying a stud 917 upon which are rotatably mounted two knurled rollers 918 and 919. These rollers are connected by a sleeve 920 so that they will rotate together. Fast on shaft 491 is an arm 921 to the lower end of which is fastened a spring 922 stretched between this arm and a stud projecting from the frame 366. As this spring is always under tension it can be seen that the shaft and arm 916, and therefore the rollers 918 and 919, constantly tend to rock in a clockwise direction (Fig. 30) to bring the rollers 918 and 919 into contact with the lower side of the slip and press said slip against a roller 899 on a stud 1487. The rollers 918 and 919 are normally prevented from yielding to said spring pressure. When totals or single items are being printed the tension is not required and the rollers are not raised. When, however, a plurality of items are being printed, it is necessary to maintain the tension until after all of the items and the total thereof are printed so that the slip can be fed between impressions. The movement of the rollers into tensioning and feeding position is therefore controlled by the "item" and "total" bank of keys in a manner to be presently described. Fast on the shaft 491 is a downwardly extending arm 923 (Fig. 40) to the lower end of which is pivoted a link 924 bifurcated to surround the shaft 380. The link 924 carries a roller 925 which in its normal position abuts against the periphery of a segmental plate 926 fast on the shaft 380 for the "release bank" (Fig. 6), and thereby prevents the arm 923 and therefore shaft 491, arm 916 and rollers 918 and 919 from being rocked in a clockwise direction by the spring 922.

The differential mechanism for the release bank will rock shaft 380 and plate 926 to one of two positions depending upon which of the two release keys is depressed. If the "item" key 73 is depressed the plate 926 will be rocked far enough to present a depression 927 cut therein to the roller 925 on link 924. The spring 922 will immediately act to rock the rollers 918 and 919 up into tensioning and feeding positions. They will remain in these positions as long as items are being entered. When, however, the "total" key 74 is depressed the differential mechanism will rock the plate 926 farther than on item printing operations and will present a portion of its unmutilated periphery to the roller 925. The rollers 918 and 919 will therefore be prevented from rising to tensioning and feeding position as above described.

During item printing operations the rollers are moved into tensioning position near the beginning of the operation, and are held in this position until a total printing operation is had. After each item is printed on the inserted slip, said slip is fed one space toward the left to bring a new line beneath the type wheels. The feeding is accomplished by rotating the rollers 918 and 919 in a counter-clockwise direction (Fig. 27). Loose on the stud 917 is an arm 930 having pivoted thereto at 931 a link 932 also pivoted on a stud 933 projecting from an arm 934 loose on the shaft 491. Also pivoted on the stud 933 is a link 935 pivoted on a stud 936 carried by an arm 937 loose on shaft 713. Also pivoted to arm 937 is one end of a pitman 938 (Figs. 27 and 29) which at its opposite end is bifurcated to straddle shaft 371. This pitman carries a roller 939 which cooperates with a groove 940 in cam disk 467 above described fast on said shaft 371.

Clockwise movement of the disk 467 (Fig. 29) moves the pitman 938 to the left, or to the right as seen in Fig. 27, thereby rocking arm 937 and link 935 toward the right (Fig. 27). This rocks the arm 934 counter-clockwise and moves the link 932 towards the right which rocks the arm 930 counter-clockwise. The arm 930 carries a loosely mounted roller 941 engaged by a spring-pressed plunger (not shown). This roller 941 is mounted in a recess 942 of the arm 930. Counter-clockwise movement of the arm 930 causes the roller 941 to become slightly wedged between the edge of the recess 942 of arm 930 and the inner periphery of roller 919, whereby this roller is rotated counter-clockwise far enough to feed the slip one space to the left. When, after the impression has been made on the slip, the cam groove 940 causes the arm 930 to rock clockwise, the roller 941 will engage the spring plunger carried by said arm 930 and will force it inwardly. This will permit the arm 930 to return to its normal position without moving the roller 919.

When items are being printed mechanism is provided to prevent the date, consecutive number, clerk's initials, etc., from being printed on the slip. This part of the impression is made by the large section 891 of the platen. This section is normally crippled and is made operative when totals are to be printed so that the complete impression will be made. The outside one of arms 878 which carry platen 891 has a downwardly extending projection 945. Fast on a sleeve 946 surrounding a shaft 947 is an arm 948 which normally abuts against the bottom of projection 945. This prevents the platen from being lowered and therefore when the lever 892 is given its fast counter-clockwise rotation to make the impression, the platen will not be moved.

The platen is rendered effective under control of a portion of the same mechanism that controls the effectivity of the upper platen. By reference to Fig. 40 it will be remembered that the upper platen is ineffective so long as the solid portion of the stud 804 remains in front of the hook 802 on lever 567. When the "total" key is depressed the stud 804 is slid so that its recess is opposite the hook 802 thus permitting lever 567 to be rocked first clockwise and then counter-clockwise to normal position. The lever 567 has a downwardly extending arm 949 (Figs. 34, 40 and 44) to which is pivoted a link 950 which at its opposite end is pivoted to an arm 951 fast on the sleeve 946. When the lever 567 is given its clockwise movement the link 950 will be rocked towards the left (Fig. 40) which will rock arm 951, sleeve 946, and arm 948 clockwise (Figs. 21 and 27). This will remove said arm from under the projection 945 and thereby allow the platen to operate in its normal manner. Near the end of the operation the lever 567 will be rocked counter-clockwise to normal position which will, through the above described parts, rock the arm 948 again beneath projection 945 and render the platen 891 ineffective until the "total" key is again depressed.

When there is no slip in the machine both platens 891 and 902 are prevented from contacting with the type wheels. Pivoted on a stud 952 (Fig. 21) is a feeler 953 engaging a stud 954 on a pitman 955 carrying a roller 956 cooperating with a cam 957 fast on the shaft 371. The roller 956 is held in contact with the cam 957 by a spring 958 stretched between a pin on the pitman and a pin on the frame 365. The pitman 955 is pivoted to a lever 959 fast on the shaft 947. The feeler 953 has a vertical finger 960 normally in the position shown in Fig. 21. Upon counter-clockwise rotation of the cam 957 the pitman 955 is moved to the right by the spring 958. If there is no slip in the machine the finger 960 of the feeler 953 passes through an opening in the table 877 and the pitman 955 rocks the lever 959 and shaft 947 counter-clockwise. Fast on this shaft are two arms 961 and 962 adapted to cooperate with downwardly extending projections 945 and 963 on the U-bars 890 and 903.

When the shaft 947 is rocked counter-clockwise, as above described, the arms 961 and 962 are brought beneath the projections 945 and 963. With the parts in the position just described the clockwise movement of the levers 892 and 906 stretches the spring 901 and spring 914 but due to the arms 961 and 962 being beneath the projections 945 and 963, the springs 901 cannot pull the platens downwardly. Therefore, when the roller 908 drops off the high point of the cam 909 the spring 914 rocks arms 906 and 892 to their normal positions, but as the platens 891 and 902 were not lowered they will not be moved against the type. As the cam 957 nears the completion of its rotation the high portion thereon engages the roller 956 and moves the pitman 955 to the left (Fig. 21) to normal position thereby rocking the levers 961 and 962 out of engagement with the projections 945 and 963.

When there is a slip in the machine the finger 960 of the feeler 953 engages the under side of the slip and as a consequence, said feeler is rocked only slightly in a counter-clockwise direction when the high point of the cam 957 leaves the roller 956, the spring 958 not being strong enough to cause the finger 960 to break the slip.

Secured to the previously described shaft 461 is a lever 965 carrying a pawl 966 pivoted at 967. A spring 968 is stretched between said pawl and the lever 965. A slide 969 mounted on a stud 970 on lever 959 and the shaft 947 is held in the position shown by a spring 971 stretched between said slide and a pin on the lever 959. The shaft 461, as previously described, is rocked first counter-clockwise and then clockwise. Counter-clockwise movement of the shaft 461 does not take place until after the feeler 953 is rocked counter-clockwise to "feel" for the slip. If there is a slip in the machine the pawl 966 upon counter-clockwise movement of the shaft 461, engages a pin 972 carried by slide 969 and through this slide prevents the lever 959 from being rocked by the spring 958. This engagement of the pawl and pin also prevents the pitman 955 from being moved to the right after the finger 960 strikes the slip, thus allowing the platens 891 and 902 to be lowered. After the impression has been made on the slip the shaft 461 is rocked clockwise to normal position thereby moving the pawl 966 to the position shown in Fig. 21.

If there is no slip in the machine, then finger 960 projects through the table 877 far enough to allow the spring 958 to rock the lever 959 to position the arms 961 and 962 underneath the projections 945 and 963, and positions the pin 972 so that during the counter-clockwise movement of the lever 965 the pawl 966 passes under the pin 972. During this operation when there is no slip in the machine, the pawl 966 is moved to its normal position at about the same time that the pitman 955 and lever 959 are restored to their normal positions. Therefore, as said lever 959 is rocked clockwise the pin 972 strikes the pawl and causes said pawl to rock clockwise until the pin is passed, after which the spring 968 restores the pawl to the position shown in which the spring pin on the pawl limits the clockwise movement of the pawl by its engagement with a nose of the lever 965.

When a slip is in the machine there is provided means for printing a letter "S" on the check, detail strip and slip. This "S" is in the zero position of the highest amount type wheel 416. When there is no slip in the machine this letter "S" is not printed on either the detail strip or check. As previously described there is a "zero elimination" mechanism in the machine whereby the zeros to the left of the highest amount are eliminated. As above mentioned the letter "S" occupies the zero position on the highest amount wheel. Therefore when the "S" is to be printed it is necessary to cripple the zero elimination mechanism for the highest amount rack when a slip is in the machine.

The pitman 955 carries a pin 974 extending into a slot 975 of an arm 976, fast on a shaft 977 (Fig. 21). Fast on the other end of this shaft is an arm 978 (Fig. 51) carrying a pin 979 projecting into a slot 980 of a lever 981 loose on the shaft 501. An edge of the lever 981 normally rests against a foot 982 on the lever 504 associated with the rack 385 of highest denomination and holds said lever in the position shown whereby its shoulder 505 does not engage the notch 506 of said rack.

When a slip is in the machine the pitman 955 is moved only slightly to the right (Fig. 21) as above described. This movement through the engagement of the pin 974 with the slot 975 rocks the arm 976, shaft 977 and arm 978 counter-clockwise (Figs. 21 and 46) and clockwise (Fig. 51). This movement does not move the pin 979 out of the substantially horizontal portion of the slot 980. Therefore, the lever 981 is held in the position shown wherein its edge remains in engagement with the foot 982 and does not permit the spring 518 to rock this lever counter-clockwise (Fig. 51). From the above description it can be clearly seen that with the lever 504 held in the position shown in Fig. 51 by the lever 981 the shoulder 505 of said lever 504 cannot engage the notch 506 of the highest amount rack 385 to move said rack from its zero position when the other levers 504 eliminate their respective racks. Therefore, the highest amount type wheels remain in the zero positions to print the letter "S" on the slip, check and detail strip.

When there is no slip in the machine and no amount registered on the totalizer the pitman 955 moves a greater distance to the right (Fig. 21), thereby rocking the arms 976 and 978 a greater distance. This moves the pin 979 into the substantially vertical portion of the slot 980, thereby rocking the lever 981 counter-clockwise (Fig. 51) whereby the shoulder 505 of the lever 504 engages the notch 506 of the rack 385 and as the levers are moved to the right (Fig. 51), as previously described, this rack 385 of highest denomination is moved from its zero or "S" position to move the type wheel to present a non-print face to the printing line.

Ribbon mechanism

The means for inking the upper and lower sets of type wheels is an ink ribbon 984 (Figs. 27 and 30) supported by sleeves 985 secured to the plate 419 (Figs. 21 and 25) and an ink roll 986 loose on a rod 987 carried by the plate 419. The roll 986 is made of felt or some other suitable ink receiving material. The sleeves 985 are supported by studs 988 and 677 on the frame 366. This manner of mounting the ribbon is convenient in that by removing the plate 419 the entire ribbon and ink roll may be easily removed from the machine. The plate 419 has openings therein for the date knobs and for the insertion of the key 468 (Fig. 21).

A tension is maintained on the ribbon 984 by a roller 989 on a rod 990 (Figs. 27 and 30) supported by parallel arms 1000 loose on a stud 1001 mounted in the frame 366 and supported at its outer end by an arm 1002 (Fig. 21) supported on the plate 419. This roller is held against the ribbon by the force of gravity.

Secured to the roller 986 is a ratchet 1003 (Fig. 35). Loose on the stud 987 is an arm 1004 carrying a spring-pressed driving pawl 1005 engaging the ratchet 1003. Pivoted to the arm 1004 is a link 1006 (Fig. 34) which at its lower end carries a pin 1007 projecting into a slot 1008 formed in the previously described lever 460. A spring 1009 extending between a stud 1010 and a stud on the frame tends to hold the stud 1010 in engagement with a toe 1011 of a lever 1012 loose on the stud 1001, thereby limiting the downward movement of the link 1006.

It will be recalled that the lever 460 is rocked first counter-clockwise (Fig. 34) and then clockwise to normal position to advance the consecutive number type wheels one step. When this movement takes place the link 1006 will be raised and the pawl 1005 will turn the ratchet 1003 and feed the ink ribbon far enough to bring a freshly inked surface to the printing position. The link 1006 will be returned to its normal position by the spring 1009. To prevent clockwise or retrograde movement of the ratchet 1003 a spring-pressed retaining pawl 1013 is always in engagement with said ratchet.

The ribbon 984 has a seam 1014 (Figs. 27 and 30) straight across said ribbon, and as an impression of the type through said seam is not clear, a mechanism is provided for feeding the ribbon a greater distance as the seam approaches the platens 552ª, 552ᶜ, and 552ᵈ and 902 so that said seam is always moved past these platens and never stops at the printing line.

Secured to the ribbon 984 are two metal buttons 1015 cooperating with a flange 1016 (Fig. 30) of an arm 1017 rigid with the lever 1012. When one of the buttons 1015 engages the flange 1016 during the movement of the ribbon it rocks the arm 1017 and the lever 1012 clockwise and disengages the toe 1011 from the pin 1010 on the link 1006 thereby allowing the spring 1009 to move said link downwardly, whereby the pin is moved near to the lower end of the slot. Downward movement of the link 1006 also rocks the arm 1004 a greater distance than previously described.

With the parts in this position, when the lever 460 is given its clockwise movement, the bottom of the slot 1008 will strike the pin 1007 almost at once and the link 1006 will be raised to a much greater extent to rotate the arm 1004 and its pawl 1005 to turn the ratchet 1003 and ribbon 984 far enough to feed the seam past the printing line. During this movement of the ribbon the button which caused the long feed is moved past the flange on the arm 1017 so that the lever 1012 by its own weight is rocked counter-clockwise after the pin 1010 has been moved to its highest position and when the lever 460 is rocked clockwise to its normal position, the spring 1009 pulls the link 1006 downwardly until the pin 1010 engages the toe 1011 on the lever 1012. These two buttons are so positioned on the ribbon that the seam 1014 is always fed past the upper and lower sets of type wheels to prevent the platens 552ª, 552ᶜ, and 552ᵈ and 902 from contacting with said seam.

Total and sub-total mechanism

The tripped transfer devices are not restored to untripped position until that operation of the machine succeeding the one in which the adding occurs, and in order to allow sufficient time for the selection of a desired totalizer and its engagement with the actuating segments 229, when a total or sub-total is to be printed, the main drive shaft 62 is given two continuous rotations for said total and sub-total printing operations instead of one, as is the case in adding operations. During the first rotation of the shaft 62 the tripped transfer devices are restored to untripped position, and one of the totalizers is moved into engagement with its segments 229 and during the second rotation of the shaft the engaged totalizer pinions 231 control the extent of movement of the differentially movable actuators and hence the setting of the type wheels to print a total or sub-total on the record strip.

To permit two rotations of the shaft 62 in total and sub-total operations the lever 75 controls mechanism shown in Figs. 3 and 4 to prevent the restoring of the motor locking arm 177 (Fig. 2) to normal locking position until near the end of the second rotation.

Slidably mounted on the stud 67 (Figs. 3 and 4) is a link 1021, one end of which is pivoted to a lever 1022 loose on the stud 204. Pivoted to the lever 1022 is a link 1023 also pivoted to an arm 1024 fast on the shaft 1025 supported by the side frames of the machine. The link 1021 has two pins 1026, one on each side of a lip 1027 of a coupling bar 1028 slidably mounted in a groove 1029 in a disk 1030. The link 1021 also has an anti-friction roller 1031 normally in engagement with a notch in the disk 1030. The gear 66 has a circular-cut in which the disk 1030 lies.

Fast on shaft 1025 (Figs. 18B and 20) is an arm 1032 carrying a pin 1033 projecting into a slot 1034 in the previously described lever 351.

From previous description it will be remembered that the movement of the total lever 75 either up or down for a sub-total or total operation, respectively, rocks the lever 353 counter-clockwise through the engagement of its pin 354 with the slot 355 in the plate 212, whereby through the spring 358, the lever 351 is rocked counter-clockwise. This movement, through the pin 1033, rocks the arm 1032 and the shaft 1025 clockwise (Fig. 20). Clockwise movement of the shaft 1025 (Fig. 3) rocks the arm 1024 clockwise whereby through the link 1023 the lever 1022 is rocked clockwise and moves the link 1021 to the left in the direction of its length. This movement of the link 1021 through the engagement of its pins 1026 with the bar 1028 moves said bar to the left into engagement with a notch 1035 in the gear 66, thus connecting said gear and the disk 1030. At the same time the roller 1031 is moved into a cam slot 1036 in the disk 1030. The movement of the link 1021 also rocks the link 203 clockwise about the stud 200. As the disk 1030 is connected to the gear 66, the counter-clockwise movement of said gear and disk through the cam roll 1031 moves the link 1021 still farther to the left and rocks the link 202 still farther so that when the arm 205 is lowered near the end of the first half rotation of the gear 66 by the node 210, as described in adding operations, the stud 206 moves idly in the elongated portion of the opening 207 thus preventing the link 203 from rocking the shaft 91 to rock the lever 170 to normal position. As the lever 170 is not rocked to normal position the lever 177 is not locked near the end of the first rotation of the shaft 62 when the pin 187 raises the link 186 to rock the lever 177 to normal, therefore, the spring 175 immediately rocks the lever 177 to allow the motor clutch to drive the gears and shaft 62 a second rotation. Near the end of the complete rotation of the gear 66 the link 1021 is moved to the position to which it was adjusted by the total lever so that when the arm 205 is rocked clockwise the second time by the second node 210 the stud 206 engages a shoulder 1040 in the opening 207 to lower the link 203, to rock the lever 201 and shaft 91 counter-clockwise (Fig. 3) slightly past normal position, but not as far past normal as in adding operations, because in adding operations this movement releases the depressed amount keys. Just before this movement of the lever 170, the pin 187 (Fig. 2) engages the lower end of the lever 186 and raises said lever thereby rocking arm 173 clockwise. This movement also rocks lever 177 clockwise to the position in which it will engage the shoulder 188 and stop the motor. The hook 171 of lever 170 will then pass beneath the roller 172 on arm 173 and hold the parts in their normal positions. The shaft 91 is rocked slightly past normal position so that the stud 133 is moved to the rear of the lever 135 and said lever is rocked clockwise (Fig. 7) by the spring 137 to prevent an immediate second operation of the machine when the total lever is out of adding position. With the lever 135 in front of the stud 133 when the total lever is out of adding position, the bar 127 moves upwardly under spring action and rocks the arm 132 counter-clockwise to normal position to shift the lever 135 out from in front of the stud 133 and the spring 194 (Fig. 3) rocks the shaft 91 and arm 134 (Fig. 7) to normal position. In adding operations the shaft 91 is rocked farther past normal position than in total and sub-total operations to lower the detent 76 for releasing the depressed amount keys but during total and sub-total operations the amount keys are held against depression by a rod 1038, carried by a plurality of arms 1039, secured to the shaft 1025, which rod 1038 is rocked into the path of the arms 78, to prevent movement of the detent 76. The movement of the rod 1038 into the path of the arm 78 is effected by the total lever through the connections which rock the shaft 1025, hereinbefore described. Thus, during total and sub-total taking operations, the shaft 91 cannot be rocked far enough to move the detent 76, since an attempt to do so would cause the arm 78 to jam against the rod 1038.

In totalizing operations a selected totalizer is moved into engagement with the segments 229 before said segments are moved by the segments 233 and latches 234, whereby the differential movement of the segments 229 is controlled by the totalizer pinions 231. After the actuators have been moved differentially under the control of said totalizer the totalizer is disengaged from the actuator thereby leaving the totalizer at zero.

In sub-totalizing operations the totalizer is engaged with the actuators before the actuators are moved differentially and held in engagement with said actuators to control the differential movement thereof to print a sub-total. The totalizer is also held in engagement with the actuators while said actuators are being restored, thereby accumulating upon the totalizer the amount which was taken therefrom.

The mechanism for controlling the engaging and disengaging of the totalizers relatively to their actuators in total and sub-total operations will be hereinafter described.

The mechanism whereby said totalizer controls the differential movement of the actuators during total and sub-total operations will now be described. Pivoted on a stud 1041 (Fig. 18A) on the plate 215 is a lever 1042 carrying a pin 1043 projecting into a slot 1044 in the total lever plate 212. The lever 1042 has a slot 1045 into which projects a pin 1046 on a link 1047. The pin 1046 normally engages a notch 1048 in the stationary plate 215. The link 1047 is pivoted to an arm 1049 fast on the shaft 131. There are three levers 1042 and three of each of the other elements just described. One set of elements is adapted to cooperate with each one of the sets of totalizers there being three sets of totalizers in the machine shown. The slots 1044 are all of different shapes. When the total lever 75 is moved to the first position above or below the adding position the lever 1042 associated with the "item" totalizer is rocked counter-clockwise (Fig. 18A) whereby the pin 1046 is disengaged from the notch 1048 and engaged with a notch 1050 in a disk 1051 secured to the previously described hub 213. When the total lever 75 is moved to the second position above or below adding position the lever 1042 associated with the "clerk's" totalizer is rocked counter-clockwise to disengage its pin 1046 from the notch 1048 in plate 215 and cause it to be engaged with the notch 1050 in the disk 1051. When the total lever 73 is moved to the extreme upper or lower position the lever 1042 associated with the "transaction" totalizers is rocked counter-clockwise to disengage its pin 1046 from the notch 1048 and cause said pin to be engaged by notch 1050 in disk 1051.

As previously described, in adding operations the spider 312 (Fig. 18B) is rocked first clockwise and then counter-clockwise to engage and disengage the selected totalizer with the actuators. The hub 213 as previously described is secured to the spider 312, therefore when said spider is rocked, the disk 1051 is rocked first clockwise and then counter-clockwise (Fig. 18A).

For illustrative purposes, let it be assumed that the total lever has been moved downwardly to the "item total" position which is the first position below the adding position. Movement of the lever 75 to this position disengages the pin 1046 from the stationary slot 1048 in plate 215 and engages it with the notch 1050 in the disk 1051. After this has taken place and during the operation of the machine, the disk 1051 is rocked first clockwise and then counter-clockwise to normal position. The clockwise movement of the disk 1051 through the engagement of the notch 1050 with the pin 1046 moves the upper link 1047 downwardly thereby rocking the shaft 131 counter-clockwise.

Means for disconnecting the differential latches 234 from their drivers 233 on totalizing operations will now be described. Each totalizer pinion 231 has a long tooth 1125 in the zero position (Fig. 5A). As the pinion 231 is rotated backwardly on totalizing operations by the segment 229 the long tooth strikes an arm 1126 pivoted on a stud in the frame 226. Another arm, 1127, hubbed to arm 1126, is pivoted to a short link 1128, which in turn is connected to another short link 1129 by a stud 1130. This link 1129 is pivotally connected to a lever 1131 pivoted to frame 226. The lever 1131 carries a half-round stud adapted to cooperate with notches 1132 cut in the inner periphery of a reset spider 1133. This spider 1133 has an arm 1134 integral therewith, which, at its end, has a slot 1135 into which projects a pin 1136 mounted in the bell crank 236 which disengages the latch from its driver on adding operations. It can be seen from Fig. 5A that the small links 1128 and 1129 form a toggle which is normally flexed. When the total lever 75 is moved it selects the line to be rocked into engagement, and also selects the latch controlling mechanism appropriate to that line, for operation. This mechanism in turn straightens the toggle formed by links 1128 and 1129 and rocks arm 1126 into position to be struck by the long tooth 1125 of the totalizer wheel.

Fast on the shaft 131 is a partial gear 1137 whose teeth mesh with teeth formed on the hub of an arm 1138 slotted at its opposite end to straddle the stud 1130. The shaft 131 is given a slight clockwise rotation which, through the gear 1137, rocks arm 1138 counter-clockwise and thereby straightens the above-mentioned toggle. Then when the long tooth 1125 strikes the arm 1126, the arm 1127 is rocked clockwise (Fig. 5A). This movement of arm 1127 through links 1128 and 1129, which are now in a straight line, rocks the lever 1131 counter-clockwise. This will cause the half-round stud carried by this lever to engage whichever one of the notches 1132 in spider 1133 is opposite it at the time and thereby, through arm 1134, disconnect the latch 234 on the differential mechanism from the driver 233.

It will be recalled that a key in the "trans." bank must be depressed before a key in the "clerks'" bank can be depressed and that a key in the "clerks'" bank must be depressed before a release key can be depressed. In total taking operations it is sometimes necessary to depress a "clerk's" or a "trans." key singly in order to select a particular totalizer for operation. In order to do this it is necessary to remove all the interferences which normally inhibit the action of these keys. This is done in the following manner. The total lever plate 212 has a slot 1140 in which operates a pin 1141 carried by a lever 1142 (Fig. 18A). This lever has an upwardly extending offset arm 1143 which carries a pin projecting into a slot in a link 1144 pivoted to the arm 155. This arm cooperates with the pin 151 to prevent depression of the release key, as above described. As shown in Fig. 11, the arm 155 is hubbed to arm 166. The arm 154 which prevents depression of the clerks' keys carries a pin 145 which extends in front of arm 160.

When the total lever is moved out of its adding position, the slot 1140 in plate 212 through pin 1141 rocks the lever 1142 and through link 1144 rocks the arm 155 clockwise (Fig. 18A). As this arm 155 is integral with arm 166 this arm is rocked likewise and strikes the pin 145 (Fig. 12) and carries arm 154 with it. Thus, the arms 154 and 155 which normally prevent depression of the clerks' and the release keys are rendered ineffective by the movement of the total lever.

*Total and sub-total—Totalizer engaging control*

As described in connection with the adding operation the selecting disks 313 and 314 control which of the totalizer lines is to be engaged with the actuators. In adding operations more than one totalizer may be engaged with the actuators, depending upon the positions of the disks 313 and 314 under control of the release and transaction keys. However in total and sub-total operations only one totalizer line can be rocked into engagement with the actuators at a time. Therefore it is necessary to render the totalizer engaging controlling mechanism, which operates in adding operations, ineffective, and to select the totalizer line and control its engaging and disengaging with the differential mechanism by the total lever 75. When said total lever is moved downwardly to one of its three lower positions the corresponding totalizer is rocked into engagement with the actuator to have the total taken therefrom. When the total lever 75 is moved upwardly to one of its three positions the corresponding totalizer is rocked into engagement with the actuator to have the sub-total taken therefrom.

As previously described in adding operations, the link 326 (Fig. 18B) is moved towards the right and through its engagement with the stud 324 rocks the spider 312 clockwise to engage the selected totalizer with the actuators after the actuators have been differentially positioned under the control of the amount keys. After the actuators have been returned to normal the link 326 is moved to the left to normal position to disengage the totalizer from the actuators. In total and sub-total operations the time of engaging and disengaging the totalizers is entirely different from that described in adding operations.

The total lever plate 212 has a slot 1053 (Fig. 18A) into which projects a pin 1054 supported by one of the levers 289 and an arm 1055 pivoted on the stud 290 of this particular lever 289. The slot 1053 has an enlarged offset 1056 within which the pin 1054 moves idly when the lever 289 is rocked clockwise during adding operations. When the lever 75 is moved to position for total or sub-total operations the slot 1053 through its engagement with pin 1054 rocks the lever 289 clockwise and moves all of the levers 293 far enough to position the pins 304 away from the outer periphery of the disks 313 and 314. When the pin 1054 rocks the one lever 289 the other two are rocked by the three-armed lever 287. Any subsequent movement of the disks 313 and 314 has no effect upon the levers 293 or links 279 for engaging the totalizers with the differential actuators, as would be the case during adding operations.

It has been previously described that a movement of the total lever 75 into position for taking totals or sub-totals causes a movement of the lever 353 in a counter-clockwise direction (Figs. 18A and 20). Pivoted to the lever 353 is a link 1060 also connected to the stud 297 normally engaged by the hook 298 of the lever 299. Counter-clockwise movement of the lever 353 (Fig. 18A) moves the link 1060 to the right thereby disengaging the stud 297 from the lever 299 and rocking the link 296 counter-clockwise about the stud 290. It will be remembered that the lever 299 is actuated by the cam 303 during adding operations to move the link 296 downwardly and rock all of the levers 289 to actuate the pins 304 to select the totalizers to be meshed with the differential actuators. By disconnecting the link 296 from the lever 299 the driving connection between the cam 303 and the levers 289 is interrupted. Since the operation or the condition set up by the total lever 75, as just described, has crippled the automatic means for selecting which of the totalizers are to be meshed with the differential actuators, means are provided for setting up a condition by the total lever itself for determining which totalizer line is to be engaged with the differential actuators. The total lever plate 212 has three irregularly shaped slots 305 (Figs. 18A and 20) each slot receiving one of the pins 304 on the levers 293. These slots are so shaped that when the total lever 75 is moved downwardly to total or reset positions, the pins 304 are moved radially away from the rod 214. Since the levers 289 are held stationary after being rocked clockwise by the total lever the movement of the pins 304 causes a clockwise movement of the levers 293 around the studs 292 and by the connection of said levers and the links 279, said links are moved outwardly. This movement of the links 279 positions the pins 306 within the hooks 311 of the spider 312, whereby when said spider is rocked clockwise as previously described, the links 279 rock the totalizers associated therewith into mesh with the differential actuators. Each of the slots 305 has a different shape so that the pins 304 are moved alternately whereby their associated pins 306 are moved alternately into engagement with the hooks 311. In other words, only one of the pins 306 can be engaged with its hook 311 at one time during totalizing operations.

This same condition is true when the total lever 75 is moved upwardly to its sub-total or reading positions, as the slots 305 have the same shapes on each side of the position where the pins 304 normally engage said slots.

From the above it can be seen that only one totalizer line can be selected during a total or sub-total operation to be rocked into engagement with the actuators. The previously described slots 1044 (Fig. 18A) are also of different shape so that if for instance the lower pin 306 is moved to engage its hook 311, the lower slot 1044 moves its pin 1043 and rocks the lower shaft 131 to move the pawls associated with the lower totalizer into position to be acted upon by the long teeth of the lower line of totalizers.

In totalizing operations the link 326 is moved to a different position from that shown in Fig. 18B. This is done by the total lever 75 preliminary to an operation of the cam shaft 62 so that the time of the engaging and disengaging of the totalizers may be changed in accordance with the desired operation. When the total lever 75 is moved counter-clockwise (Fig. 18A) for a totalizing operation a slot 1062 therein through its engagement with a pin 1063 on a lever 1064 (Fig. 18B) pivoted on a stud 1065 on the plate 291, rocks said lever 1064 clockwise. At the same time the lever 353 is rocked counter-clockwise by the slot 355. Pivoted at 1066 to the arm 1032 is a link 1067 which carries a stud 1068 extending into a slot 1069 in the lever 1064, and in the straight portion of a slot 1070 in a lever 1071 pivoted in the stud 1065.

Clockwise movement of the lever 1064, through the stud 1068 rocks the lever 1071 clockwise about the stud 1065 and through the engagement of a pin 1072 with a slot 1073 in the link 326, rocks said link counter-clockwise about the stud 327 and disengages said link from the stud 324 on the spider 312.

The lever 1071 has a slot 1074 engaging a pin 1075 on a lever 1076 pivoted on a stud 1077 on the plate 291. The lever 1076 carries a pin 1078. Clockwise movement of the lever 1071 through the engagement of its slot 1074 with the pin 1075 rocks the lever 1076 counter-clockwise whereby the pin 1078 engages a notch 1079 in the spider 312 and positively locks said spider in this position until one of the pins 306 has been engaged with one of the hooks 311 on said spider. Downward movement of the total lever 75 also rocks the shaft 1025 clockwise (Fig. 18B), as previously described, thereby lowering the link 1067 so that the stud 1068 is moved downwardly a short distance but not far enough to engage the cam portion of the slot 1070.

Movement of the total lever 75 downwardly also connects the disk 1030 (Fig. 3) with the gear 66 and moves the link 203 to such a position that the gear 66 is allowed to make one complete rotation, thereby giving two rotations to the gear 68 and shaft 62.

After the parts have been moved to the position just described by the movement of the total lever 75 the motor is released to give the shaft 62 two complete rotations in a clockwise direction.

During the first rotation of the shaft 62 the lever 328 is rocked clockwise and moves the link 326 to the right and positions a notch 1080 directly above a pin 1081 on the spider 312. Immediately after this has taken place the cam race 1036 (Fig. 3) moves the link 1021 to the left and rocks the shaft 1025 still farther in a clockwise direction. This movement of the shaft 1025 moves the link 1067 downwardly whereby the stud 1068 through its engagement with the cam portion of the slot 1070 rocks the lever 1071 still farther clockwise and through the engagement of its pin 1072 with the slot 1073 rocks the link 326 still farther counter-clockwise about the stud 327 and engages the notch 1080 with the pin 1081 on the spider 312. The clockwise movement of the lever 1071 just described also, through the engagement of its slot 1074 with the pin 1075 rocks the lever 1076 clockwise and disengages the pin 1078 from the notch 1079. After the notch 1080 engages the pin 1081 and during the last part of the first rotation of the shaft 62, the lever 328 is rocked counter-clockwise and moves the link 326 to the left thereby rotating the spider 312 clockwise. This movement of the spider through the engagement of one of its hooks with one of the pins 306 rocks the selected totalizer shaft as determined by the position of the total lever 75, into engagement with the totalizer actuators previously described. The totalizer is held in engagement with the actuators by the cams 332 and 333 until the actuators have been differentially positioned under the control of the long teeth on the totalizer pinions, in the manner previously described, after which the lever 328 is rocked clockwise and moves the link 326 to the right, which rocks the spider 312 counter-clockwise thereby disengaging the selected totalizer from the actuator. Immediately after the link 326 has been moved to the right the cam race 1036 (Fig. 3) rocks the shaft 1025 and arm 1932 counter-clockwise and raises the link 1067 which rocks the lever 1071 counter-clockwise, thereby rocking the link 326 clockwise about the stud 327. This movement of the link 326 disengages its notch 1080 from the pin 1081. After said disengagement the lever 328 is rocked counter-clockwise and moves the link 326 to the left to the position in which it was placed by the movement of the total lever 75.

After the link 326 is moved to the left as last described the total lever 75 is moved clockwise to its adding position, which rocks the lever 1064 counter-clockwise and raises the link 1067 and rocks the arm 1032 and shaft 1025 counter-clockwise to normal position. The upward movement of the link 1067 rocks the lever 1071 counter-clockwise to normal position and rocks the link 326 clockwise about stud 327 so that the notch 325 again engages the pin 324 on the spider 312.

From the above described operation it can be clearly seen that the totalizer line selected by the total lever is rocked into engagement with the totalizer actuators before said actuators are moved differentially, and held in engagement therewith until the differential movement of the actuators under control of the long teeth of the totalizer pinions, is completed, after which said totalizer is rocked out of engagement with the differential actuators thereby leaving the totalizer at zero.

The control of the engaging and disengaging of the totalizers during sub-totalizing operations will now be described. For a sub-total operation the total lever 75 is moved in a clockwise direction (Fig. 18A). This movement of the said lever does not rock the lever 1064 or the lever 1071 as in totalizing operations, because the slot 1062 is concentric with the center of the stud 214 for all positions of the total lever 75 above its adding position. However, clockwise movement of the total lever 75 through the engagement of the slot 355 and pin 354 rocks the lever 353 counter-clockwise in identically the same manner as said lever is rocked during the totalizing operation above described. This movement of the lever 353 also rocks the shaft 1025 clockwise, as above described, to connect the disk 1030 with the gear 66 (Fig. 3).

In sub-totalizing operations the gear 66 receives one complete rotation and shaft 62 and gear 68 receive two complete clockwise rotations in identically the same manner as described in connection with the totalizing operation. As the lever 1071 is not moved by the movement of the total lever 75 the link 326 remains in engagement with the pin 324 on the spider 312.

During the first clockwise movement of the lever 328 the link 326 is moved to the right and rocks the spider 312 clockwise and engages the selected totalizer with the differential actuators. After the totalizer has been engaged the cam race 1036 (Fig. 3) moves the link 1021 still further to the left, thereby rocking the shaft 1025 and arm 1032 clockwise, which lowers the link 1067, whereupon the stud 1068 engages the cam portion of the slot 1070 and rocks the lever 1071 clockwise about the stud 1072. Clockwise movement of the lever 1071 rocks the link 326 counter-clockwise about stud 327 and disengages the notch 325 from the pin 324 on the spider 312. This movement of the lever 1071 also rocks the lever 1076 counter-clockwise and its pin 1078 engages a notch 1083 in the spider 312 and positively locks said spider in this position thereby holding the totalizer in engagement with the actuators. Immediately after the disengagement of the link 326 from the pin 324 the lever 328 is rocked counter-clockwise and moves the link 326 to the left. This movement of said link is idle because it is not engaged with either the pin 324 or the pin 1081. The selected totalizer is now engaged with the differential actuators and said actuators are moved differentially under control of the long teeth on the totalizer pinions thereby resetting said totalizer to zero. As previously described, the amount which is on the totalizer is now printed from the type wheels. During the first part of the second rotation of the shaft 62 the differential actuators are again moved and due to the fact that the totalizer pinions are engaged therewith, the amount that was taken from said pinions is again accumulated thereon. The lever 328 is again rocked clockwise and moves the link 326 to the right and positions the notch 325 directly beneath the pin 324 on the spider 312. The race 1036 (Fig. 3) at this time moves the link 1021 to the right and rocks the shaft 1025 counter-clockwise and raises the link 1067, which rocks the lever 1071 counter-clockwise and thereby rocks the link 326 clockwise about the stud 327 so that it again engages the pin 324. This counter-clockwise movement of the lever 1071 rocks the lever 1076 clockwise and disengages its pin 1078 from the notch 1083 to allow the spider 312 to be rocked. The lever 328 is then rocked counter-clockwise to normal position and moves the link 326 to the left, thereby rocking the spider 312 counter-clockwise, which disengages the totalizer from the actuators.

The total lever 75 is then moved counter-clockwise to its normal adding position, and through the slot 355 and pin 354 rocks the lever 353 to normal position and raises the link 1067 to the position shown in Fig. 18B. This movement of the total lever also disconnects the disk 1030 (Fig. 6) from the gear 66 so that said disk is not rotated while the total lever 75 is in adding position.

From the above description, it can be clearly seen that during a sub-totalizing operation the totalizer is engaged with the actuators and reset to zero by the movement of said actuator, but said totalizer is maintained in engagement until the actuators are again moved, which operation puts back on the totalizer the amount which was taken therefrom so that at the end of a sub-totalizing operation the amount on the totalizer is the same as it was before the sub-totalizing operation was made.

*Zero elimination crippling on total and sub-total operations*

As previously described, the "zero elimination" mechanism in adding operations prevents the printing of cyphers to the left of the highest denomination represented by a digit except the highest amount rack which prints an "S" from the zero position at certain times. When the "S" is not printed this rack is eliminated by mechanism operated due to the absence of the slip in the machine. It will also be remembered that there is no lip 533 (Fig. 52) bent over in the plane of the lever 504 associated with the highest amount rack. Therefore, in total and sub-total operations it is necessary to cripple the zero elimination mechanism for the next to highest amount rack when there is an amount on the highest amount rack 385.

Integral with the lever 504 associated with the next to highest amount rack is an arm 1085 (Fig. 50) adapted to engage a lever 1086 pivoted on a stud 1087 on the frame 367. The lever 1086 has a nose 1088 contacting the periphery of a cam 1089 secured to the side of a segment 1090 loose on a stud 1100 on the frame 367. The segment 1090 meshes with teeth 1101 on the rack 385 of highest denomination.

As above stated, this rack is used only in adding operations to control the printing of the "S" when a slip is in the machine. In totalizing, if there is an amount on the highest totalizer pinion it moves its appropriate differential unit and thereby causes the rack 385 of highest denomination to be moved an extent commensurate with the amount upon this highest pinion. When this rack 385 is moved it rotates the segment 1090 clockwise in Fig. 51 and counter-clockwise in Fig. 50. This rotates the cam 1089 to the same extent, whereby said cam rocks the lever 1086 clockwise. When this occurs, the lever 504 through the engagement of the lever 1086 with the arm 1085, is rocked counter-clockwise to disengage its shoulder 505 from the notch 506 in the next to highest amount rack. This lever 504 through the lip 533 on the lever 504 associated with the next lower rack, rocks said next lower rack counter-clockwise, and so on to the right until all of the levers 504 have been rocked to disengage their shoulders from the notches 506 in the racks 385, thereby preventing these racks from being eliminated.

From the above description it is clear that if the total on the totalizer is $20,002.98, for instance, the zero elimination mechanism for the three next to highest amount racks is crippled or rendered ineffective in order that the racks may remain in zero position, whereby the type wheels are not moved and will print the three cyphers in the above mentioned number. When the differential unit of highest denomination is restored to its normal position the rack 385 associated therewith is moved to its zero position, thereby rotating the segment 1090 clockwise (Fig. 50) to the position shown, whereupon the cam 1089 is moved to its normal position, and due to the force of gravity, assisted by the spring 518 connected to the lever 504 associated with the rack next to that of highest denomination, rocks said lever clockwise, and through the engagement of its arm 1085, rocks the lever 1086 counter-clockwise to the position shown in Fig. 50.

In total and sub-total operations the word "Total" is printed to the right of the amount. The type for printing this word are carried on a type wheel 1105 (Fig. 53). There are six positions on this wheel for printing said word, three for totalizing and three for sub-totalizing operations. This wheel meshes with a pinion 1106 secured to one of the tubes 410. The other end of this tube carries a gear 1107 meshing with teeth 1108 (Fig. 46), on the upper edge of the rack 385 for the total lever. This rack is driven by a segment 1109 fast on a shaft 1110 identical with shafts 380, before described. On the opposite end of this shaft is a spiral gear 1111 meshing with a spiral segment 1112 connected by a link 1113 to the total lever plate 212. When the total lever is moved to any of its positions, either above or below adding position, the type wheel 1105 is positioned, through the above described mechanism, to print "total" on the detail strip, slip and check.

*Consecutive number crippling in total and sub-total operations*

In taking totals and sub-totals of the amount on the clerk and transaction totalizers it is desired to render the consecutive number driving mechanism ineffective. Secured to the end of shaft 1110 is a cam 1114 (Figs. 20 and 40). This cam cooperates with a stud 1115 carried by an arm 1116 of the lever 490. It will be remembered that a link 493 extends between a downwardly extending arm of said lever 490 and the link 457 (Fig. 34) which drives the consecutive number feeding mechanism. The cam 1114 is rocked counter-clockwise or clockwise, depending on how the total lever is manipulated, but it is so shaped that either movement of said cam to the second or third position out of normal position will rock lever 490 clockwise and thereby, through link 493, disengage the slot 458 in the lower end of link 457 from the pin 459 on lever 460. When, as previously described, the lever 460 is rocked clockwise (Fig. 34), to actuate the link 457, the said link will not be moved, as it is disconnected from said lever 460.

Key locks controlled by total lever

Means are provided, operated by the total lever, for controlling the depression of the clerks', transaction, and item keys. It will be recalled that on operations of the machine where the total of a plurality of items is printed, a key in both the clerks' and the transaction banks will be depressed. On this operation the total lever is moved to the first position below its adding position.

The movement of the total lever downwardly will rock the shaft 1110 (Fig. 46) clockwise. Fast on this shaft is a segment 1150 meshing with a segment 1151 carried by a downwardly extending arm 1152 loose on shaft 394. Integral with arm 1152 is a segment 1153 the teeth of which mesh with teeth formed on a slidable bar 1154 (Fig. 46) supported by the rod 412 and a stud 1155 which extend through a slot in said bar. In the upper edge of said bar are notches 1156 adapted to cooperate with the ends of the arms 123 appropriate to the clerks', transaction, and item keys.

If the bar 1154 is moved out of its adding position it will be impossible to depress the item key, as the arm 123 appropriate thereto will abut against a solid portion of the bar 1154. When the total lever is moved to the first position below its adding position in the operation above mentioned it can be seen that the bar will slide towards the left as the slots therein are wide enough to permit this movement. However, if it is desired to take a total from any of the clerks' or transaction totalizers, the total lever is moved to either its second or third position below adding and in either of these positions only a key in the desired bank may be depressed, as there will be no openings in the bar 1154 opposite the arms 123 of the other banks.

The above mechanism is substantially the same as that shown and described in the previously mentioned Shipley patent, No. 1,619,796.

Printer drive control

In total and sub-total printing operations, the shaft 62 (Fig. 23) is given two rotations and as it is necessary that the printer cam shaft 371 have only one rotation, mechanism is provided for preventing the disk 373 from rotating the shaft 371 during the first rotation of the shaft 62. This mechanism is controlled by the total lever 75. When said total lever is moved either up or down, the shaft 1025 is rocked clockwise, as previously described. The lever 767 is pinned to shaft 1025 and a link 1119 pivotally connects the lever with a yoke 1120 loose on the front shaft 131. The yoke 1120 has a finger 1121 cooperating with a tail 1122 (Fig. 24) of the pawl 374. Clockwise movement of the shaft 1025 by the total lever, through the link 1119 rocks the yoke 1120 counter-clockwise, whereupon the finger 1121 thereof is positioned in front of the tail 1122 of the pawl 374. With the finger 1121 in front of the tail 1122 the counter-clockwise rotation of the disk 373 causes the tail 1122 to engage the finger 1121 and rock the pawl 374 clockwise to disengage it from the boss 378 integral with the disk 377 fast on the shaft 371. In this manner the driving connection between the disk 373 and the shaft 371 is interrupted during the first rotation of said disk. Near the end of the first rotation of the shaft 62 and disk 373 the shaft 1025 is rocked still farther clockwise, as previously described, thereby moving the finger 1121 out of the path of movement of the pawl 374 so that upon the second counter-clockwise rotation of the disk 373 the pawl 374 engages the boss 378 and rotates the disk 377 and consequently the shaft 371 one counter-clockwise rotation (Fig. 24). The yoke 1120 is returned to normal with the shaft 1025.

Operation

A very brief description of an adding operation will now be given. Let it be assumed that clerk "E" has made a cash sale consisting of the three items printed on the slip in Fig. 62. The first item is $15.00, therefore the "5" key in the units of dollars bank and the "1" key in the tens of dollars bank are first depressed. It will be remembered that it is necessary to depress the "clerk's" and "trans." keys in a predetermined sequence, the "trans." key first and then the "clerk's" key in order to insure that the amount is entered on these totalizers. After these keys have been depressed the "item" key 73 may be depressed in order to engage the item totalizer and to release the machine.

The next item in the sale is $71.00. This is entered in exactly the same manner as the item just described except that the clerk's and transaction keys remain in their depressed position. The next item of $42.50 is also entered in the same way. After all of the items comprising the transaction are entered as just described, and it is desired to print the total of the same, the total lever 75 is moved one step below its adding position to the "item total" position and the "total" key 74 is depressed, thus releasing the machine.

The movement of the total lever, as just described, causes the engagement of the "item" totalizer with the actuators. The totalizer pinions control the setting up of the actuators and clear themselves at the same time, the amount which stood on them being transferred to the type wheels and printed. When the total of a series of items is printed, the clerk's and transaction keys are released near the end of the operation so that when the transaction is completed all of the parts will stand at zero.

During the entry of items the date and consecutive number, clerk's initial and transaction are not printed on the check, as the platens cooperating with these type wheels are not operative. However, when the total of these items is printed, the platens are made effective to take the complete impression, as shown in Fig. 60.

When the transaction is composed of only one item, the amount is first entered by the amount keys, then the transaction and clerk's keys are depressed, and finally the "total" key 74 is depressed to release the machine. This enters the single item on whatever clerk's and transaction totalizers have been selected, but not on the "item" totalizer.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine of the class described, the combination of feeding rollers, gears fast to said rollers, a gear for driving said first mentioned gears, a companion gear to said second mentioned gear, means for driving said companion gear, a pinion for connecting said companion gear with said second mentioned gear, a ratchet fast to said second mentioned gear, a pawl for driving said ratchet, and a common means for rendering said pinion ineffective and for making said pawl effective and vice versa.

2. In a machine of the class described, the combination of feeding rollers, gears fast to said rollers, a gear for driving said first mentioned gears, a companion gear to said second mentioned gear, means for driving said companion gear, a pinion for connecting said companion gear with said second mentioned gear, a ratchet fast to said second mentioned gear, a pawl for driving said ratchet, a bell crank lever one arm of which carries said pawl and the other arm said pinion, and means for rocking said bell crank lever to bring the pawl into cooperative relation with said ratchet and to remove said pinion from engagement with said companion gears and vice versa.

3. In a machine for printing and issuing an itemized receipt with total, means for giving a receipt a feed prior to the first item impression, means for feeding the strip subsequently to each item impression, means for effecting a total impression, and means for preventing an operation of said feeding means during an operation of the machine in which such total is printed.

4. In a machine of the class described, the combination in a printing mechanism, of means for printing on a strip retained in the machine and on an issuing strip, means controlling said printing means to print items on the issuing strip only, and means controlling said printing means to print totals of said items on both retained and issuing strips at the same printing line.

5. In a machine of the class described, the combination of an issuing strip feeding mechanism adapted to feed the strip different distances, means for operating said mechanism to give the strip a long feed, means for operating said mechanism to give the strip a short feed, said latter operating means being normally ineffective, manipulative means for controlling the effectivity of said long feed operating means, and other manipulative means for controlling the effectivity of the short feed operating means, and for rendering the long feed operating means ineffective.

6. In a machine of the class described, the combination of an issuing strip feeding mechanism, means for operating said mechanism to give the strip a long feed, said means being movable into effective and ineffective positions, means adapted to disconnect the long feed operating means and for operating said mechanism to give the strip a short feed, said latter means being normally ineffective, and manipulative means for controlling the effectivity of said operating means.

7. In a machine of the class described, the combination of means for printing items on a strip retained in the machine and on an issuing strip, and manipulative means controlling said printing means to print items on the retained strip only and adjustable to control the printing mechanism to print a total of said items on both retained and issuing strip.

8. In a machine of the class described, the combination of mechanism for printing an itemized receipt with total on an issuing strip, adjustable manipulative means for controlling the effectivity of said printing mechanism to print an itemized receipt, and means for preventing a change in the adjustment of said manipulative means prior to the printing of the total of the items.

9. In a machine of the class described, the combination of mechanism for printing an itemized receipt with total on an issuing strip, adjustable manipulative means for controlling the effectivity of said printing mechanism to print an itemized receipt, means for preventing a change in the adjustment of said manipulative means prior to the printing of the total of the items, and means operative during the total printing operation to release said manipulative means for adjustment.

10. In a machine of the class described, the combination of mechanism for printing totals on a strip retained in the machine and on an issuing strip, driving means for said issuing strip adapted to be disconnected from said issuing strip printing mechanism, manipulative means for controlling said driving means, means operative during total printing operations for connecting said driving means and issuing strip printing mechanism, and means under control of said manipulative means for rendering said connection-controlling means ineffective.

11. In a machine of the class described, the combination of mechanism for printing items on an issuing strip and totals of items on said issuing strip and a strip retained in the machine, impression means for effecting said printing, means normally operative during totaling operations to control the impression means to effect two impressions, and manipulative means for rendering said impression-controlling means ineffective.

12. In a machine of the class described, the combination of mechanism for printing items and totals of items on an issuing strip, manipulative means for rendering said mechanism operative and inoperative, means operative when said printing mechanism operates, to give said strip a long feed prior to the first item impression, means operative after said first impression to give said issuing strip a short feed, and manipulative means for controlling the effectivity of said short feed operating means.

13. In a machine of the class described, the combination of a printing mechanism for printing on an issuing receipt strip, means for feeding said strip prior to the first impression, manipulative means for controlling said feeding means to be operative, and other manipulative means operative when said first-mentioned manipulative means controls said feeding means to be operative, to permit the operation of said feeding means only during the immediate subsequent operation of the machine.

14. In a machine of the class described, the combination of a receipt printing and issuing mechanism, means for giving a receipt strip a long feed prior to the first impression, manipulative means for rendering said long feed effective or ineffective, means operable during an operation of the machine for rendering said long feeding means ineffective, and manipulative means for controlling said last-mentioned long feed control means to render it inoperative when the first-mentioned manipulative means renders it effective.

15. In a machine of the class described, the combination of a printing mechanism adapted to print and issue a receipt, an issuing strip feeding mechanism, means operable during each operation of the machine to disable said feeding means, manipulative means for controlling the effectivity of said disabling means, means adapted during totaling operations to render said feeding means effective, and manipulative means for controlling the effectivity of said last-mentioned controlling means for said feeding means.

16. In a machine of the class described, the combination of a receipt printing mechanism involving a variable strip feeding mechanism, means for setting up a condition to control the feeding mechanism to give the strip a long feed at the beginning of the next operation, manipulative means for controlling the feeding means to give the strip a short feed subsequent to each item entering operation, and another manipulative means for destroying the control effect of said first manipulative means and for setting up a condition for effecting a long feed on a succeeding operation.

17. In a machine of the class described, the combination of a multi-item with total receipt printing mechanism, manipulative means for controlling the machine for item and total operations, manipulative item and total releasing means, and means preventing an operation of the manipulative item releasing means when the first-mentioned manipulative means is operated to control the machine for total operations.

18. In a machine of the class described, the combination of printing mechanism, including means for printing amounts and consecutive numbers on a record strip, retained in the machine and on an issuing record strip, feeding means for said retained strip, and means for controlling the machine for printing items on said issuing strip, and for disabling the consecutive number printing means and the retained record feeding means.

19. In a machine of the class described, the combination of printing mechanism, including means for printing amounts and transaction characters on a record strip retained in the machine, and on an issuing record strip, feeding means for said retained record strip, and means for controlling the machine for printing items on said issuing strip, and for disabling the transaction character printing means and the feeding means for the retained record strip.

20. In a machine of the class described, the combination of printing mechanism, including means for printing amounts and the date on an issuing record strip and amounts on a record strip retained in the machine, feeding means for said retained record strip, and means for controlling the machine for printing items on said issuing strip, and for disabling the date printing means and the feeding means for the retained record strip.

21. In a machine of the class described, the combination of means for printing single item transactions and multi-item transactions with totals on an issuing strip, date impression means, and item and total manipulative control means for controlling said date impression means to function when either a single item transaction or a total of a multi-item transaction is printed.

22. In a machine of the class described, the combination of means for printing a multi-item transaction on a strip retained in the machine and on an issuing strip, manipulative means for controlling the printing means to prevent item impressions from being made upon said issuing strip and other manipulative means for controlling the printing means to cause item impressions to be made on the retained strip.

23. In a machine of the class described, the combination of means for printing a multi-item transaction on a strip retained in the machine and on an issuing strip, manipulative means for controlling the printing means to prevent item impressions from being bade upon said issuing strip, other manipulative means for controlling the printing means to cause item impressions to be made on the retained strip, and total printing controlling means for causing a total impression to be made on the retained strip.

24. In a machine of the class described, the combination of means for printing a multi-item transaction on a strip retained in the machine and on an issuing strip, manipulative means for controlling the printing means to prevent item impressions from being made upon said issuing strip, and other manipulative means for controlling the printing means to cause item impressions to be made on the retained strip and constituting, in conjunction with said said first manipulative means, a control to cause the total to be printed on the issuing strip.

25. In a machine of the class described, the combination of a mechanism for printing a multi-item transaction with total on an issuing strip, including variable feeding means operable during printing of the first item to give the strip a long feed, an item printing control key for controlling the feeding means to give the strip a short feed in a subsequent operation, and a total printing control key to give said strip a long feed in a subsequent operation.

26. In a machine of the class described, the combination of a mechanism for printing single and multi-item transactions, said mechanism involving clerk and transaction type elements adjustable during a single item operation and during the first item printing operation of a multi-item transaction operation, and means operable during a single item transaction operation and during an operation for printing a total of a multi-item transaction to release the type elements for adjustment during the next operation.

27. In a machine of the class described, the combination of mechanism for producing an itemized receipt with total manipulative means for controlling said mechanism to produce such receipt, and means cooperating with said manipulative means to compel completing a receipt-producing operation.

28. In a machine of the class described, the combination with operating mechanism therefor, of a mechanism adapted to print, sever, and eject a receipt, manipulative means for disconnecting said severing means from the machine operating mechanism, and means operatively connected to said severing mechanism adapted to disable said ejecting means when the severing means remains idle during an operation of the machine.

29. In a machine of the class described, the combination of a receipt printing, severing, and ejecting mechanism, an actuating pawl included in said ejecting mechanism, and an arm operable with said severing means for disabling said actuating pawl.

30. In a printing mechanism, a plurality of impression means, a common operating means therefor, means normally preventing movement of one of said impression means, said means adapted to be moved into an ineffective position to permit operation of the impression means, and means operable during the same operation of the machine for preventing movement of both of said impression means, said second-mentioned means superseding the control of the first-mentioned means.

31. In a printing mechanism, a plurality of impression means adapted to print upon the same record material, means normally disabling one of said means, said means adapted to be moved into ineffective position during certain operations of the machine, and means normally movable into position to disable both impression means during said certain operations of the machine but rendered ineffective by record material in position to receive a record.

32. In an itemized receipt with total printing mechanism, means for printing amounts during itemizing, means for printing additional matter during totalizing, and a common means under control of record material when in position to receive an impression, for controlling both printing means to print said amounts and additional matter.

33. In a printing mechanism, means for printing on a plurality of pieces of record material, means for feeding one of said pieces of record material, and impression means controlled by said feeding means to print on another of said pieces of record material.

34. In a printing mechanism, means for printing on a plurality of pieces of record material including impression means for printing amounts and other information on one of said pieces of material, and means dependent upon a feeding operation of another of said pieces of material for controlling said impression means to print said other information.

35. In a printing mechanism, means for producing an itemized statement with total on one piece of record material, other means for producing a like record on another piece of record material inserted in the machine, and means for controlling the latter record producing means to print less than a complete record when no itemized record is produced on the first mentioned record material.

36. In a printing mechanism, means for printing items and a total on an inserted slip, means for printing a total on a strip retained in the machine, feeding means for the strip, and means for printing transaction characteristics on the slip at the time the total is printed thereon, operation of said last mentioned means being dependent upon the feeding of the retained strip.

37. In a machine of the class described, the combination of feeding means, type for printing any specified data, a normally inactive hammer for taking impressions from said type, and means under control of said feeding means for rendering said hammer active.

38. In a machine of the class described, the combination of feeding means having a long and a short feeding movement, type for printing any specified data, a hammer for taking impressions from said type, and means under control of said feeding means for operating said hammer whereby, when the long feed mechanism is operative, said hammer will be operated, and when said short feed mechanism is operative, said hammer will be inactive.

39. In a printing mechanism, means for printing and issuing a record constituting a single item or multi-item receipt or check, showing a classification total, means automatically controlled for printing invariable matter during a single item operation or the first item of a multi-item operation, and manipulative means for controlling said last mentioned printing during the recording of single item transactions and the recording of classification totals.

40. In a machine of the class described, means for recording single item transactions and multi-item transactions with total, a consecutive counting device, means for operating said device when single item transactions and totals of multi-item transactions are recorded, and means to prevent operation of said device during the entry of the several items of a multi-item transaction.

41. In a machine of the class described, means for recording multi-item transactions with total, a consecutive numbering device and operating means therefor, manipulative means for controlling the recording means during entry of items, and operable to disable the consecutive number device operating means; and other manipulative means for controlling the machine for recording totals of items and operable to enable said operating means to function.

42. In a machine of the class described, a total control lever adjustable into a position to prepare the machine for adding operations and adjustable into different positions for totalizing operations, and a consecutive number device adapted to be disabled when the lever is in one of said totalizing positions and enabled when the lever is in another position for totalizing and in adding position.

43. In a machine of the class described, a total control lever adjustable into a position to prepare the machine for adding operations and adjustable into different positions for totalizing operations, a consecutive number device adapted to be disabled when the lever is in one of said totalizing positions and enabled when the lever is in another position for totalizing or in adding position, and manipulative item entering controlling means for preventing operation of said device.

44. In a machine for printing single item transactions, multi-item transactions and classification totals, means for preparing the machine for printing a single item transaction and items of a multi-item transaction, for printing totals of items, and for printing classification totals, manipulative means for releasing the machine for item printing operations when the machine is prepared to print single item and items of a multi-item transaction, and other manipulative means for releasing the machine regardless of the operation the machine is prepared for.

45. In a machine of the class described, the combination of a plurality of impression hammers pivoted at a common point, a plurality of type printing wheels, an oscillating operating member, springs connecting said oscillating member with said impression hammers, one impression hammer normally cooperating with said operating member to make an impression from certain ones of said type printing wheels, and a movable member cooperating with the last mentioned impression hammer to prevent said hammer from operating.

46. In a machine of the class described, the combination of common means for printing items and totals on a strip retained within the machine and on an issuing strip, feeding means for the issuing strip whereby the strip is moved into printing position, and a manipulative means to control the feeding means to prevent movement of the issuing strip into printing position, to cause the items and totals to be printed on the retained strip only.

47. In a machine of the class described, a plurality of impression hammers, a common operating means for operating said hammers, a projection on one of said hammers, a pivoted member having a projection cooperating with said projection to normally disable said one hammer, and means to move the pivoted member out of cooperative relation with said one hammer to enable simultaneous operation of all of the hammers.

48. In a machine of the class described, the combination with a plurality of totalizers, of a plurality of totalizer selecting keys one for each totalizer, amount keys, item entering mechanism under control of the amount keys, totalizer engaging means under control of the totalizer selecting keys for establishing a cooperative relationship between a selected totalizer and the item entering mechanism, and means for maintaining a continued operative relationship between a selected totalizer and the item entering mechanism during a series of successive item entering operations.

49. In a machine of the class described, the combination with a plurality of totalizers, of a plurality of totalizer selecting keys one for each totalizer, amount keys, item entering mechanism under control of the amount keys, totalizer engaging means under control of the totalizer selecting keys for establishing a cooperative relationship between a selected totalizer and the item entering mechanism, a printing mechanism for printing the items entered in the selected totalizer upon a record material, means for maintaining a continued operative relationship between a selected totalizer and the item entering mechanism during a series of successive item entering operations, and means whereby the last-mentioned means is disabled when a total of the series of items is printed upon the record material.

50. In a machine of the class described, the combination with a plurality of control devices one of which controls the machine for printing a series of items on a record strip and another a total thereof, of a plurality of totalizers, a plurality of special keys operable in conjunction with the first-mentioned control device, means controlled by the special keys for determining in which totalizer the series of items is to be entered, and means whereby a single operation of any special key will select its related totalizer to be actuated during a series of item entering operations.

51. In a machine of the class described, the combination of a plurality of control means, printing mechanism to print items and the totals thereof as determined by said control means, one of said control means determining the printing of a series of items on either an inserted slip or issued check and another of said control means determining the printing of the total of the items on either an inserted slip or check and simultaneously on a record strip, a plurality of special keys operable in conjunction with the item printing control means, a plurality of totalizers, and means controlled by the special keys for determining in which totalizer the series of items is to be entered.

52. In a machine of the class described, the combination of a plurality of keys, item entering mechanism under control of the keys for printing a series of items on a record strip, a plurality of totalizers adapted to accumulate the series of items entered, a plurality of totalizer selecting keys, a differential mechanism under control of the totalizer selecting keys, a totalizer selecting mechanism under control of the differential mechanism, a type carrier adapted to print a character designating which totalizer has been selected for operation, and means whereby the totalizer selecting mechanism and type carrier are retained in their adjusted positions during a series of item entering operations.

53. In a machine of the class described, the combination with a plurality of totalizers, of a plurality of totalizer selecting keys one for each totalizer, amount keys, item entering mechanism under control of the amount keys, totalizer engaging means under control of the totalizer selecting keys for establishing a cooperative relationship between a selected totalizer and the item entering mechanism, and means for maintaining a continued operative relationship between a selected totalizer and the item entering mechanism during a series of successive item entering operations.

54. In a machine of the class described, the combination with a plurality of totalizers, of a plurality of totalizer selecting keys one for each totalizer, amount keys, item entering mechanism under control of the amount keys, totalizer engaging means under control of the totalizer selecting keys for establishing a cooperative relationship between a selected totalizer and the item entering mechanism, a printing mechanism for printing the items entered in the selected totalizer upon a record material, means for maintaining a continued operative relationship, between a selected totalizer and the item entering mechanism during a series of successive item entering operations, and means whereby the last mentioned means is disabled when a total of the series of items is printed upon the record material.

55. In a machine of the class described, the combination with a plurality of amount keys, of a differential mechanism under control of the keys, an item entering mechanism controlled by the differential mechanism, a plurality of special keys, a plurality of totalizers, a differential mechanism under control of the special keys for controlling the establishment of co-operative relationship between a desired totalizer and the item entering mechanism, and means whereby the differential mechanism under control of the special keys is set in the same differentially moved position during a series of item entering operations after being controlled by one of the special keys preceding a series of item entering operations.

56. In a machine of the class described, the combination with a series of keys, of item printing devices adapted to print a series of items on a record strip, a feeding roller mounted on a fixed pivot, a co-operating feeding roller carried by a frame, means for latching the frame to normally separate the feeding rollers, and means for disabling the latch and then rotating the roller carried by the frame to space the record strip after an item printing operation.

57. In a machine of the class described, the combination with a series of keys, of item printing devices adapted to be controlled by the keys for printing a series of items upon a record strip, a pair of feeding rollers co-operating with the record strip, means for latching one of the feeding rollers so that they are normally separated, and means for disabling the latch and then rotating the feeding rollers to space the record strip after an item printing operation.

58. In a machine of the class described, the combination of means to register and print a series of items and the total thereof on an issuing check strip, a consecutive numbering device, impression means co-operating therewith said device and impression means being ineffective to add and print a consecutive number when registering and printing items, and means to render the consecutive numbering device and the impression means effective to add and print the consecutive number of the transaction upon the printing of the total of a series of items.

59. In a machine of the class described, the combination of means to print a series of items upon a check strip; means adapted to control the printing of a total of a series of items upon the check strip; a series of consecutive number printing type carriers adapted to consecutively number the printed totals; and mechanism operable upon operation of said second mentioned means to add a unit to the consecutive number type carriers, said mechanism being ineffective during the printing of the series of items.

In testimony whereof I affix my signature.

BERNIS M. SHIPLEY.